United States Patent
Su et al.

(10) Patent No.: US 11,973,254 B2
(45) Date of Patent: Apr. 30, 2024

(54) AQUEOUS POLYSULFIDE-BASED ELECTROCHEMICAL CELL

(71) Applicant: c/o FORM ENERGY INC., Somerville, MA (US)

(72) Inventors: Liang Su, Medfield, MA (US); Wei Xie, Waltham, MA (US); Yet-Ming Chiang, Weston, MA (US); William Henry Woodford, Cambridge, MA (US); Lucas Cohen, Newtown, PA (US); Jessa Silver, Roxbury, MA (US); Katelyn Ripley, Queensbury, NY (US); Eric Weber, Pittsburgh, PA (US); Marco Ferrara, Boston, MA (US); Mateo Cristian Jaramillo, San Francisco, CA (US); Theodore Alan Wiley, Somerville, MA (US)

(73) Assignee: FORM ENERGY, INC., Somerville, MA (US)

( * ) Notice: Subject to any disclaimer, the term of this patent is extended or adjusted under 35 U.S.C. 154(b) by 131 days.

(21) Appl. No.: 16/456,571

(22) Filed: Jun. 28, 2019

(65) Prior Publication Data

US 2020/0006796 A1 Jan. 2, 2020

Related U.S. Application Data

(60) Provisional application No. 62/716,578, filed on Aug. 9, 2018, provisional application No. 62/692,414, filed
(Continued)

(51) Int. Cl.
*H01M 8/18* (2006.01)
*H01M 4/50* (2010.01)
(Continued)

(52) U.S. Cl.
CPC ............. *H01M 8/184* (2013.01); *H01M 4/50* (2013.01); *H01M 4/58* (2013.01); *H01M 4/5815* (2013.01);
(Continued)

(58) Field of Classification Search
None
See application file for complete search history.

(56) References Cited

U.S. PATENT DOCUMENTS

| | | |
|---|---|---|
| 2,643,276 A | 6/1953 | Salauze |
| 2,683,182 A | 7/1954 | Salauze |

(Continued)

FOREIGN PATENT DOCUMENTS

| | | |
|---|---|---|
| CN | 206340592 U | 7/2017 |
| CN | 109478653 A | 3/2019 |

(Continued)

OTHER PUBLICATIONS

Wei, Xiaoliang et al., An aqueous redox flow battery based on neutral alkali metal ferri/ferrocyanide and polysulfide electrolytes, Nov. 13, 2015, Journal of The Electrochemical Society, vol. 163, No. 1, pp. A5150-A5153. (Year: 2015).*

(Continued)

*Primary Examiner* — Jonathan Crepeau
*Assistant Examiner* — Angela J Martin
(74) *Attorney, Agent, or Firm* — The Marbury Law Group, PLLC

(57) ABSTRACT

An electrochemical cell and battery system including cells, each cell including a catholyte, an anolyte, and a separator disposed between the catholyte and anolyte and that is permeable to the at least one ionic species (for example, a metal cation or the hydroxide ion). The catholyte solution includes a ferricyanide, permanganate, manganate, sulfur, and/or polysulfide compound, and the anolyte includes a (Continued)

sulfide and/or polysulfide compound. These electrochemical couples may be embodied in various physical architectures, including static (non-flowing) architectures or in flow battery (flowing) architectures.

42 Claims, 22 Drawing Sheets

Related U.S. Application Data on Jun. 29, 2018, provisional application No. 62/692,355, filed on Jun. 29, 2018.

(51) Int. Cl.
*H01M 4/58* (2010.01)
*H01M 8/1025* (2016.01)
*H01M 8/1246* (2016.01)
*H01M 50/429* (2021.01)
*H01M 50/44* (2021.01)
*H01M 50/451* (2021.01)
*H01M 50/489* (2021.01)
*H01M 50/491* (2021.01)

(52) U.S. Cl.
CPC ....... *H01M 8/1025* (2013.01); *H01M 8/1266* (2013.01); *H01M 50/4295* (2021.01); *H01M 50/44* (2021.01); *H01M 50/451* (2021.01); *H01M 8/188* (2013.01); *H01M 50/489* (2021.01); *H01M 50/491* (2021.01)

(56) References Cited

U.S. PATENT DOCUMENTS

| | | | |
|---|---|---|---|
| 3,484,291 A | 12/1969 | Mackenzie et al. | |
| 3,847,603 A | 11/1974 | Fukuda et al. | |
| 3,947,292 A | 3/1976 | Jackovitz et al. | |
| 4,168,349 A | 9/1979 | Buzzelli | |
| 4,246,324 A | 1/1981 | de Nora et al. | |
| 4,250,236 A | 2/1981 | Haschka et al. | |
| 4,384,928 A | 5/1983 | Hall | |
| 4,448,858 A | 5/1984 | Graf et al. | |
| 4,450,211 A | 5/1984 | Vignaud | |
| 4,485,154 A | 11/1984 | Remick et al. | |
| 4,552,630 A | 11/1985 | Wheeler et al. | |
| 4,828,942 A | 5/1989 | Licht | |
| 4,842,963 A | 6/1989 | Ross, Jr. | |
| 4,977,044 A | 12/1990 | Ludwig | |
| 5,011,747 A | 4/1991 | Strong et al. | |
| 5,145,752 A | 9/1992 | Goldstein et al. | |
| 5,190,833 A | 3/1993 | Goldstein et al. | |
| 5,397,532 A | 3/1995 | Blaimschein | |
| 5,411,815 A | 5/1995 | Goldstein | |
| 5,415,949 A | 5/1995 | Stone et al. | |
| 5,432,022 A | 7/1995 | Cheiky | |
| 5,441,820 A | 8/1995 | Siu et al. | |
| 5,451,475 A | 9/1995 | Ohta et al. | |
| 5,549,991 A | 8/1996 | Licht et al. | |
| 5,569,551 A | 10/1996 | Pedicini et al. | |
| 5,595,949 A | 1/1997 | Goldstein et al. | |
| 5,665,481 A | 9/1997 | Schuster et al. | |
| 5,700,596 A | 12/1997 | Ikoma et al. | |
| 5,788,943 A | 8/1998 | Aladjov | |
| 6,194,098 B1 | 2/2001 | Ying et al. | |
| 6,210,832 B1 | 4/2001 | Visco et al. | |
| 6,228,535 B1 | 5/2001 | Fierro et al. | |
| 6,249,940 B1 | 6/2001 | Asano et al. | |
| 6,268,085 B1 | 7/2001 | Manthiram et al. | |
| 6,358,643 B1 | 3/2002 | Katz et al. | |
| 6,416,649 B1 | 7/2002 | Ray et al. | |
| 6,458,480 B1 | 10/2002 | Morris et al. | |
| 6,475,658 B1 | 11/2002 | Pedicini et al. | |
| 6,537,701 B1 | 3/2003 | Nimon et al. | |
| 6,849,172 B2 | 2/2005 | Rigby et al. | |
| 6,849,356 B2 | 2/2005 | Dow et al. | |
| 7,060,388 B2 | 6/2006 | Naruoka | |
| 7,070,632 B1 | 7/2006 | Visco et al. | |
| 8,329,346 B2 | 12/2012 | Janse Van Rensburg et al. | |
| 8,397,508 B2 | 3/2013 | Weimer et al. | |
| 8,758,948 B2 | 6/2014 | Narayan et al. | |
| 9,065,120 B2 | 6/2015 | Carlson | |
| 9,172,123 B2 | 10/2015 | Albertus et al. | |
| 9,263,779 B2 | 2/2016 | Lee et al. | |
| 9,368,486 B2 | 6/2016 | Icht | |
| 9,368,788 B2 | 6/2016 | Ogg et al. | |
| 9,419,273 B2 | 8/2016 | Kakeya et al. | |
| 9,478,806 B2 | 10/2016 | Ogg et al. | |
| 9,537,144 B2 | 1/2017 | Tuang et al. | |
| 9,559,385 B2 | 1/2017 | Ogg et al. | |
| 9,577,298 B2 | 2/2017 | Narayan et al. | |
| 9,583,779 B2 | 2/2017 | Chiang et al. | |
| 9,660,265 B2 | 5/2017 | Visco et al. | |
| 9,680,151 B2 | 6/2017 | Mullins | |
| 9,680,154 B2 | 6/2017 | Chen et al. | |
| 9,780,379 B2 | 10/2017 | Zhamu et al. | |
| 9,843,064 B2 | 12/2017 | Brandon et al. | |
| 9,893,397 B2 | 2/2018 | Yoshida et al. | |
| 9,911,985 B2 | 3/2018 | Dong et al. | |
| 9,947,481 B2 | 4/2018 | Solomon et al. | |
| 10,008,754 B2 | 6/2018 | Englert | |
| 10,014,530 B2 | 7/2018 | Lang et al. | |
| 10,033,036 B2 | 7/2018 | Christensen et al. | |
| 10,044,082 B2 | 8/2018 | Suyama et al. | |
| 10,147,988 B2 | 12/2018 | Park et al. | |
| 10,177,426 B2 | 1/2019 | Nitta | |
| 11,611,115 B2 | 3/2023 | Pham et al. | |
| 2002/0155351 A1 | 10/2002 | Licht | |
| 2004/0221426 A1 | 11/2004 | Gawa et al. | |
| 2005/0042503 A1 | 2/2005 | Kim et al. | |
| 2005/0123815 A1 | 6/2005 | Tsai et al. | |
| 2006/0040174 A1 | 2/2006 | Peabody | |
| 2006/0194107 A1 | 8/2006 | Licht | |
| 2008/0131762 A1 | 6/2008 | Joo et al. | |
| 2010/0003570 A1 | 1/2010 | Finsterwalder et al. | |
| 2010/0062313 A1 | 3/2010 | Browning et al. | |
| 2010/0119895 A1 | 5/2010 | Friesen | |
| 2010/0310905 A1 | 12/2010 | Oriet et al. | |
| 2011/0027648 A1 | 2/2011 | Rolison et al. | |
| 2011/0070506 A1 | 3/2011 | Friesen et al. | |
| 2011/0250512 A1 | 10/2011 | Friesen et al. | |
| 2012/0021303 A1 | 1/2012 | Amendola et al. | |
| 2012/0052404 A1 | 3/2012 | Friesen et al. | |
| 2012/0068667 A1 | 3/2012 | Friesen et al. | |
| 2012/0098499 A1 | 4/2012 | Friesen et al. | |
| 2012/0187918 A1 | 7/2012 | Narayan et al. | |
| 2012/0202127 A1 | 8/2012 | Friesen et al. | |
| 2012/0295172 A1 | 11/2012 | Peled et al. | |
| 2013/0022881 A1 | 1/2013 | Friesen et al. | |
| 2013/0037760 A1* | 2/2013 | Maeda | H01M 4/8631 252/511 |
| 2013/0095393 A1 | 4/2013 | Friesen et al. | |
| 2013/0115523 A1 | 5/2013 | Friesen et al. | |
| 2013/0115525 A1 | 5/2013 | Friesen et al. | |
| 2013/0115526 A1 | 5/2013 | Friesen et al. | |
| 2013/0115531 A1 | 5/2013 | Amendola et al. | |
| 2013/0115533 A1 | 5/2013 | Friesen et al. | |
| 2013/0149615 A1 | 6/2013 | Narayan et al. | |
| 2013/0172433 A1 | 7/2013 | McKeown et al. | |
| 2013/0183591 A1 | 7/2013 | Dickson | |
| 2013/0189592 A1 | 7/2013 | Roumi et al. | |
| 2013/0267616 A1 | 10/2013 | McKeown et al. | |
| 2013/0295471 A1 | 11/2013 | Visco et al. | |
| 2014/0162129 A1 | 6/2014 | Kim et al. | |
| 2014/0217985 A1 | 8/2014 | Gifford et al. | |
| 2014/0220256 A1 | 8/2014 | Ogg | |
| 2014/0220432 A1 | 8/2014 | Ogg et al. | |
| 2014/0220434 A1 | 8/2014 | Ogg | |
| 2014/0220435 A1 | 8/2014 | Ogg et al. | |
| 2014/0220440 A1 | 8/2014 | Ogg | |
| 2014/0220460 A1 | 8/2014 | Ogg et al. | |
| 2014/0234730 A1 | 8/2014 | Albertus et al. | |
| 2014/0342214 A1 | 11/2014 | Wegner et al. | |

(56) References Cited

U.S. PATENT DOCUMENTS

| | | | |
|---|---|---|---|
| 2015/0086884 A1 | 3/2015 | Narayan et al. | |
| 2015/0236543 A1* | 8/2015 | Brushett | H01M 8/188 |
| | | | 429/81 |
| 2015/0372357 A1 | 12/2015 | Kruglak et al. | |
| 2016/0020493 A1 | 1/2016 | Van Dijk et al. | |
| 2016/0036094 A1 | 2/2016 | Ogg | |
| 2016/0036095 A1 | 2/2016 | Ogg | |
| 2016/0111730 A1 | 4/2016 | Kim et al. | |
| 2016/0118636 A1 | 4/2016 | Jin et al. | |
| 2016/0168732 A1* | 6/2016 | Swiegers | C25B 1/13 |
| | | | 429/500 |
| 2016/0248136 A1 | 8/2016 | Bugga et al. | |
| 2016/0308220 A1 | 10/2016 | Qi et al. | |
| 2017/0141434 A1 | 5/2017 | Narayan et al. | |
| 2017/0207464 A1 | 7/2017 | Gyenge et al. | |
| 2018/0010228 A1 | 1/2018 | Ogg et al. | |
| 2018/0123116 A1 | 5/2018 | Lee et al. | |
| 2018/0219220 A1 | 8/2018 | Hayashi et al. | |
| 2018/0241107 A1 | 8/2018 | Su et al. | |
| 2018/0287237 A1 | 10/2018 | Manthiram et al. | |
| 2019/0115613 A1* | 4/2019 | Manthiram | H01M 4/0404 |
| 2019/0296325 A1 | 9/2019 | Sekiguchl et al. | |
| 2020/0003570 A1 | 1/2020 | Marti et al. | |
| 2020/0006745 A1 | 1/2020 | Westwood et al. | |
| 2020/0006828 A1 | 1/2020 | Milshtein et al. | |
| 2020/0006896 A1 | 1/2020 | Mahadik et al. | |
| 2020/0036002 A1 | 1/2020 | Chakraborty et al. | |
| 2020/0136153 A1 | 4/2020 | Jaramillo et al. | |
| 2020/0411879 A1 | 12/2020 | Hartman et al. | |
| 2020/0411932 A1 | 12/2020 | Weber et al. | |
| 2021/0028457 A1 | 1/2021 | Newhouse et al. | |

FOREIGN PATENT DOCUMENTS

| | | | |
|---|---|---|---|
| EP | 0637291 B1 | 10/1997 | |
| EP | 0664932 B1 | 1/1998 | |
| EP | 0823135 B1 | 11/1998 | |
| EP | 0835334 B1 | 9/2002 | |
| EP | 1027747 B1 | 9/2002 | |
| EP | 1413001 B1 | 4/2005 | |
| EP | 1266413 B1 | 5/2005 | |
| EP | 1977475 B1 | 2/2012 | |
| EP | 2486622 B1 | 7/2014 | |
| EP | 2424016 B1 | 10/2014 | |
| EP | P2823528 B1 | 3/2016 | |
| EP | P2586092 B1 | 1/2017 | |
| EP | 2619835 B1 | 6/2017 | |
| EP | 2792004 B1 | 11/2017 | |
| EP | P2721688 B1 | 2/2018 | |
| EP | 2774205 B1 | 3/2018 | |
| EP | 2954583 B1 | 4/2018 | |
| EP | 2559097 B1 | 5/2018 | |
| EP | 2596545 B1 | 6/2018 | |
| EP | P2659536 B1 | 8/2018 | |
| IN | 201917002254 A | 4/2019 | |
| JP | 2002194411 A | 7/2002 | |
| JP | 3387724 B2 | 1/2003 | |
| JP | 2010140736 A | 6/2010 | |
| JP | 2010-192313 A | 9/2010 | |
| JP | 2010-262876 A | 11/2010 | |
| JP | 2013134838 A | 7/2013 | |
| JP | 2014127289 A | 7/2014 | |
| JP | 2014150056 A | 8/2014 | |
| JP | 2015076379 A | 4/2015 | |
| JP | 5952540 B2 | 6/2016 | |
| JP | 6032018 B2 | 11/2016 | |
| JP | 6234917 B2 | 11/2017 | |
| JP | 2017216126 A | 12/2017 | |
| JP | 2018006057 A | 1/2018 | |
| JP | 2018067399 A | 4/2018 | |
| JP | 6352884 B2 | 6/2018 | |
| JP | 6363244 B2 | 7/2018 | |
| JP | 2018529207 A | 10/2018 | |
| JP | 6682102 B2 | 3/2020 | |
| KR | 20140068850 A | 6/2014 | |
| KR | 20160115912 A | 10/2016 | |
| KR | 10-2018-0063144 A | 6/2018 | |
| WO | WO8402429 A1 | 6/1984 | |
| WO | 2010065890 A1 | 6/2010 | |
| WO | 2012012558 A2 | 1/2012 | |
| WO | WO2012174433 A3 | 12/2012 | |
| WO | 2013005050 A1 | 1/2013 | |
| WO | 2014142666 A1 | 9/2014 | |
| WO | WO2015042573 A1 | 3/2015 | |
| WO | WO2015145690 A1 | 10/2015 | |
| WO | WO2015150784 A1 | 10/2015 | |
| WO | WO2017-006666 A1 | 1/2017 | |
| WO | WO2017-049414 A1 | 3/2017 | |
| WO | WO 2017075577 | * 5/2017 | H01M 8/20 |
| WO | WO2017075577 A1 | 5/2017 | |
| WO | WO2017117373 A1 | 7/2017 | |
| WO | WO2017-223219 A1 | 12/2017 | |
| WO | WO2018009930 A2 | 1/2018 | |
| WO | WO2018018036 A1 | 1/2018 | |
| WO | 2018052376 A1 | 3/2018 | |
| WO | 2018187025 A1 | 10/2018 | |
| WO | WO2018187561 A1 | 10/2018 | |
| WO | WO2020006419 A1 | 1/2020 | |
| WO | WO2020023912 A1 | 1/2020 | |

OTHER PUBLICATIONS

Chakraborty, R. et al., "Negative Electrodes For Electrochemical Cells," U.S. Appl. No. 16/523,722, filed Jul. 26, 2019.

Al, W. et al., "A Novel Graphene-Polysulfide Anode Material for High-Performance Lithium-Ion Batteries," Scientific Reports, vol. 3, No. 234, pp. 1-5, DOI: 10.1038/srep0234, (2013).

Al-Hoshan, M. S. et al., "Synthesis, Physicochemical and Electrochemical Properties of Nicekl Ferrite Spinels Obtained by Hydrothermal Method for the Oxygen Evolution Reaction (OER)," Int. J. Electrochem. Sci., vol. 7, pp. 4959-4973, (2012).

Arunchander, A. et al., "Synthesis of flower-like molybdenum sulfide/graphene hybrid as an efficient oxygen reduction electrocatalyst for anion exchange membrane fuel cells," Journal of Power Sources, vol. 353, pp. 104-114, (2017).

Bandal, H. et al., "Iron-based heterogeneous catalysts for oxygen evolution reaction; change in perspective from activity promoter to active catalyst," Journal of Power Sources, vol. 395, pp. 106-127, (2018).

Blurton, K. F. et al., "Metal/Air Batteries: Their Status and Potential—A Review," Journal of Power Sources, vol. 4, pp. 263-279, (1979).

Burke, M. S. et al., "Cobalt-Iron (Oxy)Hudroxide Oxygen Evlolution Electrocatalysts: The Role of Structur5e and Composition on Activity, Stability, and Mechanism," J. Am. Chem. Soc., vol. 137, pp. 3638-3648, DOI: 10.1021/iacs.5b00281, (2015).

Burke, M. S. et al., "Oxygen Evolution Reaction Electrocatalysis on Transition Metal Oxides and (Oxy)hydroxides: Activity Trends and Design Principles," Department of Chemistry and Biochemistry, University of Oregon, Eugene, Oregon 97403, United States, Chemistry of Materials, 10 pages, (2015).

Chen, Y. et al., "Harvesting polysul!des by sealing the sulfur electrode in a composite ion-selective net," Journal of Power Sources, vol. 368, pp. 38-45, (2017).

Chiang, Y.M. et al., High Capacity, Temperature-Stable Lithium Aluminum Manganese Oxide Cahtodes for Rechargeable Batteries, Electrochemical and Solid-State Letters, vol. 2, No. 3, pp. 107-110, (1990).

Colli, A. N. et al., "High energy density MnO4-/MnO42 redox couple for alkaline redox flow batteries," Chem. Commun., vol. 52, pp. 14039-14042, (2016).

Cui, B et al., "Improved Cycle Iron Molten Air Battery Performance Using a Robust Fin Air Electrode," Journal of The Electrochemical Society, vol. 164, No. 2, pp. A88-A92, (2017).

Demir-Cakan, R. et al., "An aqueous electrolyte rechargeable Li-ion/polysul!de battery," Journal of Materials Chemistry A, View Article Online DOI: 10.1039/c4ta01308e, 5 pages, (2014).

(56) References Cited

OTHER PUBLICATIONS

Demir-Cakan, R. et al., "Use of ion-selective polymer membranes for an aqueous electrolyte rechargeable Li-ion-polysulphide battery," View Online DOI: 10.1039/c4ta05756b, J. Mater. Chem. A, vol. 3, pp. 2869-2875, (2015).

Egashira, M. et al., "Iron-Air (Secondary and Primpary)," Yamaguchi University, Yamaguchi, Japan & 2009 Elsevier B.V. All rights reserved, pp. 372-375, (2009).

Figueredo-Rodriguez, H. A. et al., "A Rechargeable, Aqueous Iron Air Battery with Nanostructured Electrodes Capable of High Energy Density Operation," Journal of The Electrochemical Society, vol. 164, No. 6, pp. A1148-A1157, (2017).

Gross, M. M. et al., "Aqueous Polysulfide-Air Battery with a Mediator-Ion Solid Electrolyte and a Copper Sul!de Catalyst for Polysulfide Redox," View Online DOI: 10.1021/acsaem.8b01679, ACS Applied Energy Materials, vol. 1, No. 12, pp. 7230-7236, (2018).

Hall, D. E., "Ni(OH)2_Impregnated Anodes for alkaline Water Electrolysis," J. Electrochem. So., vol. 130, No. 2, pp. 317-321, (1983).

Hall, D. E., "Electrolysis: Corrosion Resistance," J. Electrochem. Soc., vol. 129, No. 2, pp. 310-315, (1982).

Hang, B. T. et al., "Effect of metal-sulfide additives on electrochemical properties of nano-sized Fe2O3-loaded carbon for Fe/air battery anodes," Journal of Power Sources, vol. 168, pp. 522-532, (2007).

Hang, B. T et al., "Effect of additives on the electrochemical properties of Fe2O3/C nanocomposite for Fe/air battery anode," Journal of Electroanalytical Chemistry, vol. 762, pp. 59-65, (2016).

Notification Concerning Transmittal of a International Preliminary Report on Patentability and Written Opinion of the International Search Authority for International Patent Application No. PCT/US2018/026243, dated Oct. 17, 2019 9 pages.

International Search Report and Written Opinion of the International Searching Authority for International Patent Application No. PCT/US2018/026243, dated Jul. 27, 2018, 12 pages.

International Search Report and Written Opinion of the International Searching Authority for International Patent Application No. PCT/US2019/039844, dated Oct. 23, 2019, 15 pages.

International Search Report and Written Opinion of the International Searching Authority for International Patent Application No. PCT/US2019/039867, dated Nov. 15, 2019, 19 pages.

International Search Report and Written Opinion of the International Searching Authority for International Patent Application No. PCT/US2019/039973, dated Jan. 13, 2020, 26 pages.

International Search Report and Written Opinion of the International Searching Authority for International Patent Application No. PCT/US2019/043745, dated Nov. 13, 2019, 17 pages.

Ji, X. et al., "Stabilizing lithium-sulphur cathodes using polysulphide reservoirs," View Online DOI: 10.1038/ncomms1293, Nature Communications, vol. 2, No. 325, 8 pages, (2011).

Jin, X. et al., "A high-!delity multiphysics model for the new solid oxide iron-air redox battery part I: Bridging mass transport and charge transfer with redox cycle kinetics," Journal of Power Sources, vol. 280, pp. 195-204, (2015).

Kadyk, T. et al., "How to Enhance Gas Removal from Porous Electrodes?" View Online DOI: 10.1038/SREP38780, Scientific Reports, vol. 6, No. 38780, pp. 1-14, (2016).

Klaus, S. et al., "E!ects of Fe Electrolyte Impurities on Ni(OH)2/NiOOH Structure and Oxygen Evolution Activity," View Online DOI:10.1021/acs.jpcc.5b00105, Journal of Physical Chemistry C, vol. 119, No. 13, pp. 7243-7254, (2015).

Licht, S., "A Novel Aqueous Aluminum permanganate fuel cell," Electrochemistry Communications, vol. 1, pp. 33-36, (1999).

Li, Z. et al., "Air-Breathing Aqueous Sulfur Flow Battery for Ultralow-Cost Long-Duration Electrical Storage," Joule vol. 1, pp. 306-327, Oct. 11, 2017, 2017 Published by Elsevier Inc., (2017).

Li, Z. et al., "A high-energy and low-cost polysul!de/iodide redox ow battery," Nano Energy, vol. 30, pp. 283-292, (2016).

Mainar, A. R. et al., "Alkaline aqueous electrolytes for secondary zinc-air batteries: an overview," Int. J. Energy Res. 2016; vol. 40, pp. 1032-1049, (2016).

Malkhandi, S. et al., "Organo-Sulfur Additives for Suppressing Hydrogen Evolution in Iron-air Battery," Abstract #688, 220th ECS Meeting, 2011 The Electrochemical Society.

Matsuda, A. et al., "Preparation of hydroxide ion conductive KOH—ZrO2 electrolyte for all-solid state iron/air secondary battery," Solid State Ionics, vol. 262, pp. 188-191, (2014).

Maurya, S. et al., "A review on recent developments of anion exchange membranes for fuel cells and redox flow batteries," View online DOI: 10.1039/c5ra04741b, RSC Adv., vol. 5, pp. 37206-37230, (2015).

McKerracher, R. D. et al., "A Review of the Iron-Air Secondary Battery for Energy Storage," View online DOI: 10.1002/cplu.201402238, ChemPlusChem 2015, vol. 80, pp. 323-335, (2015).

Merle, G. et al., "Anion exchange membranes for alkaline fuel cells: A review," Journal of Membrane Science, vol. 377, pp. 1-35, (2011).

Mitra, D. et al., "An Efficient and Robust Surface-Modified Iron Electrode for Oxygen Evolution in AlkalineWater Electrolysis, "Journal of The Electrochemical Society, vol. 165, No. 5, pp. F392-F400, (2018).

Mitra, D. et al., "A Stable and Electrocatalytic Iron Electrode for Oxygen Evolution in Alkaline Water Electrolysis," View Online https://doi.org/10.1007/s11244-018-0971-9, Springer Science+Business Media, LLC, part of Springer Nature 2018.

Narayan, S. R. et al., "Bi-Functional Oxygen Electrodes—Challenges and Prospects," The Electrochemical Society Interface, Summer 2015, pp. 65-69, (2015).

Neburchilov, V. et al., "Metal-Air and Metal-Sulfur Batteries: Fundamentals and Applications," CRC Press Taylor & Francis Group, 6000 Broken Sound Parkway NW, Suite 300, Boca Raton, FL 33487-2742, @ 2017 by Taylor & Francis Group, LLC, CRC Press is an imprint of Taylor & Francis Group, an Informa business.

Ojefors, L. et al., "An-iron-Air Vehicle Battery," Journal of Power Sources, vol. 2, pp. 287-296, (1977).

Pan, J. et al., "Constructing Ionic Highway in Alkaline Polymer Electrolytes," Energy Environ. Sci. 2014, vol. 7, pp. 354-360, (2014).

Roe, S. et al., "A High Energy Density Vanadium Redox Flow Battery with 3 M Vanadium Electrolyte," Journal of The Electrochemical Society, vol. 163, No. 1, pp. A5023-A5028, (2016).

Sen, R. K. et al., "Metal-Air Battery Assessment," Prepared for Office of Energy Storage and Distribution Conservation and Renewable Energy, The U.S. Department of Energy under Contract DE-AC06-76RLO 1830, Pacific Northwest aboratory, Operated for the U.S. Department of Energy, 96 pages, (1988).

Sevinc, S. et al., "In-situ tracking of NaFePO4 formation in aqueous electrolytes and its electrochemical performances in Na-ion/polysul!de batteries," Journal of Power Sources, vol. 412, pp. 55-62, (2019).

Smith, R. D. L. et al., "Water Oxidation Catalysis: Electrocatalytic Response to Metal Stoichiometry in Amorphous Metal Oxide Films Containing Iron, Cobalt, and Nickel," J. Am. Chem. Soc., vol. 135, No. 31, pp. 11580-115, (2013).

Sayilgan, E. et al., "A review of technologies for the recovery of metals from spent alkaline and zinc-carbon batteries", Hydrometallurgy, 2009, vol. 97, Issues 3-4, pp. 158-166.

Tekin, B. et al., "A New Sodium-Based Aqueous Rechargeable Battery System: The Special Case of Na0.44MnO2/ Dissolved Sodium Polysulfide," View online DOI: 10.1002/ente.201700245, Energy Technol. vol. 5, pp. 2182-2188, (2017).

Tian, B. et al., "The effect of Na2S additive in alkaline electrolyte on improved performances of Fe-based air batteries," Electrochimica Acta, vol. 259, pp. 196-203, (2018).

Trocino, S. et al., "High performance solid-state iron-air rechargeable ceramic battery operating at intermediate temperatures (500-650 °C.)," Applied Energy, pp. 233-234 & pp. 386-394, (2019).

Vijayamohanan, K. et al., "Rechargeable Alkaline Iron Electrodes," Journal of Power Sources, vol. 34, pp. 269-285, (1991).

(56) References Cited

OTHER PUBLICATIONS

Wei, X. et al., "An Aqueous Redox Flow Battery Based on Neutral Alkali Metal Ferri/ferrocyanide and Polysulfide Electrolytes," Journal of The Electrochemical Society, vol. 163, No. 1, pp. A5150-A5153, (2016).
Weinrich, H. et al., "Understanding the Nanoscale Redox-Behavior of Iron-Anodes for Rechargeable Iron-Air Batteries," View Online https://doi.org/10.1016/j.nanoen.2017.10.023, Nano Energy, Institute of Energy and Climate Research-Fundamental Electrochemistry (IEK-9) Center for Nanophase Materials Sciences, Oak Ridge National aboratory, Oak Ridge, Tennessee 378, US, 46 pages, (2017).
Wilke, S. K. et al., "Structural evolution of directionally freeze-cast iron foams during oxidation/reduction cycles," Acta Materialia, vol. 162, pp. 90-102, (2019).
Yang, B. et al., "Organo-Sulfur Molecules enable iron-based battery electrodes to meet the challenges of large-scale electrical energy storage," Energy Environ. Sci., vol. 7, pp. 2753-2763, (2014).
Yang, C. et al., "Unique aqueous Li-ion/sulfur chemistry with high energy density and reversibility," View online, www.pnas.org/cgi/doi/10.1073/pnas.1703937114, PNAS, vol. 114, No. 24, pp. 6197-6202, (2017).
You, S. et al., "A microbial fuel cell using permanganate as the cathodic electron acceptor," Journal of Power Sources, vol. 162, pp. 1409-1415, (2006).
Yu, X. et al., "A Voltage-Enhanced, Low-Cost Aqueous Iron-Air Battery Enabled with a Mediator-Ion Solid Electrolyte," View Online DOI: 10.1021/acsenergylett.7b00168, ACS Energy Lett., vol. 2, pp. 1050-1055, (2017).
Yun, S. et al., "Materials and Device Constructions for Aqueous Lithium-Sulfur Batteries," View online DOI: 10.1002/ adfm. 201707593, Adv. Funct. Mater., vol. 28, pp. 1-17 (1707593), (2018).
Bisol S., et al., "Abstract", e-Polymers, Walter de Gruyter GmbH, DE, DE, Jun. 27, 2017, vol. 17, No. 4, pp. 283-293, DOI:10.1515/epoly-2016-0291, ISSN 2197-4586, XP055770815.
Bisoi S., et al., "Gas Separation Properties of Troeger's Base-Bridged Polyamides," e-Polymers, 2017, vol. 17, No. 4, pp. 283-293, DOI: https://doi.org/10.1515/epoly-2016-0291.
Carta M., et al., "The Synthesis of Microporous Polymers Using Troger's Base Formation," Polymer Chemistry, 2014, vol. 5, No. 18, pp. 5267-5272, DOI:10.1039/C4PY00609G, ISSN 1759-9954, XP055770813.

Extended European Search Report for European Application No. 19825132.4, dated Feb. 11, 2022, 6 Pages.
International Preliminary Report on Patentability for International Application No. PCT/US2019/039867, dated Jan. 7, 2021, 13 Pages.
International Preliminary Report on Patentability for International Application No. PCT/US2020/039942, dated Jan. 6, 2022, 12 Pages.
International Search Report and Written Opinion of International Application No. PCT/US2020/043630, dated Nov. 11, 2020, 9 Pages.
International Search Report and Written Opinion of the International Application No. PCT/US2020/043639, dated Nov. 13, 2020, 11 Pages.
Li Z., et al., "Air-Breathing Aqueous Sulfur Flow Battery for Ultralow-Cost Long-Duration Electrical Storage," Joule, Oct. 11, 2017, vol. 1, No. 2, pp. 306-327, XP055667017.
Notification of Transmittal of the International Search Report and Written Opinion of the International Search Authority or International Patent Application No. PCT/US2020/039889, dated Oct. 15, 2020, 11 pages.
Notification of Transmittal of the International Search Report and Written Opinion of the International Search Authority or International Patent Application No. PCT/US2020/039942, dated Oct. 22, 2020, 17 pages.
Notification of Transmittal of the International Search Report and Written Opinion of the International Search Authority or International Patent Application No. PCT/US2020/039976, dated Oct. 23, 2020, 11 pages.
Perkins N.R., et al., "Hydrogen Oxidation Electrodes and Electrochemical Cells Including the Same," U.S. Appl. No. 16/951,396, filed Nov. 18, 2020, 88 Pages.
Hu C., et al., "Multi-cation Crosslinked Anion Exchange Membranes from Microporous Trager's Base Copolymers," Journal of Materials Chemistry A, vol. 6(27), Jun. 12, 2018, pp. 13302-13311.
Partial Supplementary European Search Report for EP 20832147.1 received Jun. 20, 2023, 12 pages.
Yang Z., et al., "Highly Conductive Anion-Exchange Membranes from Microporous Trager's Base Polymers," Angewandte Chemie International Edition, vol. 55(38), Aug. 9, 2016, pp. 11499-11502.

\* cited by examiner

AQUEOUS POLYSULFIDE-BASED ELECTROCHEMICAL CELL

RELATED APPLICATIONS

This application claims the benefit of priority to U.S. Provisional Patent Application No. 62/692,355 entitled "Aqueous Sulfur-Polysulfide Electrochemical Cell" filed Jun. 29, 2018, U.S. Provisional Patent Application No. 62/692,414 entitled "Polysulfide-Ferrocyanide Electrochemical Cell" filed Jun. 29, 2018, and U.S. Provisional Application No. 62/716,578 entitled "Aqueous Poly sulfide-Permanganate Electrochemical Cell" filed Aug. 9, 2018. The entire contents of all three applications are hereby incorporated by reference for all purposes. This application is related to U.S. Non-Provisional Patent Application 16/457,253 entitled "Rolling Diaphragm Seal" filed on Jun. 28, 2019 and this application is related to U.S. Non-Provisional Patent Application 16/456,860 entitled "Metal Air Electrochemical Cell Architecture" filed Jun. 28, 2019. The entire contents of both related applications are hereby incorporated by reference for all purposes.

BACKGROUND

Energy storage technologies are playing an increasingly important role in electric power grids; at a most basic level, these energy storage assets provide smoothing to better match generation and demand on a grid. The services performed by energy storage devices are beneficial to electric power grids across multiple time scales, from milliseconds to years. Today, energy storage technologies exist that can support timescales from milliseconds to hours, but there is a need for long and ultra-long duration (collectively, at least ≥8 h) energy storage systems.

This Background section is intended to introduce various aspects of the art, which may be associated with embodiments of the present inventions. Thus, the foregoing discussion in this section provides a framework for better understanding the present inventions, and is not to be viewed as an admission of prior art.

SUMMARY

Embodiments of the present invention include apparatus, systems, and methods for low-cost energy storage. In one example, an electrochemical cell includes a catholyte, an anolyte, and a separator disposed between the catholyte and anolyte and that is permeable to the at least one ionic species (for example, a metal cation or the hydroxide ion). The catholyte solution includes a ferricyanide, permanganate, manganate, sulfur, and/or polysulfide compound, and the anolyte includes a sulfide and/or polysulfide compound. These electrochemical couples may be embodied in various physical architectures, including static (non-flowing) architectures or in flow battery (flowing) architectures.

According to various embodiments of the present disclosure, provided is an electrochemical cell comprising: a catholyte comprising a cathode active material dissolved in an electrolyte; an anolyte comprising a polysulfide compound dissolved in an electrolyte; and an ion-permeable separator configured to electrically insulate the anolyte from the catholyte. In some embodiments, the cathode active material may comprise a manganese-based compound that may comprise a permanganate compound, a manganate compound, or a combination thereof. In some embodiments, the manganese-based compound comprises potassium permanganate ($KMnO_4$), potassium manganate ($K_2MnO_4$), sodium permanganate ($NaMnO_4$), sodium manganate ($Na_2MnO_4$), lithium permanganate ($LiMnO_4$), lithium manganate ($Li_2MnO_4$), or any combination or mixture thereof. In some embodiments, the cathode active material comprises a mixture of $KMnO_4$ and $NaMnO_4$.

In some embodiments, the catholyte further comprises a compound configured to reduce self-discharge. In some embodiments, the compound is a bismuth oxide, an alkaline earth metal salt, or an alkaline earth metal hydroxide. In some embodiments, the catholyte is substantially nickel-free. In some embodiments, the catholyte further comprises an additive configured to sequester nickel. In some embodiments, the separator comprises a polymer and a protective layer disposed on a catholyte side of the polymer and configured to reduce oxidation of the polymer by the cathode active material. In some embodiments, the protective layer comprises manganese oxide. In some embodiments, the protective layer comprises a polyether ether ketone (PEEK), a polysulfone, a polystyrene, a polypropylene, a polyethylene, or any combination thereof. In some embodiments, the separator comprises an anion exchange membrane (AEM), a cation exchange membrane (CEM), a zwitterionic membrane, a porous membrane with average pore diameter smaller than 10 nanometers, a polybenzimidazole-based membrane, a polysulfone-based membrane, a polyetherketone-based membrane, a membrane including polymers of intrinsic microporosity (PIM), or a combination thereof. In some embodiments, the cathode active material comprises an iron-cyanide based compound, and the electrochemical cell is a static cell. In some embodiments, the iron-cyanide based compound comprises a ferrocyanide compound, ferricyanide compound, or a combination thereof. In some embodiments, the iron-cyanide based compound comprises: ferrocyanide anions $[Fe(CN)_6]^{4-}$, ferricyanide anions $[Fe(CN)_6]^{3-}$, or a combination thereof; and cations comprising $Li^+$, $K^+$, $Na^+$, or combinations thereof. In some embodiments, at least one of the catholyte and the anolyte comprises sodium thiosulfate ($Na_2S_2O_3$). In some embodiments, the cathode active material comprises a sulfur-based compound. In some embodiments, the sulfur-based compound comprises sulfur ($S_8$), lithium (poly)sulfide ($Li_2S_x$, where x=1 to 8), sodium (poly)sulfide ($Na_2S_x$, where x=1 to 8), potassium (poly)sulfides ($K_2S_x$, where x=1 to 8), or a combination thereof. In some embodiments, the cathode active material comprises a transition metal sulfide. In some embodiments, the cathode active material comprises a manganese-based compound, iron-cyanide based compound, or a sulfur-based compound, and the catholyte and the anolyte are aqueous solutions having a pH at or above 10. In some embodiments, the cathode active material comprises a manganese-based compound, and the catholyte and the anolyte are aqueous solutions having a pH at or above 13. In some embodiments the concentration of the manganese-based compound is >1M (mol/L concentration), such as 2M or 5M. In some embodiments the concentration of the iron-cyanide based compound is >1M (mol/L concentration), such as 2M or 5M. In some embodiments the concentration of the sulfur-based compound is >1M (mol/L concentration), such as 2M or 5M or 10M. In some embodiments, the separator comprises an impermeable frame, and an ion-permeable membrane disposed within the frame. In some embodiments, the membrane is an anion exchange membrane that blocks cations and has a pore size configured to block both cathode and anode active material anions while permitting transition of hydroxide anions. In some embodiments, the separator comprises an impermeable frame, and an ion-permeable membrane disposed within the frame, wherein the ratio of the membrane area to the sum of the membrane and frame areas is less than about 0.8. In some embodiments, the electrochemical cell further comprises a cathode immersed in the catholyte, and an anode immersed in the anolyte. In some embodiments, the separator comprises a composite membrane comprising an inorganic material and an organic material. In some embodiments, the inorganic material comprises a metal oxide or a ceramic material. In some embodiments, the organic material comprises a polyether ether ketone (PEEK), a polysulfone, a polystyrene, a polypropylene, a polyethylene, or any combination thereof. In some embodiments, the positive electrode comprises a carbon-based material and a metal oxide coating layer configured to reduce oxidation of the carbon-based material by the cathode active material. In some embodiments, element sulfur is added periodically to the anode active material to recover capacity and rebalance the state of charge between anode and cathode. In some embodiments, an auxiliary oxygen reduction reaction (ORR) electrode can be used as a counter electrode to supply current that converts manganate to permanganate.

According to various embodiments of the present disclosure, provided is a power module comprising a stack of electrochemical cells, the electrochemical cells each comprising: a catholyte comprising a cathode active material dissolved in an electrolyte; an anolyte comprising a polysulfide compound dissolved in an electrolyte; and an ion-permeable separator configured to electrically insulate the anolyte from the catholyte.

In some embodiments, the cathode active material comprises a manganese-based compound, iron-cyanide based compound, or a sulfur-based compound. In some embodiments, the power module further comprises: a catholyte tank fluidly connected to the electrochemical cells; and an anolyte tank fluidly connected to the electrochemical cells, wherein the catholyte flows between the catholyte tank and the electrochemical cells and the anolyte flows between the anolyte tank and the electrochemical cells, and wherein the cathode active material comprises a manganese-based compound or a sulfur-based compound. In some embodiments, the power module further comprises a pump configured to increase an oxygen pressure applied to the catholyte, wherein the cathode active material comprises a manganese-based compound. In some embodiments the tank containing the catholyte is sealed such that no pump is needed to apply additional oxygen pressure to the catholyte, as the spontaneously generated oxygen accumulates and builds up oxygen pressure to an equilibrium level of pressure. In some embodiments, the power module further comprises a plurality of catholyte tanks comprising the catholyte, wherein: the electrochemical cells are arranged in columns and rows; the electrochemical cells of each column are fluidly connected to a respective one of the catholyte tanks; and the electrochemical cells of each row are electrically connected to one other. In some embodiments, the separator comprises: an impermeable frame; and an anion exchange membrane disposed within the frame that blocks cations and has a pore size configured to block cathode active material anions while permitting transition of hydroxide anions. In some embodiments, the electrochemical cell further comprises: a cathode immersed in the catholyte; and an anode immersed in the anolyte. In some embodiments, the separator comprises an anion exchange membrane (AEM), a cation exchange membrane (CEM), a nanofiltration membrane, an ultrafiltration membrane, a reverse osmosis membrane, a polybenzimidazole-based membrane, a membrane including polymers of intrinsic microporosity (PIM), or a combination thereof.

According to various embodiments of the present disclosure, provided is a bulk energy storage system, comprising: at least one battery comprising a stack of electrochemical cells, each electrochemical cell comprising: a catholyte comprising a cathode active material dissolved in an electrolyte; an anolyte comprising a polysulfide compound dissolved in an electrolyte; and an ion-permeable separator configured to electrically insulate the anolyte from the catholyte. In some embodiments, the cathode active material comprises a manganese-based compound, iron-cyanide based compound, or a sulfur-based compound. In some embodiments, the separator comprises: an impermeable frame; and an anion exchange membrane disposed within the frame that blocks cations and has a pore size configured to block cathode active material anions while permitting transition of hydroxide anions. In some embodiments, the electrochemical cell further comprises: a cathode immersed in the catholyte; and an anode immersed in the anolyte. In some embodiments, the separator comprises an anion exchange membrane (AEM), a cation exchange membrane (CEM), a nanofiltration membrane, an ultrafiltration membrane, a reverse osmosis membrane, a polybenzimidazole-based membrane, a membrane including polymers of intrinsic microporosity (PIM), or a combination thereof. In some embodiments, the bulk energy storage system is a long duration energy storage (LODES) system.

According to various embodiments of the present disclosure, provided is an electrical system configured to manage the variations in non-hydrocarbon based electricity generation to provide predetermined uniform distribution of electricity, the electrical system comprising: a) a means to generate electricity from non-hydrocarbon energy sources; b) a long duration energy storage system (LODES) comprising: i) a means for providing a catholyte; ii) a means for providing an anolyte; iii) the means for providing the anolyte, the means for providing the catholyte or both comprising sulfur; and iv) a means for providing an ion permeable separator disposed between the means for providing a catholyte and the means for providing an anolyte; c) electrical power transmission facilities; d) the means to generate electricity from non-hydrocarbon energy sources, the LODES and the electrical power transmission facilities, in electrical communication, whereby electricity can be transmitted therebetween; and e) the electrical system configured for electrical connection to a power grid, an industrial customer, or both.

In some embodiments, the means for providing a catholyte comprises a material selected from the group consisting of aqueous polysulfide solution, $Li_2S_x$ (where x is from 1 to 8), $Na_2S_x$ (where x is from 1 to 8), a saturated polysulfide, and elemental sulfur. In some embodiments, the means for providing an ion permeable separator comprises a material selected from the group consisting of a dielectric material, a porous material, a material permeable to hydroxide ions, a material permeable to $Li^+$, a material permeable to $K^+$, a material permeable to $Na^+$, a material permeable to $Cs^+$, a material permeable to $NH_4^+$, and a material permeable to hydroxyl ions. In some embodiments, the means for providing an ion permeable separator comprises $C_7HF_{13}O_5S$. $C_2F_4$, a sulfonated tetrafluoroethylene, or a polyolefin. In some embodiments, the means for providing an ion permeable separator is effectively impermeable to active catholyte materials, active anolyte materials or both. In some embodiments: the means for providing an ion permeable separator is impermeable to active catholyte materials, active anolyte materials or both; and the active catholyte or the active anolyte materials are selected from the group consisting of sulfur, polysulfides, sulfides, ferrocyanides and permanganates. In some embodiments: the means for providing an ion permeable separator is impermeable to active catholyte materials, active anolyte materials or both; and the active catholyte or the active anolyte materials are selected from the group consisting of sulfur, polysulfides, sulfides, ferrocyanides and permanganates. In some embodiments, the catholyte comprises an alkaline material. In some embodiments, the catholyte comprises an electro positive material. In some embodiments, the alkaline material comprises a material selected from the group consisting of NaOH, LiOH, KOH, and $NH_4OH$. In some embodiments, the electro positive material comprises an electropositive element selected from the group consisting of $Li^+$, $K^+$, $Na^+$, and $NH_4^+$. In some embodiments, the anolyte comprises an alkaline material. In some embodiments, the anolyte comprises an electro positive material. In some embodiments, the alkaline material comprises a material selected from the group consisting of NaOH, LiOH, KOH, and $NH_4OH$. In some embodiments, the electro positive material comprises an electropositive element selected from the group consisting of $Li^+$, $K^+$ and $Na^+$, and $NH_4^+$. In some embodiments, the means for providing an anolyte comprises an anode active material selected from the group consisting of a sulfide, a polysulfide a sulfide salt, a polysulfide salt, lithium polysulfides ($Li_2S_x$, where x=1 to 8), sodium polysulfides ($Na_2S_x$, where x=1 to 8) and potassium polysulfides ($K_2S_x$, where x=1 to 8). In some embodiments, the means for providing an anolyte comprises an anode active material selected from the group consisting of a sulfide, a polysulfide a sulfide salt, a polysulfide salt, lithium polysulfides ($Li_2S_x$, where x=1 to 8), sodium polysulfides ($Na_2S_x$, where x=1 to 8) and potassium polysulfides ($K_2S_x$, where x=1 to 8). In some embodiments, the means for providing a catholyte comprises a cathode active material. In some embodiments, the catholyte defines a catholyte volume and the anolyte defines an anolyte volume, and the catholyte volume is about 1.5 to about 4 times larger than the anolyte volume. In some embodiments, the catholyte defines a catholyte volume and the anolyte defines an anolyte volume, and the catholyte volume is about 1.5 to about 4 times larger than the anolyte volume. In some embodiments, the catholyte defines a catholyte volume and the anolyte defines an anolyte volume, and the catholyte volume is about 1.5 to about 4 times larger than the anolyte volume. In some embodiments, the means to generate electricity from non-hydrocarbon energy sources is selected from the group consisting of a wind farm, a thermal power plant, and a solar power plant. In some embodiments, the LODES has a duration of about 24 hours to about 500 hours, and a power rating of from about 10 MW to about 50 MW. In some embodiments, the LODES has a duration of about 8 hours to about 2000 hours, and a power rating of from about 0.5 MW to about 500 MW. In some embodiments, the LODES has a duration of about 8 hours to about 100 hours, and a power rating of from about 0.5 MW to about 500 MW. In some embodiments, the LODES has a duration of about 24 hours to about 500 hours, and a power rating of from about 10 MW to about 50 MW. In some embodiments, wherein the LODES has a round trip efficiency of at least about 70% to about 85%, at a rated power density of at least about 11 $mW/cm^2$. In some embodiments, the LODES has a round trip efficiency of from about 50% to about 85%, at a rated power density of from about 9 $mW/cm^2$ to about 30 $mW/cm^2$. In some embodiments, the LODES has a round trip efficiency of from about 65% to about 75%, at a rated power density of from about 11 $mW/cm^2$ to about 24 $mW/cm^2$. In some embodiments, the system includes a hydrocarbon based electrical power plant, an atomic energy based electric power plant, or both.

According to various embodiments of the present disclosure, provided is a method of operating an electrical system configured to manage the variations in non-hydrocarbon based electricity generation to provide predetermined uniform distribution of electricity; the method comprising transferring electricity into a long duration energy storage system (LODES), storing the electricity in the LODES, transferring the electricity out of the LODES; wherein the electrical system comprises: a) a means to generate electricity from non-hydrocarbon energy sources; b) the LODES comprising: i) a means for providing a catholyte; ii) a means for providing an anolyte; iii) the means for providing the anolyte, the means for providing the catholyte or both comprising sulfur; and iv) a means for providing an ion permeable separator disposed between the means for providing a catholyte and the means for providing an anolyte; c) electrical power transmission facilities; d) the means to generate electricity from non-hydrocarbon energy sources, the LODES and the electrical power transmission facilities, in electrical communication, whereby electricity can be transmitted therebetween; and e) the electrical system configured for electrical connection to a power grid, an industrial customer or both.

DETAILED DESCRIPTION

Figure 1A:
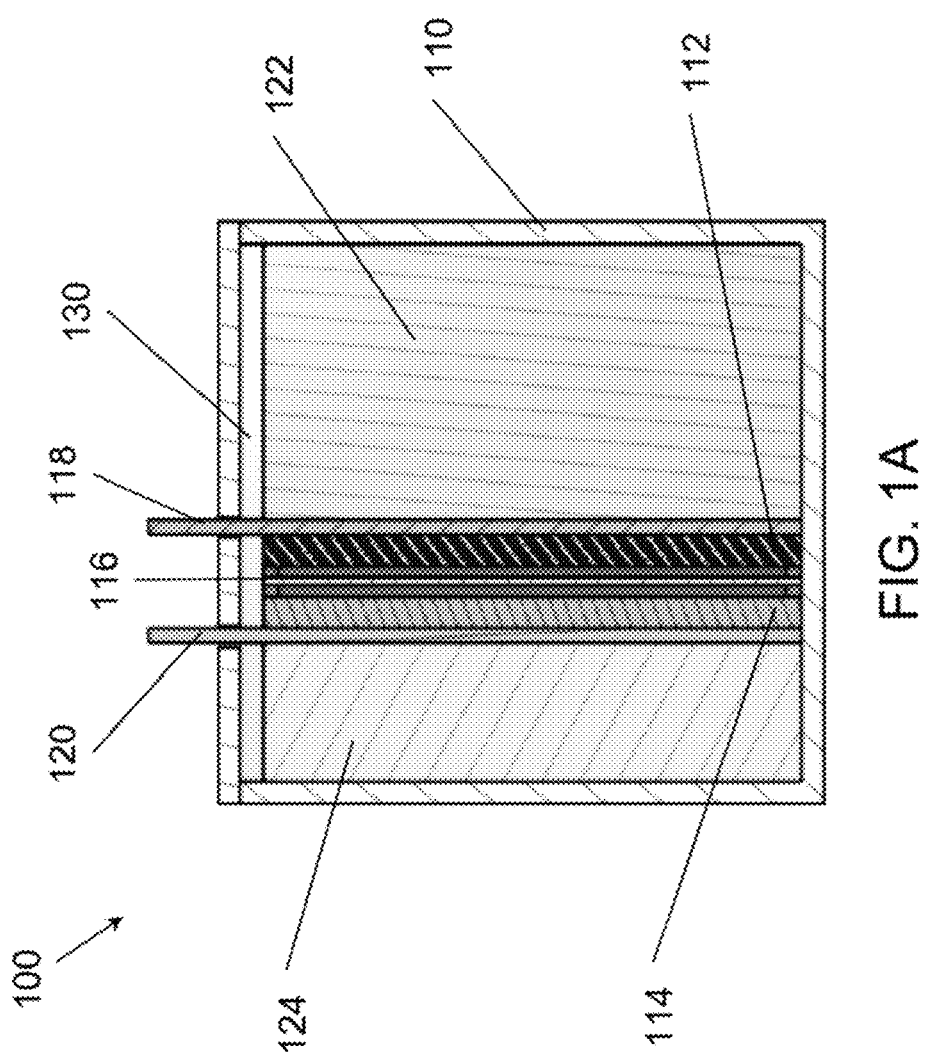
FIG. 1A is a schematic of an electrochemical cell, according to various embodiments of the present disclosure with a static (non-flowing) cell architecture.

The various embodiments will be described in detail with reference to the accompanying drawings. Wherever possible, the same reference numbers will be used throughout the drawings to refer to the same or like parts. References made to particular examples and implementations are for illustrative purposes and are not intended to limit the scope of the claims. The following description of the embodiments of the invention is not intended to limit the invention to these embodiments but rather to enable a person skilled in the art to make and use this invention. Unless otherwise noted, the accompanying drawings are not drawn to scale.

As used herein, unless stated otherwise, room temperature is 25° C. And, standard temperature and pressure is 25° C. and 1 atmosphere. Unless expressly stated otherwise all tests, test results, physical properties, and values that are temperature dependent, pressure dependent, or both, are provided at standard ambient temperature and pressure.

Generally, the term "about" as used herein unless specified otherwise is meant to encompass a variance or range of ±10%, the experimental or instrument error associated with obtaining the stated value, and preferably the larger of these.

As used herein unless specified otherwise, the recitation of ranges of values herein is merely intended to serve as a shorthand method of referring individually to each separate value falling within the range. Unless otherwise indicated herein, each individual value within a range is incorporated into the specification as if it were individually recited herein.

The following examples are provided to illustrate various embodiments of the present systems and methods of the present inventions. These examples are for illustrative purposes, may be prophetic, and should not be viewed as limiting, and do not otherwise limit the scope of the present inventions.

It is noted that there is no requirement to provide or address the theory underlying the novel and groundbreaking processes, materials, performance or other beneficial features and properties that are the subject of, or associated with, embodiments of the present inventions. Nevertheless, various theories are provided in this specification to further advance the art in this area. The theories put forth in this specification, and unless expressly stated otherwise, in no way limit, restrict or narrow the scope of protection to be afforded the claimed inventions. These theories many not be required or practiced to utilize the present inventions. It is further understood that the present inventions may lead to new, and heretofore unknown theories to explain the function-features of embodiments of the methods, articles, materials, devices and system of the present inventions; and such later developed theories shall not limit the scope of protection afforded the present inventions.

The various embodiments of systems, equipment, techniques, methods, activities and operations set forth in this specification may be used for various other activities and in other fields in addition to those set forth herein. Additionally, these embodiments, for example, may be used with: other equipment or activities that may be developed in the future; and, with existing equipment or activities which may be modified, in-part, based on the teachings of this specification. Further, the various embodiments and examples set forth in this specification may be used with each other, in whole or in part, and in different and various combinations. Thus, for example, the configurations provided in the various embodiments of this specification may be used with each other; and the scope of protection afforded the present inventions should not be limited to a particular embodiment, configuration or arrangement that is set forth in a particular embodiment, example, or in an embodiment in a particular figure.

An electrochemical cell, such as a battery, stores electrochemical energy by separating an ion source and an ion sink at differing ion electrochemical potentials. A difference in electrochemical potential produces a voltage difference between the positive and negative electrodes; this voltage difference will produce an electric current if the electrodes are connected by a conductive element. In a battery, the negative electrode and positive electrode are connected by external and internal conductive elements in parallel. Generally, the external element conducts electrons, and the internal element (electrolyte) conducts ions. Because a charge imbalance cannot be sustained between the negative electrode and positive electrode, these two flow streams supply ions and electrons at the same rate. In operation, the electronic current can be used to drive an external device. A rechargeable battery can be recharged by application of an opposing voltage difference that drives an electronic current and ionic current in an opposite direction as that of a discharging battery in service.

Embodiments of the present invention include apparatus, systems, and methods for long-duration, and ultra-long-duration, low-cost, energy storage. Herein, "long duration" and/or "ultra-long duration" may refer to periods of energy storage of 8 hours or longer, such as periods of energy storage of 8 hours, periods of energy storage ranging from 8 hours to 20 hours, periods of energy storage of 20 hours, periods of energy storage ranging from 20 hours to 24 hours, periods of energy storage of 24 hours, periods of energy storage ranging from 24 hours to a week, periods of energy storage ranging from a week to a year (e.g., such as from several days to several weeks to several months), etc. In other words, "long duration" and/or "ultra-long duration" energy storage cells may refer to electrochemical cells that may be configured to store energy over time spans of days, weeks, or seasons. For example, the electrochemical cells may be configured to store energy generated by solar cells during the summer months, when sunshine is plentiful and solar power generation exceeds power grid requirements, and discharge the stored energy during the winter months, when sunshine may be insufficient to satisfy power grid requirements.

According to various embodiments, an electrochemical cell includes a catholyte, an anolyte, and a separator disposed between the cathode and anode and that is permeable to the at least one metal ion. According to various embodiments, an electrochemical cell includes a catholyte, an anolyte, and a separator disposed between the cathode and anode and that is permeable to the at least one metal ion or the hydroxide ion. The catholyte may be an aqueous solution containing one or more permanganate compounds dissolved in a liquid. The catholyte may include sulfur and the anolyte may include sulfide or polysulfide. The anolyte may be an aqueous solution which contains one or more polysulfide compounds. Optionally, there may be a cathode and/or an anode, which are solid electrodes, upon which surfaces the positive and negative electrode reactions are conducted. The cathode may be immersed in the catholyte and the anode may be immersed in the anolyte.

In various embodiments, a polysulfide battery may include an aqueous liquid catholyte contacting a cathode current collector in a cathode chamber, an aqueous liquid anolyte contacting an anode current collector in an anode chamber, and a separator separating the catholyte in the cathode chamber from the anolyte in the anode chamber. In various embodiments, the anolyte may include an aqueous polysulfide solution (AqS), such as $Li_2S_x$ and/or $Na_2S_x$ solution, in which x ranges from 1 to 8 (e.g., $Li_2S$ and/or $Na_2S$ when x=1). In various embodiments, the battery may be a flow battery (i.e., flowing battery, which is also sometimes called a regenerative fuel cell) containing a pump which circulates the catholyte and/or the anolyte, or a non-flowing battery which lacks the circulation pump, or a semi-flow battery in which only one of the anolyte or catholyte is circulated while the other is static.

In some embodiments, both the anolyte (or anode) and the catholyte (or cathode) may maintain a solid-liquid equilibrium and may be configured to maintain saturated polysulfide species in a liquid. That is, at very low electrochemical cycling rates, liquid saturation may be maintained by dissolving the solid. In various embodiments where the battery may include $S_8$—$Li_2S_8$ as the catholyte and $Li_2S$—$Li_2S_4$ as the anolyte, the battery may have an open current voltage (OCV) of about 0.45V or higher, depending on the concentration of sulfur. In addition, such an embodiment battery may have a high energy density because energy storage may occur in precipitated sulfur species and is therefore not limited by the solubility of sulfur or sulfide in the liquid electrolyte.

FIG. 1A is a schematic view of an aqueous polysulfide-based electrochemical cell 100, according to various embodiments of the present disclosure in which the anolyte and catholyte are static (non-flowing). Referring to FIG. 1A, the cell 100 includes a housing 110 in which are disposed a positive electrode 112 or cathode, a negative electrode 114 or anode, a separator 116 disposed between the cathode 112 and the anode 114, a catholyte 122, and an anolyte 124.

The housing 110 may be formed of a polymer, such as high-density polyethylene, polypropylene, or the like. The housing 110 may include a first chamber in which the catholyte 122 is disposed, and a second chamber in which the anolyte 124 is disposed. In some embodiments, the housing 110 may be configured to contain from about 600 liters (L) to about 1200 L of the catholyte 122, such as about 900 L, and from about 1000 L to about 1500 L of the anolyte 124, such as about 1250 L. In other words, the cell 100 may include a first volume of the catholyte 122 and a second volume of the anolyte 124, with the second volume ranging from about one times to about two times, such as about 1.3 times to about 1.7 times, the first volume. In some embodiments, the housing 110 may be configured to contain from about 3500 L to about 4000 L of the catholyte 122, such as about 3750 L, and from about 1000 L to about 1500 L of the anolyte 124, such as about 1250 L. In other words, the cell 100 may include a first volume of the catholyte 122 and a second volume of the anolyte 124, with the first volume ranging from about 2 times to about four times, such as about three times, the second volume.

The cell 100 may include one or more gaskets 130 configured to seal the cathode 112, anode 114, separator 116, catholyte 122, and anolyte 124 in the housing 110. For example, the gaskets 130 may be formed of a rubber material, such as ethylene propylene diene monomer (EPDM) or the like. As the cathode 112, anode 114, separator 116, catholyte 122, and anolyte 124 may be sealed in the housing 110, the cell 100 may be a static cell.

The separator 116 may be formed of a dielectric material, or a porous material, that is permeable to positive ions, such as $Li^+$, $K^+$, $Na^+$, $Cs^+$, and/or $NH_4^+$ ions, or negative ions, such as hydroxide ions. The separator 116 may be impermeable or effectively impermeable to active materials of the catholyte and anolyte 122, 124, such as sulfur, polysulfides, ferrocyanides, and/or permanganates. Herein "effectively impermeable" refers to a separator that prevents crossover of at least 90%, such as at least 95%, at least 97%, at least 98%, or at least 99% of active materials for a time period ranging from about 1 month to about 1 year. In some embodiments, the separator 116 may be permeable to anions such as hydroxyl ($OH^-$) ions. In some embodiments, the separator 116 may be a membrane, such as a membrane formed from a polymer with a tertrafluoroethylene backbone and side chains of perfluorovinyl ether groups terminated with sulfonate groups (e.g., a sulfonated tetrafluoroethylene membrane, a membrane made of $C_7HF_{13}O_5S$. $C_2F_4$, a membrane made of polymers sold under the Nafion brand name, etc.) or the like. For example, the separator 116 may comprise a porous polyolefin film, a glass fiber mat, a cotton fabric, a rayon fabric, cellulose acetate, paper, or the like.

A cathode current collector 118 may be electrically connected to the cathode 112, and an anode current collector 120 may be electrically connected to the anode 114. The current collectors 118, 120 may be formed of a conductive material, such as stainless steel, carbon, titanium, combinations thereof, or the like. The thickness of current collectors 118, 120 may range from about 0.05 cm to about 0.5 cm, such as from about 0.1 cm to about 0.3 cm, or about 0.2 cm.

The cathode 112 may include a conductive layer having a high surface area, such as a carbon felt layer or nickel foam layer, and may be disposed between the cathode current collector 118 and the separator 116. The cathode 112 may be configured to facilitate electrochemical reactions with the active materials of the catholyte 122. The cathode 112 may be non-flowing. In certain embodiments the catholyte 122 may be quiescent. In certain other embodiments, the catholyte 122 may be stirred to promote more rapid mass-transport.

The anode 114 may include a conductive high surface area layer, such as a nickel foam or nickel felt layer, and may be disposed between the anode current collector 120 and the separator 116. The anode 114 may be configured to facilitate electrochemical reactions with the active materials of the anolyte 124. The anode 114 may be non-flowing. In certain embodiments the anolyte 124 may be quiescent. In certain other embodiments, the anolyte 124 may be stirred to promote more rapid mass-transport.

The catholyte and anolyte 122, 124 may include alkaline slurries, suspensions, solutions, or mixtures of solids and solutions. The catholyte and anolyte 122, 124 may both include an electropositive element, such as $Li^+$, $K^+$, $Na^+$, or combinations thereof. For example, it has been found that including multi-valent electropositive elements, such as a combination of $Li^+$, $K^+$, and/or $Na^+$, may increase cell potential and decrease the crossover of redox ions, such as polysulfide, permanganate, and/or ferrocyanide compounds. When the catholyte and anolyte 122, 124 are fully soluble, the ionic conductivity is maximized, allowing for the thickness of the anolyte and catholyte chambers to be maximized. When the catholyte 122 and anolyte 124 are slurries, comprised of mixtures of solid and liquid phases, the energy density per unit volume is increased, but at the cost of diminished ion-phase transport.

An alkaline agent may be added to the catholyte and anolyte 122, 124 in an amount sufficient to provide a pH of at least 9, such as a pH ranging from about 9 to about 14, such as a pH ranging from about 13 to about 14. In some embodiments, the alkaline agent may be, for example, a strong base such as NaOH, LiOH, KOH, or the like. In some embodiments, the alkaline agent may be a mixture of such strong bases, such as a mixture of NaOH and LiOH, or a mixture of NaOH and KOH, or a mixture of NaOH, LiOH, and KOH. In some embodiments, dissociation of the alkaline agent may provide the electropositive element. In other embodiments, a salt comprising the electropositive element may be added to the catholyte and anolyte 122, 124.

The catholyte 122 may include a cathode active material (e.g., a material configured to adsorb and desorb working ions such as $Li^+$, $Na^+$, and $K^+$) dissolved in an electrolyte, such as aqueous electrolyte, and the anolyte 124 may include an anode active material dissolved in an electrolyte, such as an aqueous electrolyte.

For example, the anode active material may include a sulfide or polysulfide compound or salts thereof. For example, the anode active material may include lithium polysulfides ($Li_2S_x$, where x=1 to 8), sodium polysulfides ($Na_2S_x$, where x=2 to 8) and/or potassium polysulfides ($K_2S_x$), where x=1 to 8.

The anolyte 124 may have an anode active material concentration ranging from about 4M to about 14M, such as from about 5M to about 12M, or from about 7M to about 10M. At an anolyte active material concentration of 2.5M ($S_2^{2-}$), the anolyte capacity density may be about 67.0 Ah/L. However, the present disclosure is not limited to any particular concentration of anode active material.

The catholyte 122 may have a cathode active material concentration ranging from about 0.5 mol/L (M) to about 14M. However, the cathode active material concentration may vary depending on the particular active material utilized and/or particular electrochemical cell and/or system applications. Accordingly, the present disclosure is not limited to any particular active material concentration.

Figure 1B:
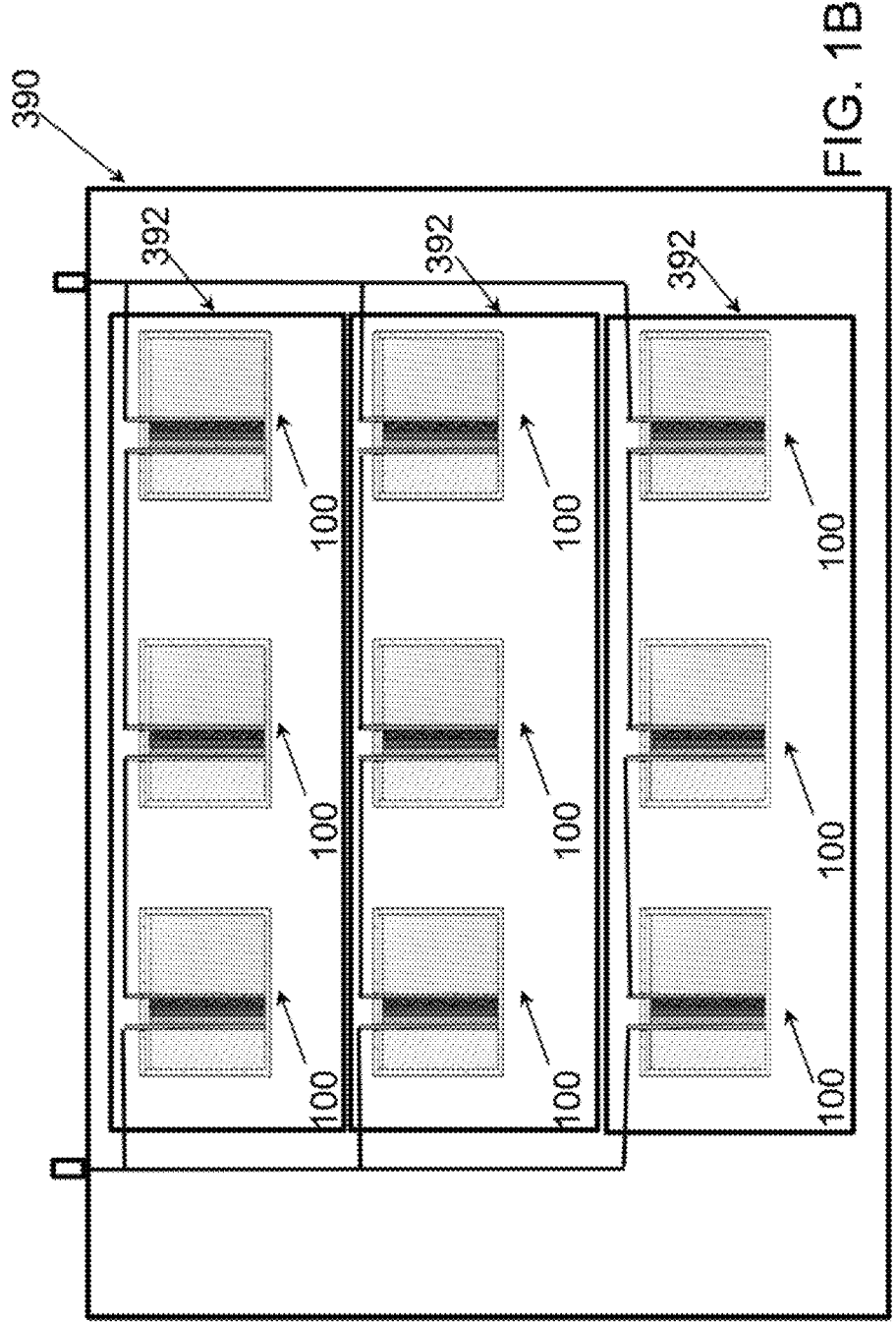
FIG. 1B is a schematic of a power module according to various embodiments based on the disclosed electrochemical cell of FIG. 1A.

FIG. 1B is a schematic view of a power module 390 according to various embodiments including multiple cells 100 connected together to form stacks 392. With reference to FIGS. 1A and 1B, the power module may include one or more stacks 392. In some embodiments, a stack 392 may include one cell 100. In some embodiments, a plurality of electrochemical cells 100 may be connected in series to form a stack 392. In some embodiments, the stack 392 may include or may include cells 100, such as two (2) to one hundred (100) cells 100, or for example, fifty (50) cells 100, twenty-two (22) cells 100, etc. In various embodiments, the stack 300 may be comprised of four (4) to twenty (20) cells 100, such as six (6) cells 100. For example, the stacks 392 illustrated in FIG. 1B are shown including three (3) cells 100. While illustrated as including three (3) cells 100, the stacks 392 may include more or less cells 100. In some embodiments, a stack 392 may have a round trip efficiency (i.e., the amount of energy that a storage system can deliver relative to the amount of energy injected into the system during the immediately preceding charge) of at least 75% at a rated power density of about 24 $mW/cm^2$. In some embodiments, a stack 392 may have a 12 $mW/cm^2$ power density and an area specific resistance (ASR) of about 4.2 $\Omega\text{-}cm^2$, or less. Such a stack 392 may have a self-discharge rate of about 0.5% per week, or less.

In some embodiments, a plurality of stacks 392, such as two or more stacks 392, may be electrically connected together in parallel to form a power module 390. For example, FIG. 1B illustrates three (3) stacks 392 connected in parallel to form a power module 390. While illustrated as including three (3) stacks 392, the power module 390 may include more or less stacks 392. As one example, thirty-two (32) of stacks 392 may be electrically connected in parallel to form a power module 390, which may have a rated power of 7.6 kW. The nominal module voltage and current of such a thirty-two (32) stack 392 module 390 may be 10V and 800 A, respectively, which may enable using low-cost power electronics for the stack 392 electrical system.

In various embodiments, the power module 390 and/or stack(s) 392 may be connected to additional balance of plant elements, such as an inverter, heat exchanger, etc. However, hydraulic elements, such as system pumps and auxiliary reservoirs found in conventional flow battery systems may be omitted in the power module 390 and/or stack(s) 392 according to various embodiments of the present disclosure in which the anolyte and catholyte are static (non-flowing).

Figure 2:
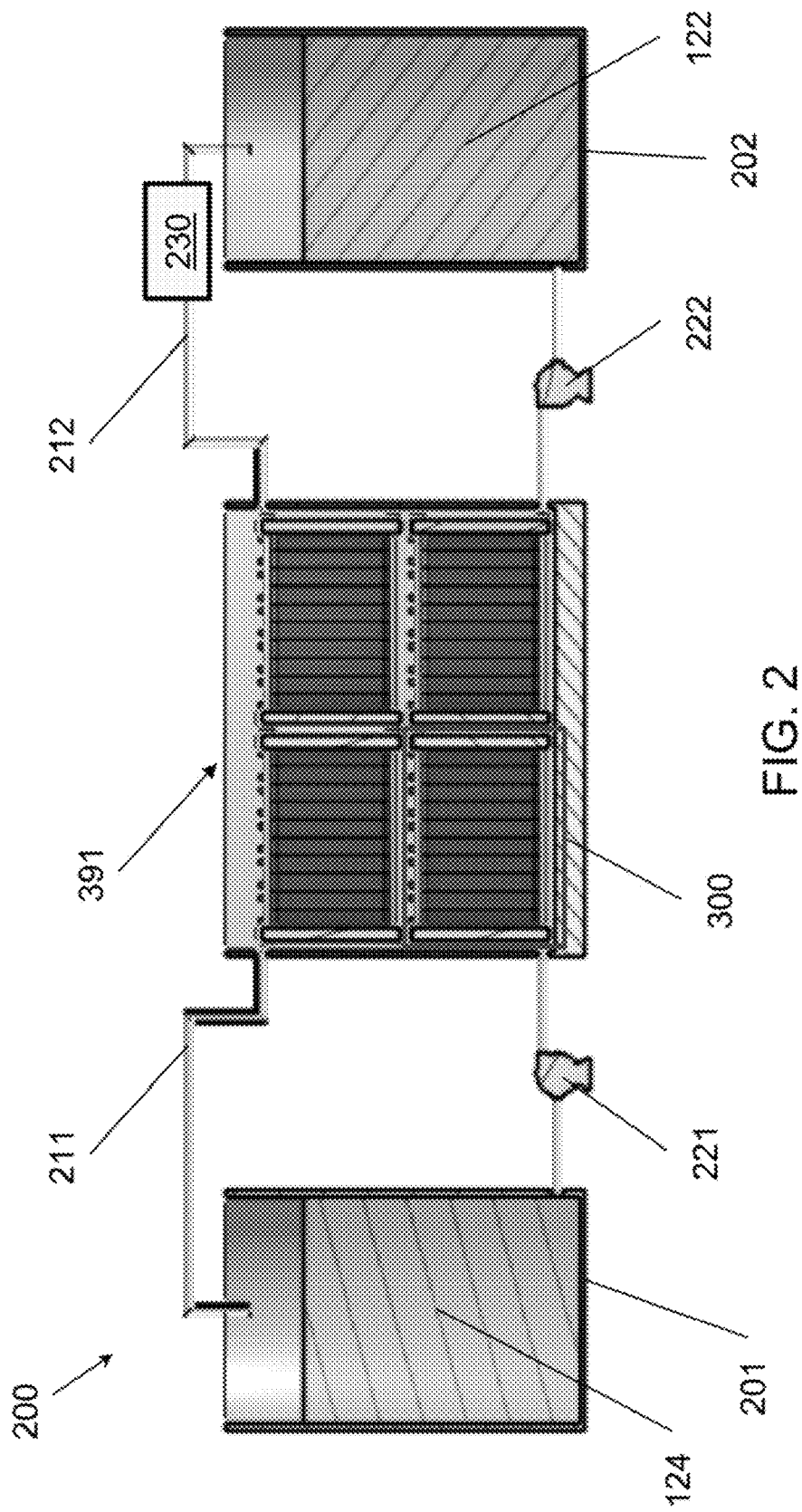
FIG. 2 is a schematic of an energy storage system, based on the disclosed electrochemical cell, according to various embodiments of the present disclosure with a flow battery (flowing) architecture.

FIG. 2 is a schematic view of an aqueous polysulfide-based electrochemical cell system 200, according to various embodiments of the present disclosure, in which the system uses a flowing anolyte 124 and catholyte 122. Referring to FIG. 2, the system 200 includes an anolyte tank 201 in which the anolyte 124 is disposed and a catholyte tank 202 in which the catholyte 122 is disposed. The catholyte 122 and anolyte 124 may include anode and cathode active materials as discussed above with regard to FIG. 1A.

The system further comprises anolyte tubing 211 and catholyte tubing 212, through which the anolyte and catholyte, respectively, are induced to flow, by anolyte pump 221 and catholyte pump 222. The system 200 includes electrochemical cell stacks 300 into which the anolyte 124 and catholyte 122 are pumped, to allow the electrochemical reactions to occur. The system 200 may include any suitable number of stacks 300, which may be electrically connected in parallel or series, for example. The connected stacks 300 may form a power module 391.

Figure 3A:
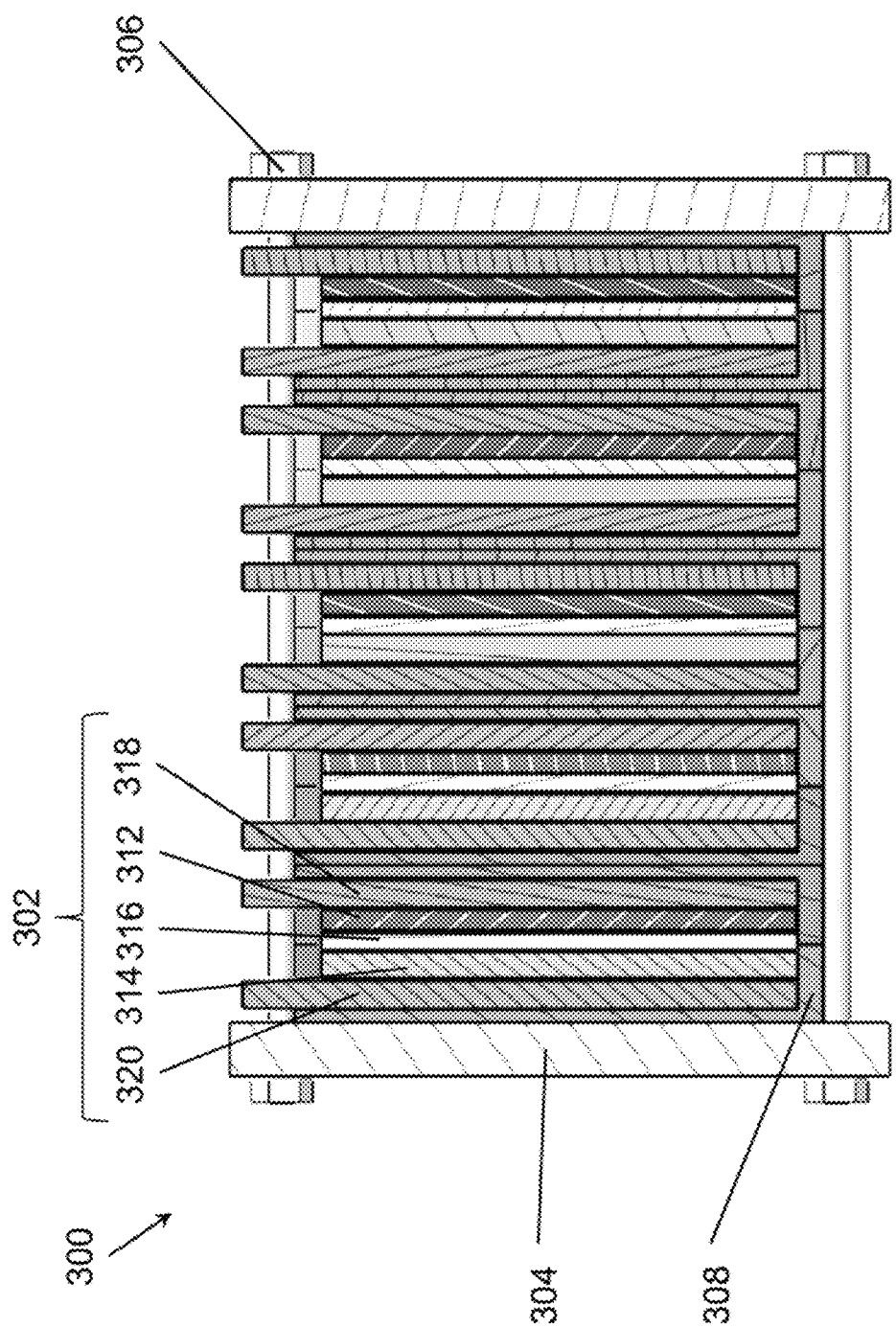
FIGS. 3A and 3B are schematic views of battery stacks that may be used in an energy storage system, such as the system of FIG. 2, according to various embodiments of the present disclosure.

FIG. 3A is a schematic view of an electrochemical cell stack 300, according to various embodiments of the present disclosure. In some embodiments, the stack 300 may be configured as a flow type cell uses a flowing anolyte 124 and catholyte 122. For example FIG. 2 illustrates the stack 300 in use in flow type system 200. However, the stack 300 is not limited to flow type uses, and in other embodiments, the stack 300 may be static type cell in which the anolyte 124 and catholyte 122 do not flow. Referring to FIGS. 2 and 3A, the stack 300 includes a housing (or frame) 304 in which one or more unit cells 302 are disposed. For example, the stack 300 may include only one unit cell 302 in some embodiments. In other embodiments, the stack 300 may include multiple unit cells 302, such as two (2) to one hundred (100) unit cells 302, or for example, fifty (50) unit cells 302, twenty-two (22) unit cells 302, etc. In various embodiments, the stack 300 may be comprised of four (4) to twenty (20) unit cells 302, such as six (6) unit cells 302. A plurality of such stacks 300 may be electrically connected in parallel to form a power module (e.g., the power module 391 in a flow configuration or a different power module in a static configuration). The power module and/or stack(s) 300 may be connected to additional balance of plant elements, such as an inverter, heat exchanger, etc. However, hydraulic elements, such as system pumps and auxiliary reservoirs found in conventional flow battery systems may be omitted when the power module and/or a stack(s) 300 are used in static battery systems.

Each unit cell 302 may include a positive electrode 312 or cathode, a negative electrode 314 or anode, a separator 316 disposed between the cathode 312 and the anode 314, a cathode current collector 318, and an anode current collector 320. In some embodiments, the electrodes 312, 314 may include conductive high surface area materials, such as a nickel foam or nickel mesh or a carbon felt.

The stack 300 may include gaskets 308 configured to at least partially seal each unit cell 302. For example, the gaskets 308 may be formed of a rubber material, such as ethylene propylene diene monomer (EPDM) or the like. The separator 316 may be formed of a dielectric material permeable to positive ions. For example, the separator 316 may comprise a porous polyolefin film, a glass fiber mat, a cotton fabric, a rayon fabric, cellulose acetate, paper, or the like.

The housing (or frame) 304 may be formed of a polymer, such as high-density polyethylene (HDPE), polypropylene (PP), or the like. In other embodiments, the housing (or frame) 304 may be formed of a metallic material, such as steel, stainless steel, aluminum, or the like. The housing (or frame) 304 may include tension rods 306 configured to apply pressure to the cells 302 via the housing (or frame) 304. In this manner, the tension rods 306 and housing (or frame) 304 together may act as a biasing device. The tension rods 306 may be formed of an electrically conductive material. In some embodiments, the current collectors 318, 320 may be electrically connected to the tension rods 306, such that the cells 302 are electrically connected in series.

In some embodiments, the cells 302 may be arranged in the stack 300 in one or more cell repeat units. In a stack 300, the number of unit cells 302 may be adjusted to tune variously the absolute current, in Amperes, or voltage, in Volts, or power, in Watts, of the system. In certain embodiments the unit cells 302 may be connected electrically in parallel or in series, to add either voltage or current. In certain embodiments the unit cells 302 may be connected in a combination of parallel and series. In certain embodiments the unit cells 302 may be connected hydraulically in parallel or in series, or in mixed parallel/series configurations.

The current collectors 318, 320 may be formed of a conductive material, such as stainless steel, carbon, titanium, combinations thereof, or the like. The thickness of the current collector 318, 320 may range from about 0.05 cm to about 0.5 cm, such as from about 0.1 cm to about 0.3 cm, or about 0.2 cm. In some embodiments, the current collectors 318, 320 may be at least partially porous.

During charging and discharging, various anode active material species, such as sulfur species, may be reversibly formed at the anodes 314, and various cathode active material species, such as sulfur, polysulfides, ferrocyanide, permanganate, and/or manganate species may be reversibly formed at the cathodes 312, in order to store and discharge power.

Figure 3B:
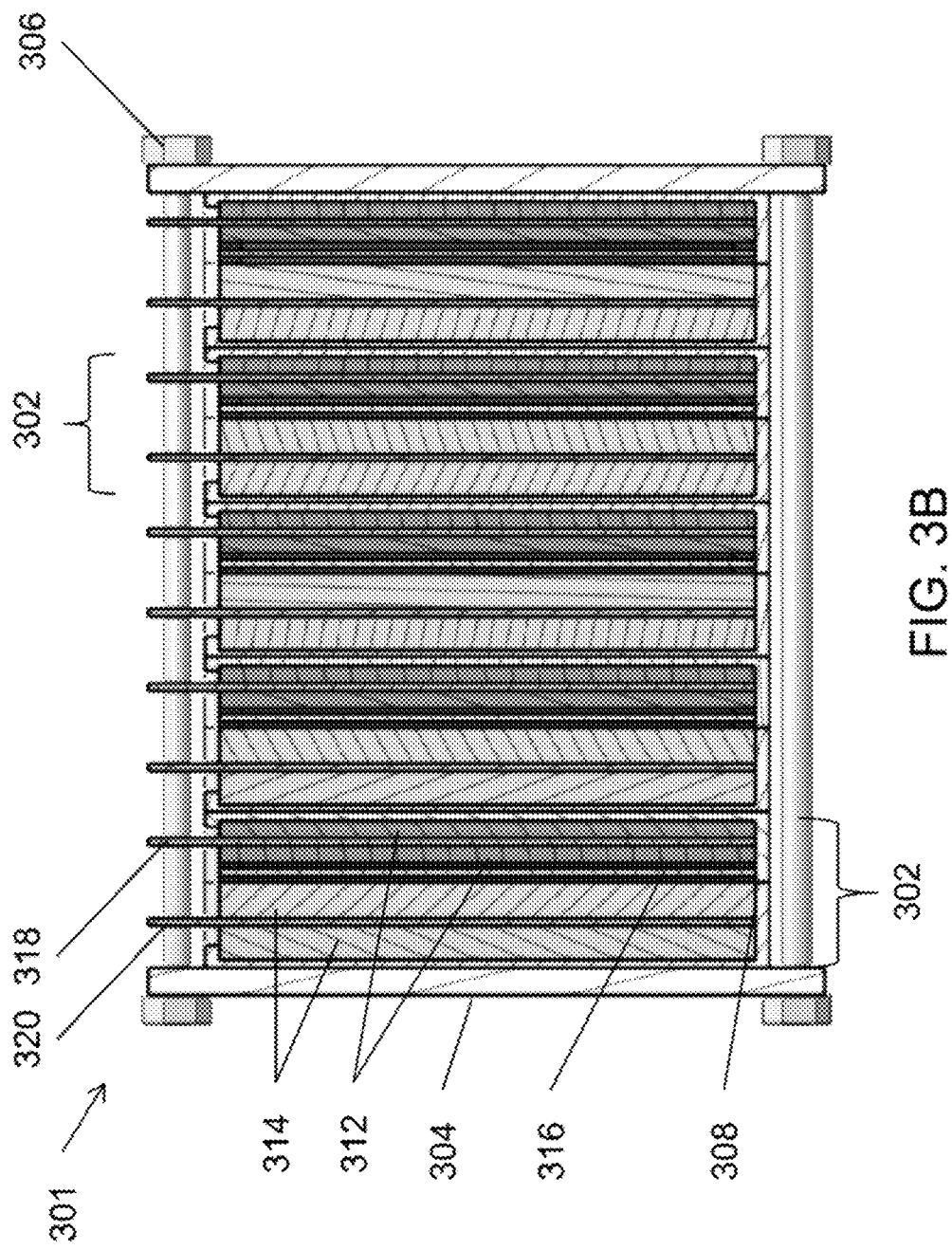

FIG. 3B is a schematic view of an alternative electrochemical cell stack 301 that may be used in place of one or more of the stacks 300, according to various embodiments of the present disclosure. In some embodiments, the stack 301 may be configured as a flow type cell uses a flowing anolyte 124 and catholyte 122. However, the stack 301 is not limited to flow type uses, and in other embodiments, the stack 300 may be static type cell in which the anolyte 124 and catholyte 122 do not flow. The stack 301 is similar to the stack 300, so only the differences therebetween will be discussed in detail.

Referring to FIG. 3B, the stack 301 includes cathodes 312 that are each disposed on opposing sides of cathode current collectors 318, and anodes 314 disposed on opposing sides of anode current collectors 320. In particular, the current collectors 318, 320 may be immersed in or coated on opposing sides respectively with a cathode material and an anode material. Accordingly, the amount of cathode and anode material in each cell 302 may be increased, as compared to the cells 302 of the stack 300. Similar to stack 300 described above, stack 301 may include may include only one unit cell 302 in some embodiments. Similarly, in other embodiments, the stack 301 may include or may include multiple unit cells 302, such as two (2) to one hundred (100) unit cells 302, or for example, fifty (50) unit cells 302, twenty-two (22) unit cells 302, etc. In various embodiments, the stack 301 may be comprised of four (4) to twenty (20) unit cells 302, such as six (6) unit cells 302. In one example, the stack 301 may have twenty-two (22) unit cells 302 connected in series. In such an example stack 301, may have a round trip efficiency of at least 79% at a rated power density of about 11 milliwatts per square centimeter (mW/cm$^2$). As another example, the stack 301 may have a 12 mW/cm$^2$ power density and an area specific resistance (ASR) of about 4.2 Ω-cm$^2$, or less. Such an example stack 301 may have a self-discharge rate of about 0.5% per week, or less. A plurality of such stacks 301 may be electrically connected in parallel to form a power module (e.g., the power module 391 in a flow configuration or a different power module in a static configuration). For example, when thirty-two (32) stacks 301 may be electrically connected in parallel to form a power module, such an example power module may have a rated power of 7.6 kW. The nominal module voltage and current of such an example power module may be 10V and 800 A, respectively, which may enable the use of low-cost power electronics for the stack electrical system. The power module and/or stack(s) 301 may be connected to additional balance of plant elements, such as an inverter, heat exchanger, etc. However, hydraulic elements, such as system pumps and auxiliary reservoirs found in conventional flow battery systems may be omitted when the power module and/or a stack(s) 301 are used in static battery systems.

According to various embodiments (for example any of the cells 100, 302 and/or stacks 392, 300, 301) of the present disclosure, a separator or membrane may be used as the "physical barrier" or "container" of either the catholyte or anolyte. The membrane or separator may serve as all or part of the "wall of the container". In various embodiments, the membrane or separator may be a pliable form, such as a bag. Such a modular membrane-bag cell may be placed in a pool of counter electrolyte during battery operation in either floating or submerging fashion.

Manganese-Based Cathode Active Materials

In various embodiments (for example any of the cells 100, 302 and/or stacks 392, 300, 301), the cathode active material may include one or more manganese-based compounds. Herein, a "manganese-based compound" cathode active material is intended to encompass compounds including permanganate anions $MnO_4^-$, and compounds including manganate anions $MnO_4^{2-}$, and salts thereof. These compounds may be referred to as aqueous permanganate compounds (AqMn) when dissolved in an aqueous electrolyte. In certain embodiments, the manganese-based compounds may be in the form of salts associated with a working ion, such as $K^+$, $Li^+$, or $Na^+$. For example, such manganese-based salts may include potassium permanganate ($KMnO_4$), potassium manganate ($K_2MnO_4$), sodium permanganate ($NaMnO_4$), sodium manganate ($Na_2MnO_4$), lithium permanganate ($LiMnO_4$), or lithium manganate ($Li_2MnO_4$). In certain embodiments, the cathode active material may include a plurality of different permanganate compounds, such as a mixture of $KMnO_4$ and $NaMnO_4$, which may be abbreviated as (K, Na)$MnO_4$.

In some embodiments (for example any of the cells 100, 302 and/or stacks 392, 300, 301), a catholyte may have a permanganate or manganate compound concentration ranging from about 0.5M to about 10M, such as from about 1M to about 5M, or from about 2M to about 4M. At a catholyte concentration of 3.5M of $MnO_4^+$ the capacity density of the catholyte 122 may be about 93.8 Ah/L. However, the present disclosure is not limited to any particular permanganate compound concentration.

Accordingly, embodiments cells and/or stacks (for example any of the cells 100, 302 and/or stacks 392, 300, 301) may include a combination of a polysulfide anolyte solution and metal permanganate catholyte solution. In various embodiments, the metal permanganate catholyte may be an alkali permanganate catholyte, such as sodium permanganate (e.g., $NaMnO_4$), potassium permanganate and/or lithium permanganate catholyte solution. In various embodiments, the polysulfide anolyte solution may be a sodium polysulfide as an active material. In various embodiments, the anolyte and catholyte may be aqueous alkaline (i.e., pH>7) solutions.

For example, with regard to cells that include the permanganate compounds as a cathode active material, the positive electrode reaction, which occurs in the catholyte during discharging, may be written as: $MnO_4^- + e^- \rightarrow MnO_4^{2-}$, with a half cell reaction of $E^0 = +0.60$ V vs. standard hydrogen electrode (SHE). The negative electrode reaction, which occurs in the anolyte 124 during discharging, may be written as: $2S_2^{2-} \rightarrow S_4^{2-} + 2e^-$, with a half cell reaction of: $E^0 = -0.45$ V vs. SHE, giving a net cell discharge reaction of $2S_2^{2-} + 2MnO_4^- \rightarrow 2MnO_4^{2-} + S_4^{2-}$ with a full cell voltage of 1.05 V. In certain embodiments where $Na^+$ is used as a working ion of the electrolyte, the net cell reaction may be expressed as $2Na_2S_2 + 2NaMnO_4 \rightarrow 2Na_2MnO_4 + Na_2S_4$, with the charged state materials on the left and the discharged state materials on the right.

In various embodiments, permanganate compound active materials in the aqueous catholyte 122 may be unstable in alkaline conditions. For example, permanganate compounds may self-discharge and/or decay to form a solid precipitate. The solid precipitate may comprise solid manganese oxide (e.g., $MnO_2$) that is precipitated from the permanganate catholyte 122. For example, permanganate cells may self-discharge through the following reaction: $4MnO_4^- + 4OH^- \rightarrow 4MnO_4^{2-} + 2H_2O + O_2$. For example permanganate cells may decay through the following reaction: $3MnO_4^{2-} + 2H_2O \rightarrow 2MnO_4^- + MnO_2 + 4OH^-$.

Accordingly, the self-discharge may result in unbalanced capacity between an AqMn catholyte 122 and an AqS anolyte 124. According to various embodiments of the present disclosure, this unbalanced capacity may be addressed by rebalancing the catholyte 122 and anolyte 124 capacities. For example, anolyte capacity may be reduced by periodically adding oxidation agents to the anolyte 124, such as elemental sulfur (i.e., zero-valent sulfur ($S^0$)). As a result, the state of charge (SoC) of the anolyte 124 may be reduced and a consistent ratio of catholyte to anolyte energy density may be maintained. Excess electrolyte may be drained from the anolyte 124 in order to maintain anolyte volume.

In some embodiments, the unbalanced capacity may be addressed by configuring an auxiliary cell in which the negative electrode is configured to perform the oxygen reduction reaction (ORR): $O_2 + H_2O + 4e^- \rightarrow 4OH^-$, while the AqMn catholyte is used as the positive electrode. For example, the anolyte may be a 6M NaOH aqueous solution and anode may be an ORR electrode such as a carbon support decorated with a manganese oxide catalyst. In various other embodiments ORR catalyst include any one or more of iron nickel, platinum, silver, etc., or metal oxide catalysts, such as manganese oxide ($MnO_2$), nickel oxide ($NiO_x$), nickel oxyhydroxide ($NiO_x(OH)_y$), iron oxide ($FeO_x$), iron oxyhydroxide ($FeO_x(OH)_y$), cobalt oxide ($Co_3O_4$), etc. In certain embodiments the catalyst may include or comprise a mixed metal oxide, such as nickel iron oxide ($Ni_zFe_{1-z}O_x$), manganese ferrite ($MnFe_2O_4$), zinc ferrite ($ZnFe_2O_4$), nickel cobaltate ($NiCo_2O_4$), lanthanum strontium manganate ($La_{0.8}Sr_{0.2}MnO_3$), etc. Accordingly, the oxygen generated due to AqMn self-discharge can be 100% utilized to match the capacity of both catholyte 122 and anolyte 124. In various embodiments this auxiliary cell may be in line with the main reactor or may be a separate cell which may be valved off or otherwise hydraulically disconnected when not in use. In various embodiments the catholyte solution may be static or flowing.

In other embodiments, the manganese oxide precipitate may be controlled by configuring the separators 316 to remove the precipitate from the catholyte 122 and/or by including a converter in the catholyte 122 to dissolve the solid precipitate into the liquid solution. In other embodiments, small amounts of alkaline earth metal salts (e.g., $BaMnO_4$) may be added to the catholyte 122 to form sparingly soluble manganese salts to prevent the decomposition of active permanganate compounds. In other embodiments, alkaline earth metal carbonate salts (e.g., $MgCO_3$, $CaCO_3$, $SrCO_3$) may be added to the catholyte 122 to reduce the permanganate self-discharge rate. In other embodiments, alkaline earth metal hydroxide (e.g., $Mg(OH)_2$, $Ca(OH)_2$, $Sr(OH)_2$) may be added to the catholyte 122 to reduce the permanganate self-discharge rate. In other embodiments, a bismuth oxide may be added to the catholyte 122 to reduce the self-discharge rate.

Light exposure may also increase the self-discharge rate of permanganate compounds. Accordingly, in some embodiments, the catholyte tank 202, tubing 212 and/or components of the stack 300, 301, 392 may be made opaque to prevent the exposure of the permanganate compounds of catholyte 122 to light.

In other embodiments, the system 200 may be configured to increase the oxygen pressure applied to the catholyte 122, in order to reduce the self-discharge rate of permanganate compounds. For example, the system 200 may include a pressurized catholyte tank 202 and an optional air pump and/or pressure gauge 230.

The presence of nickel in the catholyte 122 may also catalyze the self-discharge and precipitation of permanganate compounds. Accordingly, the catholyte 122 may be formed using materials that are substantially free of nickel. In the alternative, nickel chelating additives may be included in the catholyte 122, such as ethylenediaminetetraacetic acid (EDTA) or the like, to sequester nickel. As such, the sequestered nickel may be prevented from reacting with the permanganate compounds.

Figure 4:
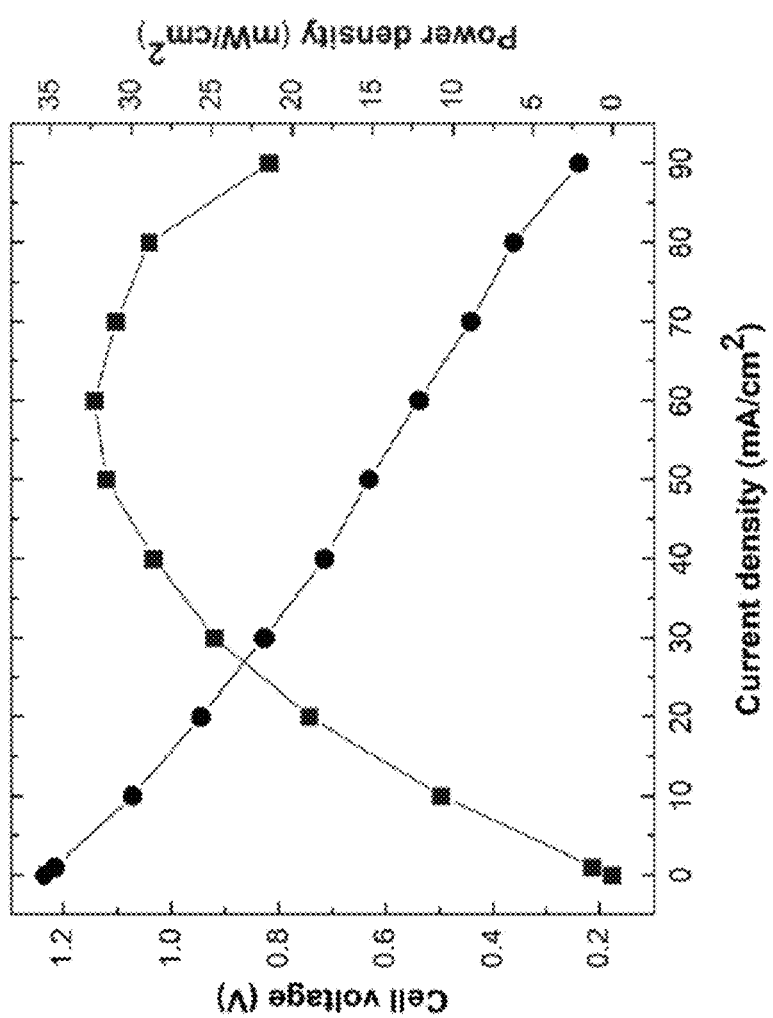
FIG. 4 is an experimental polarization curve obtained from an exemplary flow cell.
Figure 5:
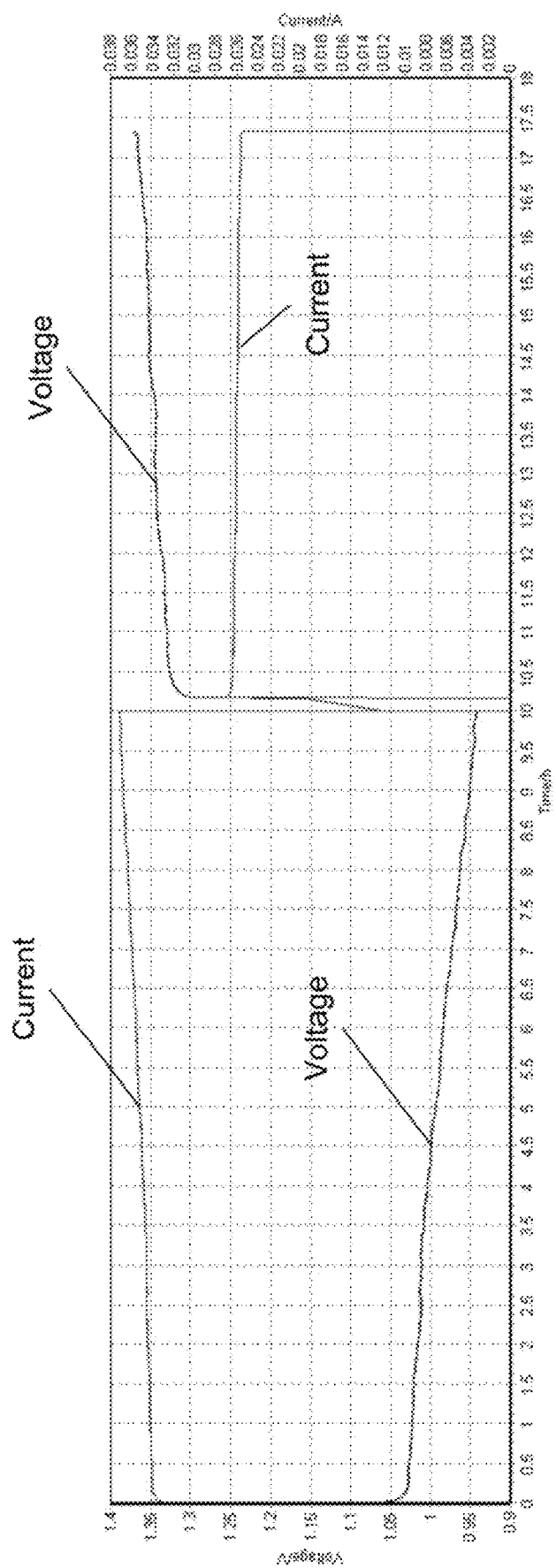
FIG. 5 is experimental charge and discharge cycling data for the exemplary flow cell tested in FIG. 4.

FIG. 4 is a polarization curve for an embodiment flow cell, and FIG. 5 is a graph showing initial electrochemical cycling data for the flow cell, when tested at room temperature (about 23° C.). The flow cell included 2.0M $NaMnO_4$ and 2.8M NaOH in water ($H_2O$) as a catholyte, and 2.2M $Na_2S_2$ and 2.2M NaOH in water as an anolyte. The anolyte and catholyte were circulated through a flow cell at a flow rate of 0.4 mL/min/$cm^2$. The flow cell included a graphite felt cathode, a nickel (Ni) felt anode, and a polytetrafluoroethylene (PTFE)-reinforced $Na^+$ ion exchange membrane as a separator. The flow cell had an observed open circuit voltage (ball-dash line in FIG. 4) of 1.2V and the measured peak power density (square-dash line in FIG. 4) was 32.3 mW/cm$^2$, which may be translated to an effective area specific resistance (ASR) of 11.8 Ω-cm$^2$.

Referring to FIG. 5, the anolyte and catholyte tank volumes were each ~10 milliliters (mL). The cell was cycled under a constant power condition, with a power density of 14 mW/cm$^2$. The cell voltage V is plotted on the left hand axis, while the cell current C is plotted on the right hand axis. The cell was discharged for approximately 10 hours, at which time the discharge was halted and the cell was rested in an open circuit condition for 15 minutes. Following the open circuit rest, the cell was charged for approximately 8 hours, at which time the test was manually terminated.

In various embodiments (for example any of the cells 100, 302 and/or stacks 392, 300, 301), the energy density of the anolyte and catholyte solutions can be high. For example, with a catholyte concentration of 3.5M MnO$_4^{2-}$ and an anolyte concentration of 2.5M S$_2^{2-}$, the total energy density may be 41.0 Watt-hours per liter (Wh/L) for capacity matched solutions, assuming the full cell voltage of 1.05 V. In various embodiments, the present disclosure advantageously provides electrochemical systems having higher energy densities as compared to conventional aqueous battery chemistries.

Iron-Cyanide Based Cathode Active Materials

In some embodiments (for example any of the cells 100, 302 and/or stacks 392, 300, 301), the cathode active material may include one or more iron-cyanide based compounds. Herein, an "iron-cyanide based compound" is intended to encompass compounds including ferrocyanide compounds and ferricyanide compounds. For example, the cathode active material may include salts comprising ferrocyanide anions [Fe(CN)$_6$]$^{4-}$ and/or ferricyanide anions [Fe(CN)$_6$]$^{3-}$, and cations such as Li, K, and/or Na. The catholyte 122 may include the ferrocyanide compound dissolved in an electrolyte, such as an aqueous electrolyte. For example, the catholyte 122 may have am iron-cyanide compound concentration ranging from about 0.5 M to about 5 M, such as from about 1 M to about 3 M, or from about 1.2 M to about 2 M. However, the present disclosure is not limited to any particular ferrocyanide concentration.

It has been found that when mixed monovalent cations are used in a ferrocyanide catholyte, the potential of the redox pair was increased. Therefore, in various embodiments, ferrocyanide catholytes may include mixed cations, such as any combination of Na$^+$, K$^+$, and Li$^+$ species, rather than a single cation species.

Sulfur-Based Cathode Active Materials

In some embodiments (for example any of the cells 100, 302 and/or stacks 392, 300, 301), the cathode active material may include one or more sulfur-based compounds. Herein, a "sulfur-based compound" is intended to encompass sulfur, sulfides, polysulfides, and transition metal sulfide compounds, and salts thereof. In some embodiments, the catholyte 122 may include the sulfur-based cathode active materials dissolved in an electrolyte, such as an aqueous electrolyte, and may be referred to as an aqueous sulfur (AqS) compound. For example, cathode active materials may include, sulfur (S$_8$), lithium (poly)sulfides (Li$_2$S$_x$, where x=1 to 8), sodium (poly)sulfides (Na$_2$S$_x$, where x=1 to 8) and/or potassium (poly)sulfides (K$_2$S$_x$, where x=1 to 8). In some embodiments, the catholyte 122 may include a transition metal sulfide, such as TiS$_x$, FeS$_x$, and/or MnS$_x$, [wherein x=1 or 2] may provide a high operating voltage and a corresponding energy density, and may also be highly resistive to polysulfide crossover.

For example, the catholyte 122 may include the sulfur-based compound at a concentration ranging about 4 M to about 14 M, such as from about 5 M to about 12 M, or from about 7 M to about 10 M. However, the present disclosure is not limited to any particular amount of sulfur compound.

With regard to cells 100, 302 that may include the sulfur-based compounds as an anode active material (e.g., dual sulfur cells), various sulfur species may be formed during charging and discharging, such that anode and cathode may include different sulfur species.

During discharging, the following Reactions 1 and 2 may occur in the positive electrode

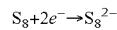

$$S_8 + 2e^- \rightarrow S_8^{2-} \quad \text{Reaction 1:}$$

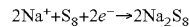

$$2Na^+ + S_8 + 2e^- \rightarrow 2Na_2S_8 \quad \text{Reaction 2:}$$

Other sulfur species may also be generated, such as Na$_2$S$_5$, Na$_2$S$_4$, Na$_2$S$_3$, etc. During discharging, the reactions may be reversed. As such, the overall positive electrode charging and discharging reactions in the positive electrode may be represented by the following Reaction 3:

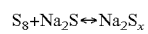

$$S_8 + Na_2S \leftrightarrow Na_2S_x \quad \text{Reaction 3:}$$

In addition, by changing the ratios of S$_8$ and Na$_2$S, the reaction may be modified, as shown in Reaction 4 below:

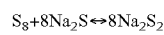

$$S_8 + 8Na_2S \leftrightarrow 8Na_2S_2 \quad \text{Reaction 4:}$$

In addition, during discharging, the following Reaction 5 may occur in the negative electrode:

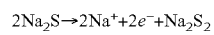

$$2Na_2S \rightarrow 2Na^+ + 2e^- + Na_2S_2 \quad \text{Reaction 5:}$$

In some embodiments, a cell may be assembled in a discharged state, such that the positive and negative electrodes both include a slurry comprising Na$_2$S$_3$. During charging, Reaction 6 may occur in the positive electrode and Reaction 7 may occur in the negative electrode:

$$2Na_2S_3 \rightarrow Na_2S_6 + 2Na^+ + 2e^- \quad \text{Reaction 6:}$$

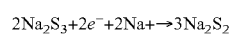

$$2Na_2S_3 + 2e^- + 2Na^+ \rightarrow 3Na_2S_2 \quad \text{Reaction 7:}$$

Many variations on these reaction schemes are possible according to the invention, including the substitution of lithium or potassium for sodium, or by tuning the ratio of electropositive ion to sulfur in each of the cathode and anode electrodes.

Figure 6:
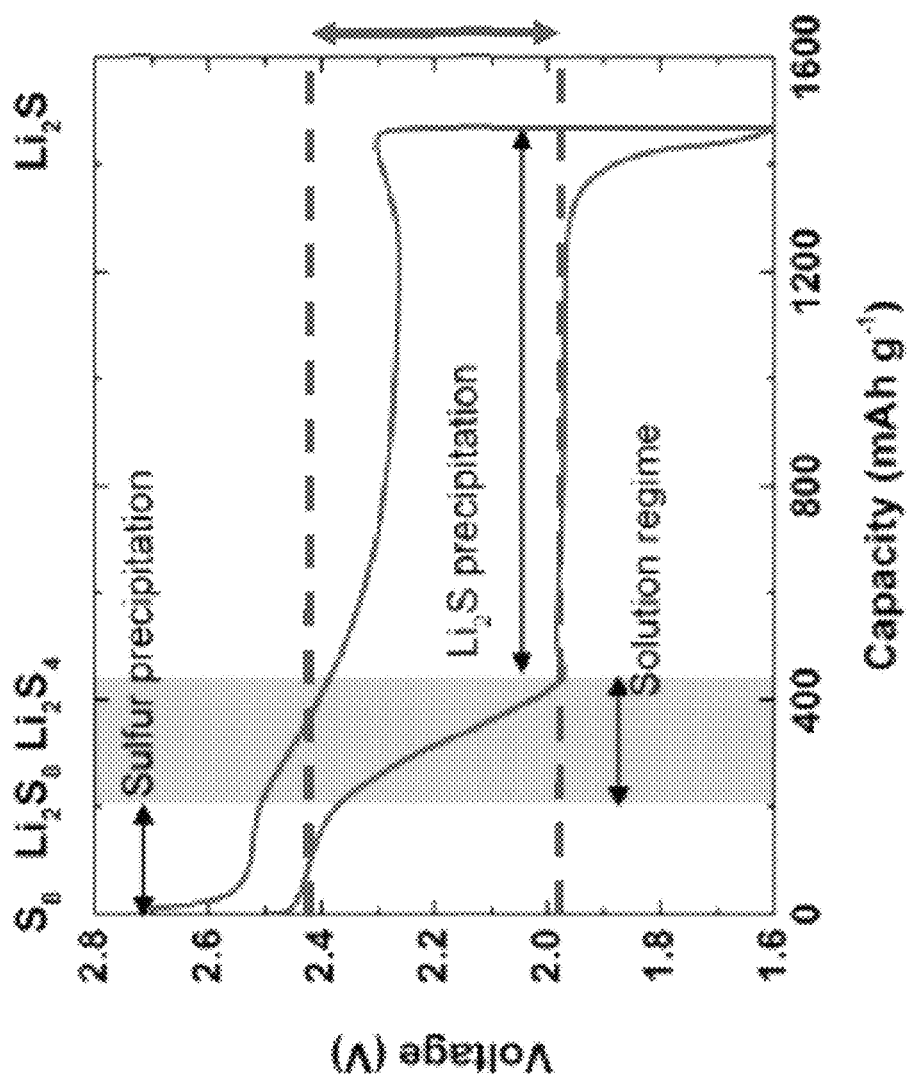
FIG. 6 is a chart showing the charge-related deposition of sulfur species, according to various embodiments of the present disclosure.

FIG. 6 is a graph showing the various sulfur and polysulfide species formed during the cycling of an aqueous sulfur electrode including lithium as an electropositive element. The lower voltage trace shows the reduction reactions (discharge for the negative electrode, charge reactions for the positive electrode) proceeding from a fully oxidized sulfur electrode (S$_8$). As the electrode is reduced, Li is added and the electrode moves into a solution regime, in which soluble polysulfide species such as Li$_2$S$_8$, and Li$_2$S$_4$ are formed, and as reduction continues, it proceeds to Li$_2$S precipitation. As the direction of current is reversed (charge for the negative electrode, discharge for the positive electrode) the reactions are reversed and the higher voltage trace is followed. As can be seen in FIG. 6, this initially involves the dissolution of Li$_2$S in the electrode moves back into the solution regime; ultimately as the electrode is further oxidized, elemental sulfur (S$_8$) is precipitated back out in the "Sulfur precipitation" regime. These reactions and mechanisms are known in the art but are recounted here for clarity.

Table 1 below is an initial cost analysis of a dual sulfur stack, according to various embodiments of the present disclosure.

TABLE 1

| Chemistry | 5M [S] 0.45 V | 8M [S] 0.45 V | 5M [S] 0.55 V |
|---|---|---|---|
| Chemicals Costs ($/kWh) | 10.1 | 8.9 | 8.3 |
| Cost of Energy [Chemicals, Tanks, Efficiency] ($/kWh) | 30.2 | 22.6 | 24.7 |
| Solution Energy Density (Wh/L) | 13.4 | 21.4 | 16.4 |
| Power Components Cost ($/kW) | 368 | 368 | 247 |

As can be seen in Table 1, the energy density and area specific resistance (ASR) may strongly affect the power component costs per kW.

In some embodiments, the anolyte 124 may include a polysulfide compound active material, the catholyte 122 may be an alkaline solution that does not include an active material (e.g., redox pair), and the cathodes 312 may be air electrodes that comprise a catalyst such as Pt, Ir, Ru, Mn, Ni and alloys thereof. Accordingly, the cells 100, 302 and/or stacks 392, 300, 301 may use oxygen from air during discharging, and the tank 202, pump 222, and tubing 212 may be omitted from the system 200.

In other embodiments, additional sulfur may be added to the anolyte 124. Accordingly, the cells 100, 302 and/or stacks 392, 300, 301 may be referred to as "refuel-able" cells/stacks. Since air is free and sulfur is a low cost material that may be derived from industrial waste, such a configuration may be used to inexpensively store power for long periods.

It is believed that polysulfide in an electrolyte has a tendency to decay into sodium thiosulfate ($Na_2S_2O_3$) and thus, permanently lower the system capacity. Therefore, in various embodiments (for example any of the cells 100, 302 and/or stacks 392, 300, 301), relatively small amounts of sodium thiosulfate may be added to a polysulfide electrolyte, in order to reduce the decay of polysulfide by altering reaction kinetics. In other embodiments, elemental sulfur may be added to system electrolytes, in order to recover capacity and minimize operating costs.

According to various embodiments of the present disclosure, provided are electrochemical cells (e.g., cells 100, 302) configured to operate using various sulfide, ferrocyanide, and/or permanganate or manganate chemistries. The cells provide for long term power storage at unexpectedly low costs per kW. The low costs per kilowatt hour (kWh) and per kW make various embodiments well-suited to long-duration and ultra-long-duration energy storage applications, which require low-capital-cost energy storage systems.

In various embodiments, a polysulfide battery may include an aqueous liquid catholyte contacting a cathode current collector in a cathode chamber, an aqueous liquid anolyte contacting an anode current collector in an anode chamber, and a separator separating the catholyte in the cathode chamber from the anolyte in the anode chamber. In various embodiments, the anolyte may include an aqueous alkaline cation polysulfide solution, such as $Li_2S_x$, $Na_2S_x$, and/or $K_2S_x$ solution, in which x ranges from 1 to 8 (e.g., $Li_2S$ $Na_2S$ and/or K2S when x=1). In various embodiments, the battery may be a flow battery (i.e., flowing battery, which is also sometimes called a regenerative fuel cell) containing a pump which circulates the catholyte and/or the anolyte, or a non-flowing battery which lacks the circulation pump.

Separators/Membranes

Various embodiments of the present disclosure include electrochemical cells (for example any of the cells 100, 302, 700, 800) that include separators and/or membranes that have certain characteristics. In this disclosure, the terms "membrane" and "separator" may be used interchangeably. The following discussion of membranes and separators are provided to illustrate various aspects of the disclosure and the membranes and separators discussed below may be applied to any of the embodiment cells and/or stacks described herein, such as any of cells 100, 302, 700, 800 and/or stacks 392, 300, 301). Membranes of the present disclosure may, in some embodiments, have a thickness of about 500 microns or less, about 200 microns or less, about 100 microns or less, about 50 microns or less, or about 25 microns or less. Suitable separators may be capable of operating in electrochemical cell with a current efficiency of at least about 80%, at a current density of 10 mA/cm, when the separator has a thickness of 100 microns or less. More preferably, the electrochemical system is capable of operating at a current efficiency of at least 90%, when the separator has a thickness of about 50 microns or less, a current efficiency of at least 95% when the separator has a thickness of about 25 microns or less, and a current efficiency of at least 98% when the separator has a thickness of about 10 microns or less. Suitable separators include those separators in which the electrochemical system is capable of operating at a voltage efficiency of at least 60% with a current density of about 10 mA/cm. More preferably, suitable separators include those separators in which the electrochemical system is capable of operating at a voltage efficiency of at least 70%, at least 80% or at least 90%.

Separators are generally categorized as either solid or porous. Solid membranes can be made from organic materials, such as polymer, or inorganic materials, such as ceramic and metal oxide, and typically comprise one or more types of ion-exchangeable functional groups, wherein the functional groups facilitates mobile ion transport through the body of the membrane. The facility with which ions conduct through the membrane can be characterized by a resistance, typically an area resistance in units of $\Omega$ $cm^2$. The area resistance is a function of inherent membrane conductivity and the membrane thickness. Thin membranes are desirable to reduce inefficiencies incurred by ion conduction and therefore can serve to increase voltage efficiency of the energy storage device. Active material crossover rates are also a function of membrane thickness, and typically decrease with increasing membrane thickness. Crossover represents a current efficiency loss that is generally balanced with the voltage efficiency gains by utilizing a thin membrane. The active material present in the first electrolyte and the active material present in the second electrolyte are separated by the membrane. The diffusion rate of active materials in either the first electrolyte or the second electrolyte should be about $1\times10^{-8}$ mol/($cm^2$ sec) or less, about $1\times10^{-10}$ mol/($cm^2$ sec) or less, about $1\times10^{12}$ mol/($cm^2$ sec) or less, or $1\times10^{-14}$ mol/($cm^2$ sec) or less. Other embodiments of this invention include situations where the first electrolyte and second electrolyte are intermixed.

In some embodiments, the separators may be porous membranes. Porous membranes are non-conductive membranes which allow working ions transfer between two electrodes via open channels filled with electrolyte. This permeability increases the probability of active materials passing through porous membrane from one electrode to another causing cross-contamination and/or reduction in cell energy efficiency. The degree of this cross-contamination depends on, among other features, the size (the effective diameter and channel length), and character (hydrophobicity/hydrophilicity) of the pores, the nature of the electrolyte, and the degree of wetting between the pores and the electrolyte. The pore size distribution is generally sufficient to substantially prevent the crossover of active materials between the two electrolyte solutions.

Suitable porous membranes may have an average pore size distribution of between about 0.001 nm and 10 microns. Preferably, the average pore size distribution should be between about 0.01 nm and 100 nm. The pore size distribution in a porous membrane can be substantial. In other words, a porous membrane may contain pores with a very small diameter (approximately less than 1 nm) and may contain pores with a very large diameter (approximately greater than 100 nm). The larger pore sizes can lead to a higher amount of active material crossover. The ability for a porous membrane to substantially prevent the crossover of active materials will depend on the relative difference in size between the average pore size and the active material. For example, when the active material is an ionic group in the form of a hydrated complex, the average diameter of the hydrated complex is about 50% greater than the average pore size of the porous membrane. On the other hand, if the porous membrane has substantially uniform pore sizes, it is preferred that the average diameter of the hydrated complex be about 20% larger than the average pore size of the porous membrane.

According to various embodiments of the present disclosure, membranes may comprise any suitable polymer, typically an ion exchange resin, for example, comprising a polymeric anion or cation exchange membrane, or combination thereof. The mobile phase of such a membrane may comprise, and/or is responsible for the primary or preferential transport (during operation of the battery) of at least one mono-, di-, tri-, or higher valent cation and/or mono-, di-, tri-, or higher valent anion, other than protons or hydroxide ions. Suitable solid cationic exchange polymers include use of one or more of the following polymers: cross-linked halogenated alkylated compound with a polyamine, a cross-linked aromatic polysulfone type polymer with a polyamine, perfluoriniated hydrocarbon sulfonate ionomers, sulfonated polyether ether ketone (S-PEEK), sulfonated poly(phthalazinone ether ketone), sulfonated phenolphthalein poly (ether sulfone), sulfonated polyimides, sulfonated polyphosphazene, sulfonated polybenzimidazole, aromatic polymers containing a sulfonic acid group, sulfonated perfluorinated polymer, fluorinated ionomers with sulfonate groups, carboxylate groups, phosphate groups, boronate acid groups, polyaromatic ethers with sulfonate or carboxylate groups, poly(4-vinyl pyridine, poly(2-vinyl pyridine), poly(styrene-b-2-vinylpyridine), poly(vinyl pyrrolidine), poly(1-methyl-4-vinylpyridine), poly(2,2'-m-phenylene)-5,5'-bibenzimidazole poly(2,2'-(m-phenylene)-5,5'-bibenzimidazole, poly(2, 5-benzimidazole), polyacrylate, polymethacrylate, or combinations thereof. Suitable solid anionic exchange membranes include the use of one or more of the following polymers: polydiaryl dimethyl ammonium, poly(methacryloyloxyethyl triethylammonium), poly(diallylammonium), or combinations thereof.

In some embodiments, substantially non-fluorinated membranes that are modified with sulfonic acid groups (or cation exchanged sulfonate groups) may also be used. Such membranes include those with substantially aromatic backbones, e.g., poly-styrene, polyphenylene, bi-phenylsulfone, or thermoplastics such as polyetherketones or polyethersulfones. Membranes may also include polyesters, poly (ether-ketone-ether-ketone-ketone), poly(vinyl chloride), vinyl polymers, substituted vinyl polymers, alone or in combination of any previously described solid or porous polymer Membranes according to various embodiments may also comprise reinforcement materials for greater stability. Reinforcement materials can be implemented in the membrane as mesh, thin layers, woven, or dispersion. Suitable reinforcement materials include nylon, cotton, polyesters, crystalline silica, crystalline titania, amorphous silica, amorphous titania, rubber, asbestos wood or combination thereof.

According to various embodiments of the present disclosure, separators may include polymer-inorganic composite membranes. Because such membranes contain no inherent ionic conduction capability, such membranes are typically impregnated with additives in order to introduce porous structure. These membranes typically include a mixture of a polymer and an inorganic filler, and have an open porosity. Suitable polymers include those chemically compatible with the electrolytes of the presently described systems, including high density polyethylene, polypropylene, polyvinylidene difluoride (PVDF), or polytetrafluoroethylene (PTFE). Suitable inorganic fillers may include silicon carbide matrix material, titanium dioxide, silicon dioxide, zinc phosphide, and cerium dioxide, and may be supported internally with a substantially non-ionomeric structure, including mesh structures or the like.

Suitable membranes also comprise continuous composite membranes. Continuous composite membranes comprise at least a material that has a continuous or discontinuous structure and a filler material that has a continuous or discontinuous structure. Suitable materials having a continuous or discontinuous structure may comprise one or more of polyethylene, polypropylene, poly(tetrafluoroethylene), poly(vinyl chloride), or a combination thereof. Suitable filler material may comprise nonwoven fibers or naturally occurring substances. Suitable nonwoven fibers may include fibers formed of nylon, cotton, polyesters, crystalline silica, amorphous silica, amorphous titania, crystalline titania, or a combination thereof. Suitable naturally fibers may be formed of rubber, asbestos, wood, or combinations thereof. The continuous composite membranes may also be porous. Suitable porosity may range from about 1% to about 50% volume fraction.

Suitable separators may also comprise at least two layers of the above described membranes. For instance, a suitable separator comprises a porous layer and a solid layer. For instance, a suitable separator may comprise a polymeric solid layer and inorganic solid layer. For instance, a suitable separator may comprise two layers capable of selective ion transport, such as any of the above mentioned solid cationic or anionic polymers. Other layers are included within the scope of this invention that may enhance or reduce properties such as conduction, strength, thickness, selectivity, permeability, or the like.

There may be a significant difference in the concentration of active material species in the positive and negative electrolytes in a cell. Despite the presence of the separator, some finite flux of active materials species across a membrane may occur due to these concentrations differences, since substantially all separators exhibit some permeability. When these species crossover the separator, a loss of energy efficiency occurs, since charged species are self-discharging through direct interaction. However, the potential for electrolyte regeneration exists, if a cell employs different active material compounds.

Accordingly, suitable separators may be configured to be effectively impermeable to active materials. Herein, "effectively impermeable" refers to preventing crossover of at least about 90% of at least one of the active materials, for a time period of about year or longer. Preferably, the separators of the present disclosure are capable of preventing crossover at least about 99.0% of active materials, such as at least about 99.9% of active materials, for a period of about a year or more.

In various embodiments, an anion exchange membrane separator with small pore size may be used in an aqueous polysulfide battery containing a polysulfide anolyte active material. The separator permits transition of a small anion, such as a hydroxide (OH$^-$) anion, between the catholyte and anolyte chambers. This separator membrane blocks cations, such as sodium ions, due to its charge repelling features, and blocks large anions, such as permanganate anions, due to its small pore size. For example, the separator may be a porous separator having an average pore size of about 10 nm or less.

The separator can be used with a permanganate cathode active materials or other suitable cathode active materials, such as sodium or lithium sulfate compounds. Various embodiment anion exchange membrane differs from the cation exchange membrane separators that permit transition of alkali cations (e.g., sodium and/or lithium cations) between the catholyte and the anolyte chambers.

For example, various embodiments provide composite membrane separators that include multiple polymeric membranes that are physically or chemically bonded together. The polymeric membranes can be ion exchange membranes, such as anion exchange membranes (AEM), cation exchange membranes (CEM), etc., or porous membranes such as nanofiltration membranes, ultrafiltration membranes, reverse osmosis membranes, polybenzimidazole-based membranes (PBI), membranes including polymers of intrinsic microporosity (PIM), etc., or the combinations thereof.

In some embodiments, a separator may include one membrane layer including both electrophilic groups, such as anion exchange groups, and nucleophilic groups, such as cation exchange groups. For example, a separator may include one or more bipolar membranes. In some embodiments, a separator may include organic and inorganic compounds. For example, the separator may be a blended or multi-layered membrane separator.

Most commercially available membrane separators, such as hydrocarbon membranes, are not compatible with permanganate compound active materials, due to the oxidative nature of aqueous permanganate compounds (AqMn) with respect to hydrocarbons. Accordingly, various embodiments provide membrane separators configured to transfer hydroxide ions, while resisting oxidation by AqMn compounds.

For example, various embodiments provide hydrocarbon membranes coated with a thin layer of an organic or inorganic film that is resistant to oxidation by AqMn compounds. Coating methods may include solution casting, co-extrusion, surface cross linking, and spin coating, for example. Organic film materials may include polyether ether ketones (PEEK), polysulfones, polystyrenes, polypropylenes, polyethylenes, or the like. The coated organic layer should be thin enough to still let working ions pass through while the manganese species are blocked.

For example, a PEEK reinforced AEM, such as a Fumasep FAA-3-PK-130 membrane may be suitable for successfully blocking AqMn. In particular, while not wishing to be bound to a particular theory, it is believed that such a membrane may become being covered in $MnO_2$ after operating in an ex-situ cell, but is still able to prevent AqMn crossover. It is predicted that if this protective coating is not present, the membrane polymer may be easily oxidized in the AqMn electrolyte.

Accordingly, in some embodiments, an AEM may be coated with a thin layer of $MnO_2$ to protect the membrane from the oxidative AqMn, while limiting the potential increase in resistance. For example, the membrane may be coated on at least one side with $MnO_2$, to prevent AqMn species from reaching membrane polymers that are susceptible to oxidation. The $MnO_2$ may be permeable to hydroxide ions, while blocking AqMn.

Methods of $MnO_2$ deposition may include utilizing high-temperature permanganate to plate $MnO_2$ on carbon electrode materials. For instance, electrodeposition of $MnO_2$ can be formed from electrolysis of manganese sulfate and sulfuric acid. For instance, $MnO_2$ can be formed from reaction of sacrificing layer of the separator and AqMn.

In various embodiments, a separator may be included between the catholyte and anolyte chambers that has a reduced active area that permits ions (e.g., anions) to travel between the chambers by embedding ion permeable "window" material (e.g., anion exchange membrane material) in an ion impermeable separator material.

Figure 7B:
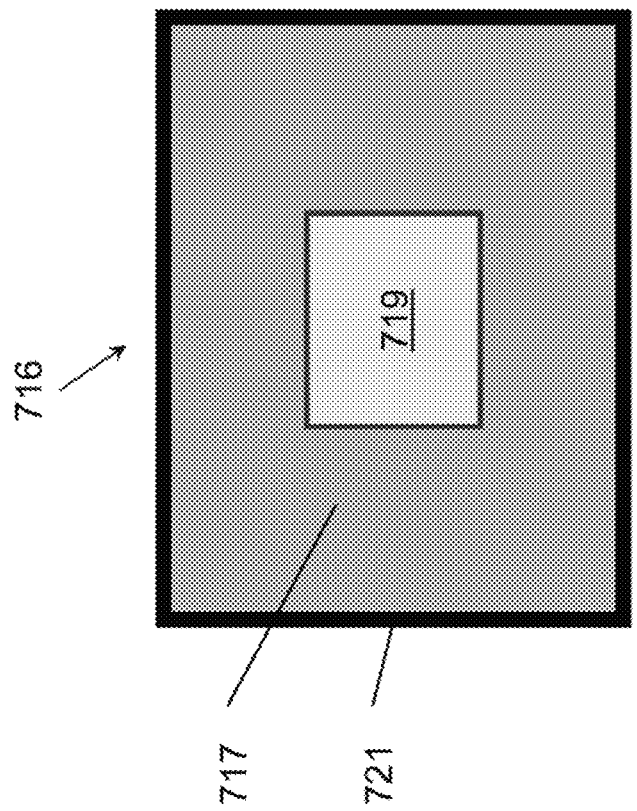
FIGS. 7A and 7B are schematic diagrams of a reduced active area membrane separator, according to various embodiments of the present disclosure.
Figure 7A:
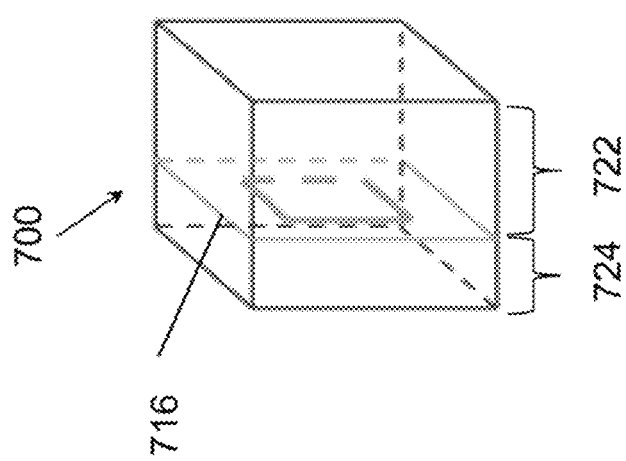

FIG. 7A is a schematic view of an electrochemical cell 700 including a separator 716 disposed between a catholyte chamber 722 and an anolyte chamber 724, according to various embodiments of the present disclosure. FIG. 7B is an enlarged front view of the separator 716 of FIG. 7A. Referring to FIGS. 7A and 7B, the cell 700 may be a static cell. The separator 716 includes a frame 717 and at least one window 719 disposed within the frame 717. In some embodiments, the separator 716 may also include a peripheral support 721 to support the frame 717.

The frame 717 may be formed of an ion impermeable material. The window 719 may be formed of a cation permeable material. Accordingly, the separator 716 has a reduced active area which permits ions (e.g., anions) to travel between the chambers, due to including the smaller ion-permeable window 719 within the impermeable frame 717. In particular, the area of the window 719 may be about one quarter of the total area of the separator 716. As such, the overall cost of the separator 716 is reduced, as compared to a conventional separator that does not include a frame 717, due to the frame 717 reducing the amount of the more expensive permeable material included in the window 719.

Accordingly, assuming the cell 700 is operated at the same current density (mA/cm$^2_{membrane}$), the cell 700 can have 4× the duration with one quarter the membrane costs (along with other relevant cell components) as compared to a conventional static cell with the same total length of the cell. Furthermore, it is possible to leverage "passive" mass transfer enhancement mechanism such as Joule heat, gravity, concentration gradient, etc., in the window cell design thanks to the wider design space.

Figure 8:
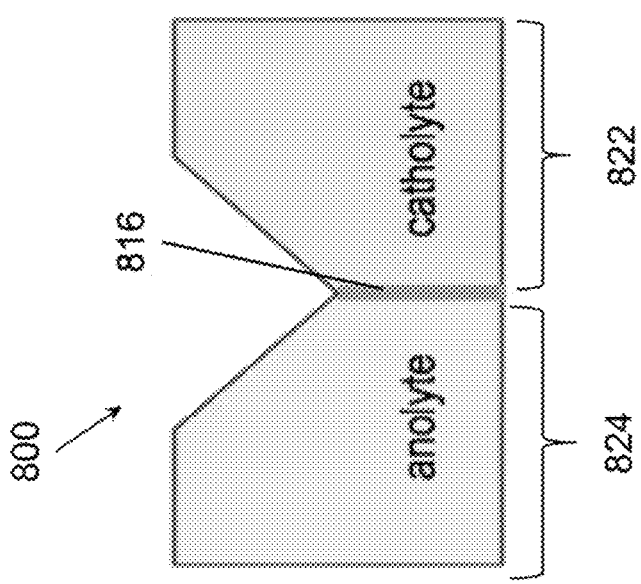
FIG. 8 is a schematic view of cell including architecture for reducing separator size, according to various embodiments of the present disclosure.

FIG. 8 is a schematic view of an electrochemical cell 800 including a separator 816 disposed between a catholyte chamber 822 and an anolyte chamber 824, according to various embodiments of the present disclosure. Referring to FIG. 8, the cell 800 may be a static cell including a catholyte chamber 822, an anode chamber 824, and a separator 816 disposed therebetween.

The chambers 822, 824 may have various geometries, such that the area of an interface between the chambers 822, 824 is reduced, as compared to chambers having an interface that is substantially the same size as a cross-section thereof. In other words, the height and/or width of a portion of the chambers 822, 824 may be reduced, such that the area of the separator 816 may be correspondingly reduced. The geometries of the chambers 822, 824 may also be modified to accommodate electrolyte viscosity, conductivity, and/or cost.

In traditional flow battery systems where a tank filled with either catholyte or anolyte is connected to a stack of electrically connected cells, shunt current may occur in an electrolyte conduit due to electrolyte circulation. Accordingly, the shunt current may reduce system capacity through auto electrical discharge of electrolyte components. This disclosure describes a new electrolyte manifold design that aims to minimize or eliminate the shunt current issue. As shown in the figure below, each anolyte (yellow) tank feed cells at the same position but in different stacks. The cells connected in series in a stack do not "see" the electrolyte from the same tank.

Figure 9:
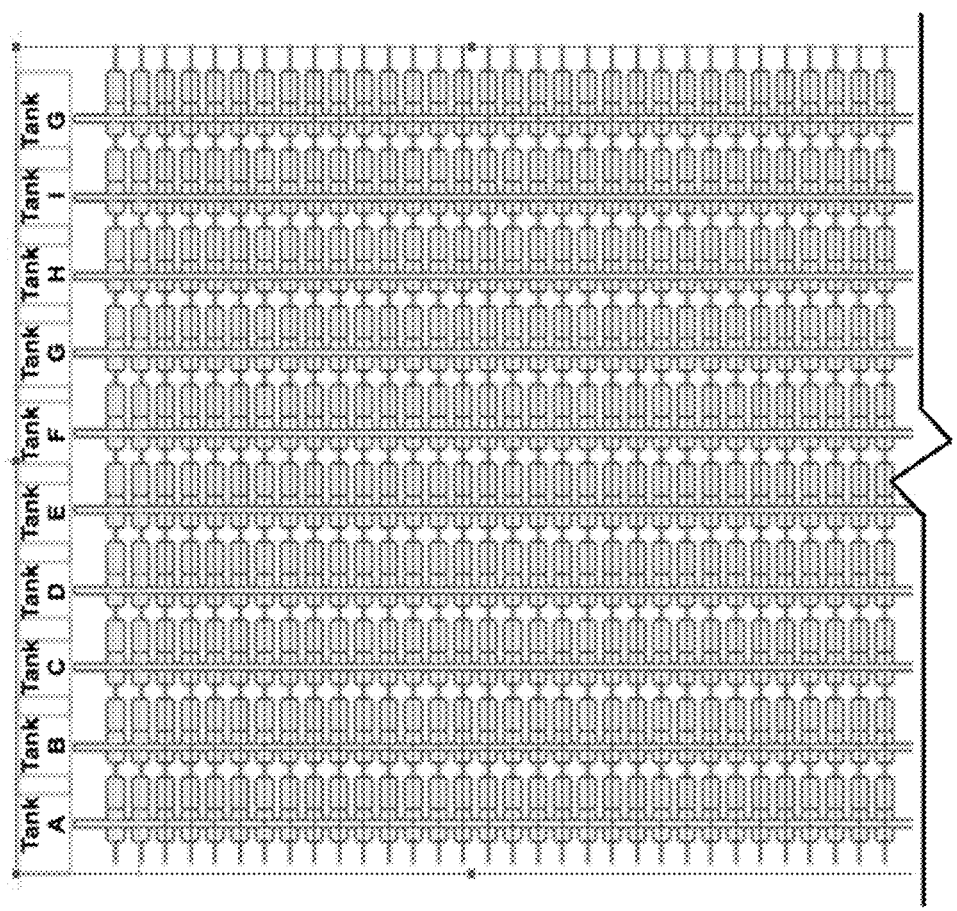
FIG. 9 is a schematic view of flow battery connection architecture configured to reduce shunt currents, according to various embodiments of the present disclosure.

FIG. 9 is a schematic view of a flow battery system configured to reduce shunt currents, according to various embodiments of the present disclosure. Referring to FIG. 9, the system includes columns of flow cells 900 that are respectively connected to an electrolyte tank A-G. Adjacent cells 900 of different columns may be electrically connected, either in series or parallel. In other words, the cells 900 may be fluidly connected by column and electrically connected by row.

Accordingly, the electrically connected cells 900 of each row are each provided with electrolyte from a different one of the tanks A-G. Accordingly, the electrically connected cells 900 of each row do not "see" the electrolyte from the same tank A-F, which reduces the possibility of shunt currents. Although not shown, electrolyte output from each of the columns of cells 900 may be returned to the respective tanks A-G, or may be returned to one or more additional tanks.

Figure 10:
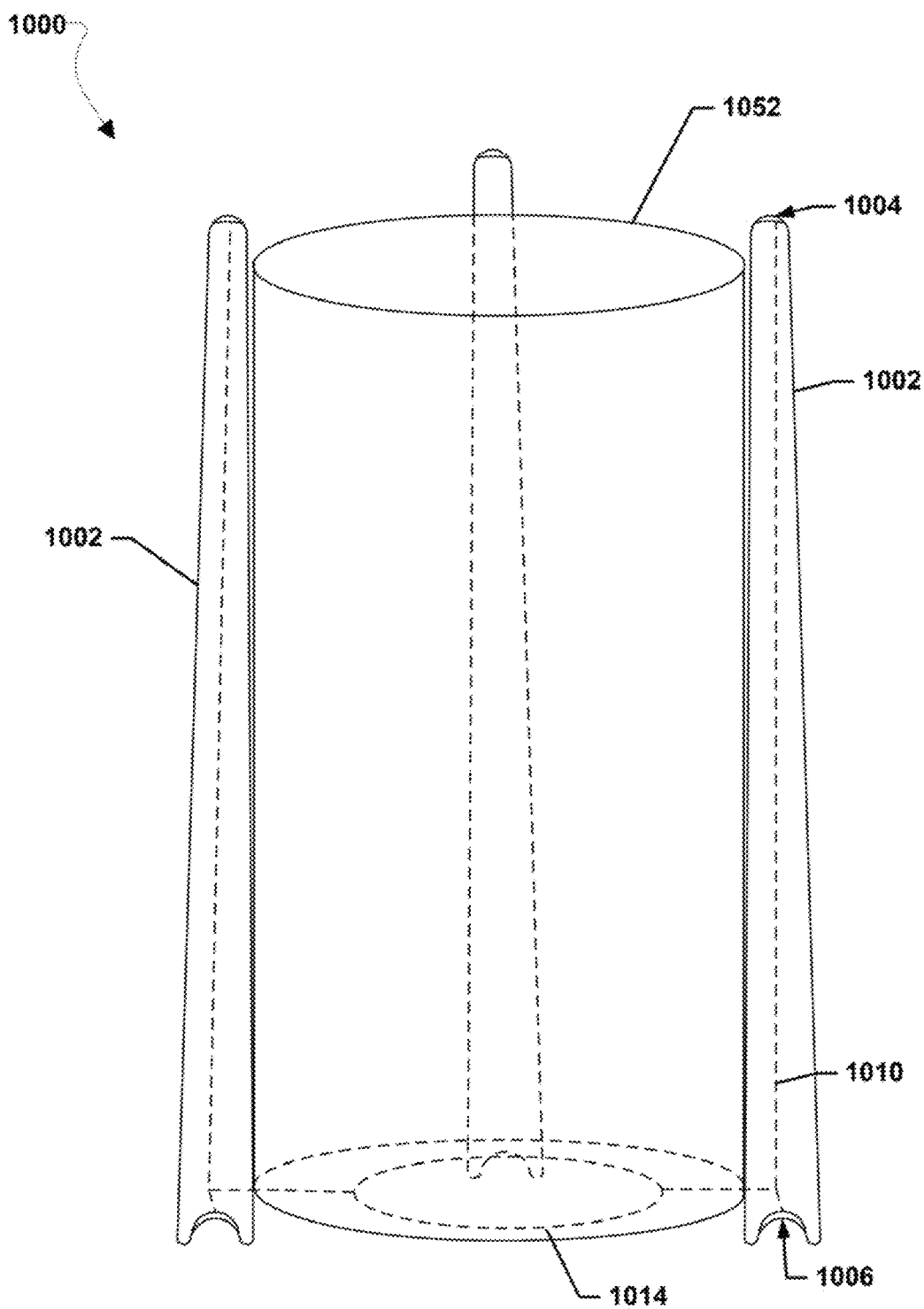
FIG. 10 is an isometric view of the overall structure of an exemplary stack architecture.

FIG. 10 shows a portion of an embodiment battery stack 1000. The battery stack 1000 may be similar to stacks 392, 300, and/or 301 discussed above. The battery stack 1000 may be a tub or other type of container supporting the one or more cells (e.g., cells 100, 302) forming the battery stack 1000. In an embodiment, the battery stack 1000 may include a series of rods 1002 coupled to the outer surface of the walls 1052 of the battery stack 1000. The series of rods 1002 may include any number of rods 1002, such as one rod 1002, two rods 1002, three rods 1002, more than three rods 1002, etc. In various embodiments, the rods 1002 may be constructed of steel or any other electrically conductive material. In various embodiments, the rods 1002 may provide high columnar strength, such that the rods 1002 provide not only electrical connection but also increased strength needed for stacking the battery stack 1000.

If the rods 1002 are formed integral with the structure (e.g., the walls 1052), such as if rotary molded from plastic, then, electrical leads 1010 may pass through the walls 1052 from one or more current collectors 1014 (e.g., current collectors 118, 120, 318, 320). The electrical leads 1010 may run the length of the rod 1002 and connect an upper electrical contact plate 1004 at an upper end of the rod 1002 to a lower electrical contact plate 1006 at a lower end of the rod 1002. In various embodiments, the upper electrical contact plate 1004 may be configured to fit within a lower electrical contact plate 1006 of a rod 1002 of another battery stack 1000 when the battery stacks 1000 are stacked on top of one another. For example, upper electrical contact plates 1004 may be convex shapes, such as a cone, etc., sized to fit inside the concave shaped lower electrical contact plates 1006, such as groove shaped lower electrical contact plates 1006, etc. The rods 1002 may be solid or may be hollow, such as a cone. In certain embodiments, the rods 1002 may be hollow, with the lower concave shape comprising a curved back lip, creating a ring of contact between the two nested rods 1002. The rods 1002 may provide electrical contacts for series and/or parallel connections between battery stacks 1000. In various embodiments, the weight of an upper battery stack 1000 disposed above a lower battery stack 1000 may maintain the connections between the upper electrical contact plates 1004 and the lower electrical contact plates 1006 of the respective batteries 400.

Figure 11A:
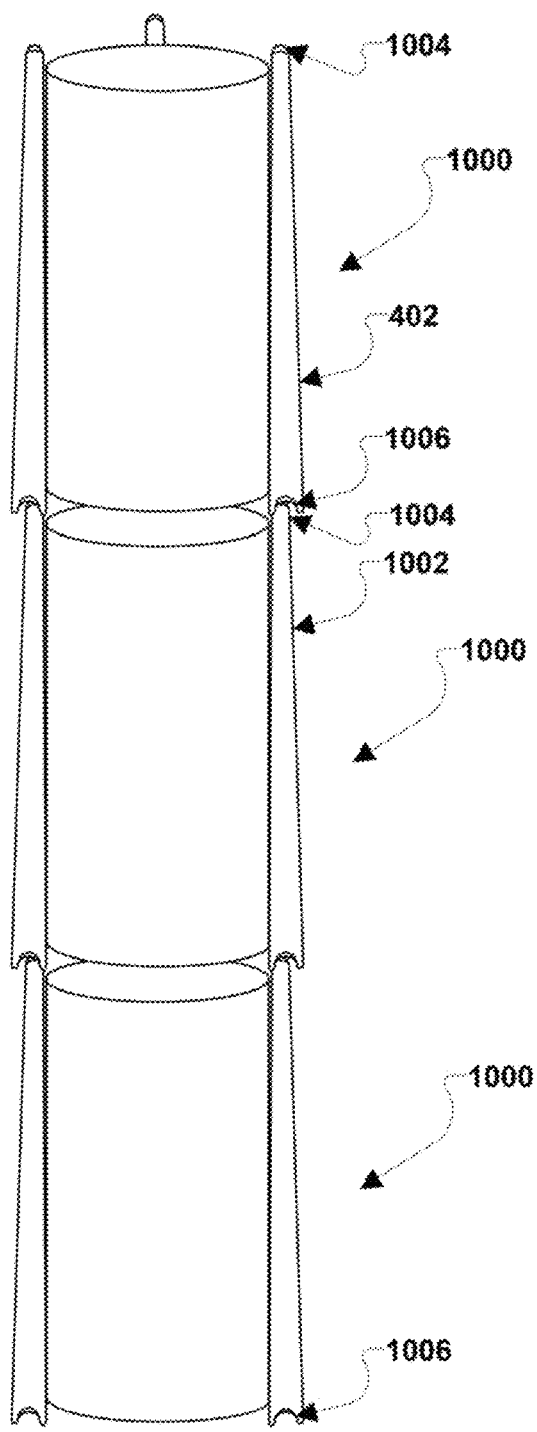
FIG. 11A is an isometric view of one example stacked configuration of multiple embodiment battery stacks.
Figure 11B:
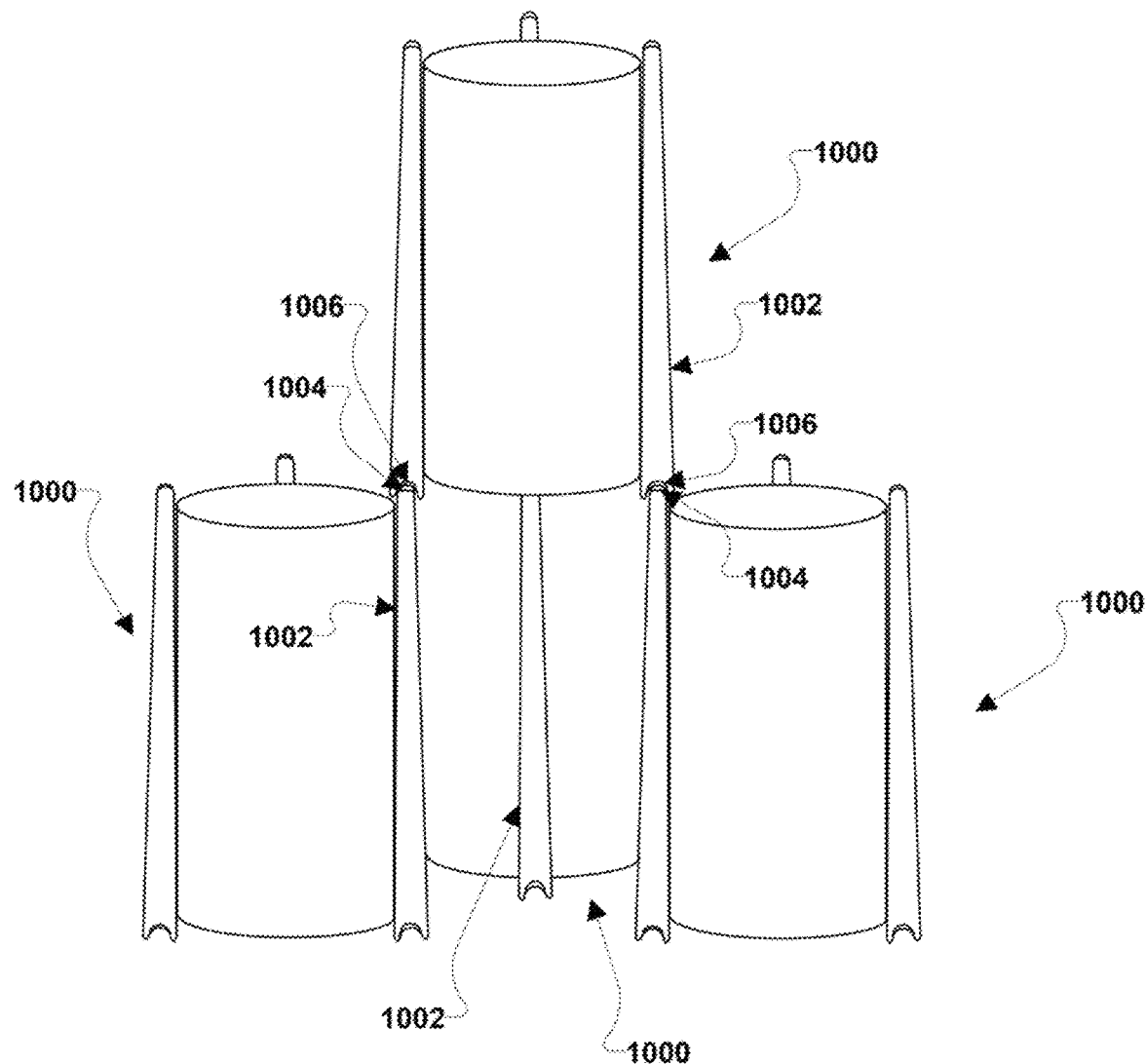
FIG. 11B is an isometric view of another example stacked configuration of multiple embodiment battery stacks.

FIG. 11A shows one example stacked configuration of multiple embodiment battery stacks 1000. As shown in FIG. 11A, three battery stacks 1000 may be stacked on top of one another such that the lower electrical contact plates 106 of an upper battery stack 1000 contact the upper electrical contact plates 1004 of a lower battery stack 1000. FIG. 11B shows another example stacked configuration of multiple embodiment battery stacks 1000. As shown in FIG. 11B, four battery stacks 1000 may be stacked such that one rod 1002 of each lower battery stack 1000 contacts a respective rod 1002 of the upper battery stack 1000. While the battery stacks 1000 shown in FIGS. 10, 11A, and 11B are shown as having cylindrical walls 1052, cylindrical housings are merely an example of a housing shape and other shape housings, such as rectangular shaped housings, irregular shaped housings, etc., may be substituted for the cylindrical housings in the various embodiments. For example, the battery stacks 1000 may each be a series of rectangular trays or beds stackable on one another.

Various embodiments may provide devices and/or methods for use in bulk energy storage systems, such as long duration energy storage (LODES) systems, short duration energy storage (SDES) systems, etc. As an example, various embodiments may provide batteries and/or components of batteries (e.g., any of cells 100, 302, 700, 800, 900, stacks 300, 301, 392, power modules 390, 391, systems 200, etc.) for bulk energy storage systems, such as batteries for LODES systems. Renewable power sources are becoming more prevalent and cost effective. However, many renewable power sources face an intermittency problem that is hindering renewable power source adoption. The impact of the intermittent tendencies of renewable power sources may be mitigated by pairing renewable power sources with bulk energy storage systems, such as LODES systems, SDES systems, etc. To support the adoption of combined power generation, transmission, and storage systems (e.g., a power plant having a renewable power generation source paired with a bulk energy storage system and transmission facilities at any of the power plant and/or the bulk energy storage system) devices and methods to support the design and operation of such combined power generation, transmission, and storage systems, such as the various embodiment devices and methods described herein, are needed.

A combined power generation, transmission, and storage system may be a power plant including one or more power generation sources (e.g., one or more renewable power generation sources, one or more non-renewable power generations sources, combinations of renewable and non-renewable power generation sources, etc.), one or more transmission facilities, and one or more bulk energy storage systems. Transmission facilities at any of the power plant and/or the bulk energy storage systems may be co-optimized with the power generation and storage system or may impose constraints on the power generation and storage system design and operation. The combined power generation, transmission, and storage systems may be configured to meet various output goals, under various design and operating constraints.

FIGS. 12-20 illustrate various example systems in which one or more aspects of the various embodiments may be used as part of bulk energy storage systems, such as LODES systems, SDES systems, etc. For example, various embodiment batteries and/or components described herein (e.g., any of cells 100, 302, 700, 800, 900, stacks 300, 301, 392, power modules 390, 391, systems 200, etc.) may be used as batteries and/or components for bulk energy storage systems, such as LODES systems, SDES systems, etc. As used herein, the term "LODES system" may mean a bulk energy storage system configured to may have a rated duration (energy/power ratio) of 24 hours (h) or greater, such as a duration of 24 h, a duration of 24 h to 50 h, a duration of greater than 50 h, a duration of 24 h to 150 h, a duration of greater than 150 h, a duration of 24 h to 200 h, a duration greater than 200 h, a duration of 24 h to 500 h, a duration greater than 500 h, etc.

Figure 12:
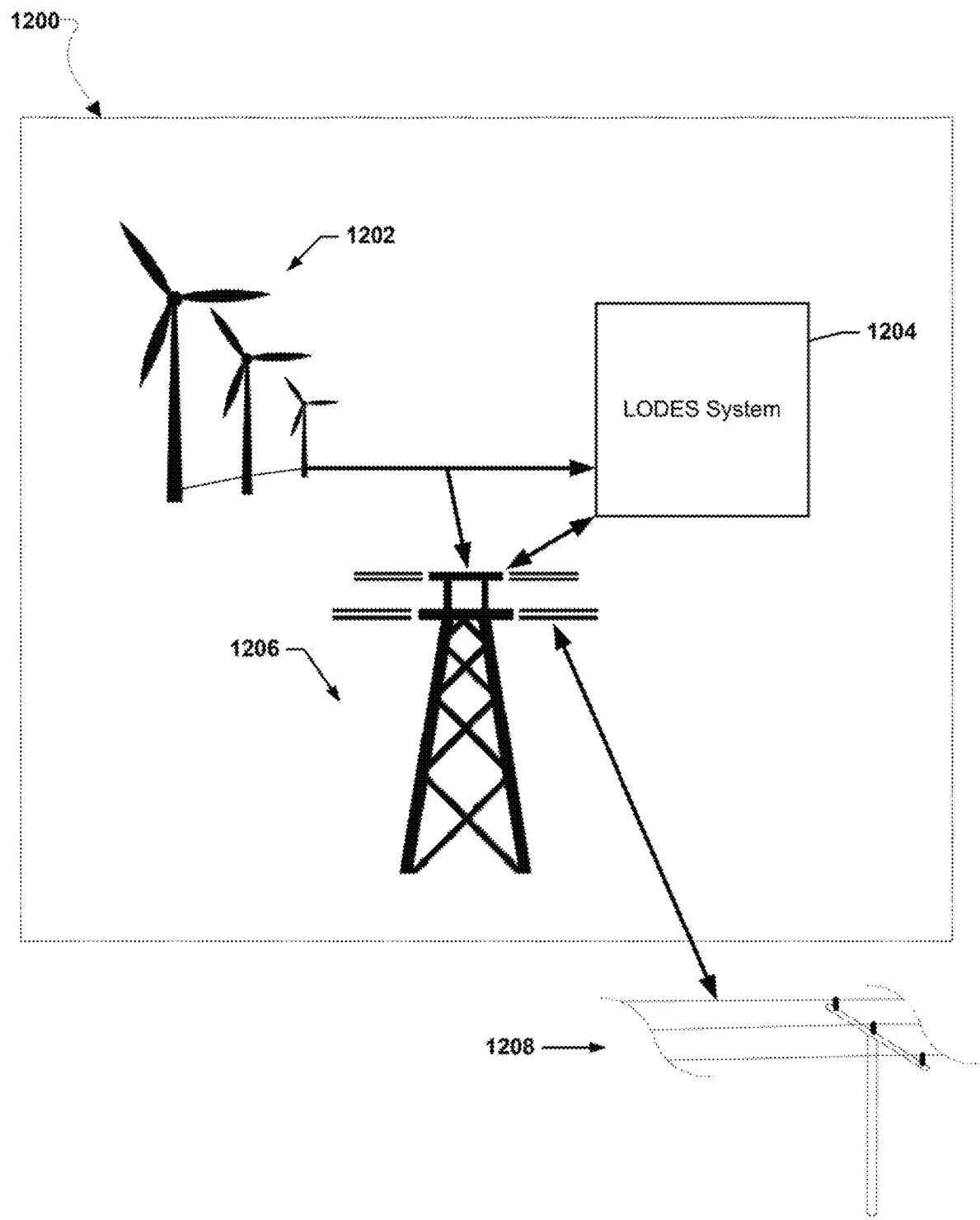
FIGS. 12-20 illustrate various example systems in which one or more aspects of the various embodiments may be used as part of bulk energy storage systems.

FIG. 12 illustrates an example system in which one or more aspects of the various embodiments may be used as part of bulk energy storage system. As a specific example, the bulk energy storage system incorporating one or more aspects of the various embodiments may be a LODES system 1204. As an example, the LODES system 1204 may include any of the various embodiment batteries and/or components described herein (e.g., any of cells 100, 302, 700, 800, 900, stacks 300, 301, 392, power modules 390, 391, systems 200, etc.), singularly or in various combinations. The LODES system 1204 may be electrically connected to a wind farm 1202 and one or more transmission facilities 1206. The wind farm 1202 may be electrically connected to the transmission facilities 1206. The transmission facilities 1206 may be electrically connected to the grid 1208. The wind farm 1202 may generate power and the wind farm 1202 may output generated power to the LODES system 1204 and/or the transmission facilities 1206. The LODES system 1204 may store power received from the wind farm 1202 and/or the transmission facilities 1206. The LODES system 1204 may output stored power to the transmission facilities 1206. The transmission facilities 1206 may output power received from one or both of the wind farm 1202 and LODES system 1204 to the grid 1208 and/or may receive power from the grid 1208 and output that power to the LODES system 1204. Together the wind farm 1202, the LODES system 1204, and the transmission facilities 1206 may constitute a power plant 1200 that may be a combined power generation, transmission, and storage system. The power generated by the wind farm 1202 may be directly fed to the grid 1208 through the transmission facilities 1206, or may be first stored in the LODES system 1204. In certain cases the power supplied to the grid 1208 may come entirely from the wind farm 1202, entirely from the LODES system 1204, or from a combination of the wind farm 1202 and the LODES system 1204. The dispatch of power from the combined wind farm 1202 and LODES system 1204 power plant 1200 may be controlled according to a determined long-range (multi-day or even multi-year) schedule, or may be controlled according to a day-ahead (24 hour advance notice) market, or may be controlled according to an hour-ahead market, or may be controlled in response to real time pricing signals.

As one example of operation of the power plant 1200, the LODES system 1204 may be used to reshape and "firm" the power produced by the wind farm 1202. In one such example, the wind farm 1202 may have a peak generation output (capacity) of 260 megawatts (MW) and a capacity factor (CF) of 41%. The LODES system 1204 may have a power rating (capacity) of 106 MW, a rated duration (energy/power ratio) of 150 hours (h), and an energy rating of 15,900 megawatt hours (MWh). In another such example, the wind farm 1202 may have a peak generation output (capacity) of 300 MW and a capacity factor (CF) of 41%. The LODES system 1204 may have a power rating of 106 MW, a rated duration (energy/power ratio) of 200 h and an energy rating of 21,200 MWh. In another such example, the wind farm 1202 may have a peak generation output (capacity) of 176 MW and a capacity factor (CF) of 53%. The LODES system 1204 may have a power rating (capacity) of 88 MW, a rated duration (energy/power ratio) of 150 h and an energy rating of 13,200 MWh. In another such example, the wind farm 1202 may have a peak generation output (capacity) of 277 MW and a capacity factor (CF) of 41%. The LODES system 1204 may have a power rating (capacity) of 97 MW, a rated duration (energy/power ratio) of 50 h and an energy rating of 4,850 MWh. In another such example, the wind farm 1202 may have a peak generation output (capacity) of 315 MW and a capacity factor (CF) of 41%. The LODES system 1204 may have a power rating (capacity) of 110 MW, a rated duration (energy/power ratio) of 25 h and an energy rating of 2,750 MWh.

Figure 13:
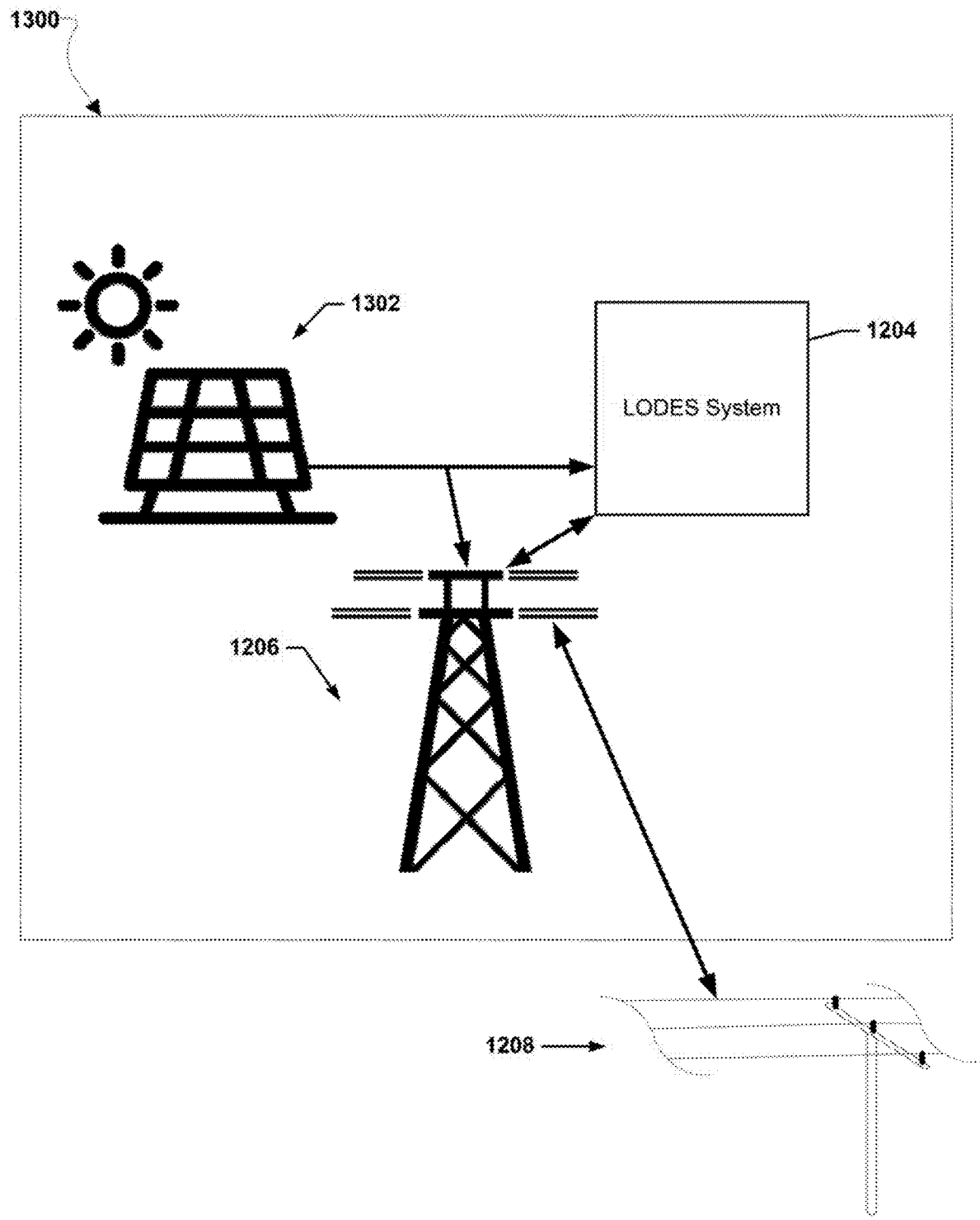

FIG. 13 illustrates an example system in which one or more aspects of the various embodiments may be used as part of bulk energy storage system. As a specific example, the bulk energy storage system incorporating one or more aspects of the various embodiments may be a LODES system 1204. As an example, the LODES system 1204 may include any of the various embodiment batteries and/or components described herein (e.g., any of cells 100, 302, 700, 800, 900, stacks 300, 301, 392, power modules 390, 391, systems 200, etc.), singularly or in various combinations. The system of FIG. 13 may be similar to the system of FIG. 12, except a photovoltaic (PV) farm 1302 may be substituted for the wind farm 1202. The LODES system 1204 may be electrically connected to the PV farm 1302 and one or more transmission facilities 1206. The PV farm 1302 may be electrically connected to the transmission facilities 1206. The transmission facilities 1206 may be electrically connected to the grid 1208. The PV farm 1302 may generate power and the PV farm 1302 may output generated power to the LODES system 1204 and/or the transmission facilities 1206. The LODES system 1204 may store power received from the PV farm 1302 and/or the transmission facilities 1206. The LODES system 1204 may output stored power to the transmission facilities 1206. The transmission facilities 1206 may output power received from one or both of the PV farm 1302 and LODES system 1204 to the grid 1208 and/or may receive power from the grid 1208 and output that power to the LODES system 1204. Together the PV farm 1302, the LODES system 1204, and the transmission facilities 1206 may constitute a power plant 1300 that may be a combined power generation, transmission, and storage system. The power generated by the PV farm 1302 may be directly fed to the grid 1208 through the transmission facilities 1206, or may be first stored in the LODES system 1204. In certain cases the power supplied to the grid 1208 may come entirely from the PV farm 1302, entirely from the LODES system 1204, or from a combination of the PV farm 1302 and the LODES system 1204. The dispatch of power from the combined PV farm 1302 and LODES system 1204 power plant 1300 may be controlled according to a determined long-range (multi-day or even multi-year) schedule, or may be controlled according to a day-ahead (24 hour advance notice) market, or may be controlled according to an hour-ahead market, or may be controlled in response to real time pricing signals.

As one example of operation of the power plant 1300, the LODES system 1204 may be used to reshape and "firm" the power produced by the PV farm 1302. In one such example, the PV farm 1302 may have a peak generation output (capacity) of 490 MW and a capacity factor (CF) of 24%. The LODES system 1204 may have a power rating (capacity) of 340 MW, a rated duration (energy/power ratio) of 150 h and an energy rating of 51,000 MWh. In another such example, the PV farm 1302 may have a peak generation output (capacity) of 680 MW and a capacity factor (CF) of 24%. The LODES system 1204 may have a power rating (capacity) of 410 MW, a rated duration (energy/power ratio) of 200 h, and an energy rating of 82,000 MWh. In another such example, the PV farm 1302 may have a peak generation output (capacity) of 330 MW and a capacity factor (CF) of 31%. The LODES system 1204 may have a power rating (capacity) of 215 MW, a rated duration (energy/power ratio) of 150 h, and an energy rating of 32,250 MWh. In another such example, the PV farm 1302 may have a peak generation output (capacity) of 510 MW and a capacity factor (CF) of 24%. The LODES system 1204 may have a power rating (capacity) of 380 MW, a rated duration (energy/power ratio) of 50 h, and an energy rating of 19,000 MWh. In another such example, the PV farm 1302 may have a peak generation output (capacity) of 630 MW and a capacity factor (CF) of 24%. The LODES system 1204 may have a power rating (capacity) of 380 MW, a rated duration (energy/power ratio) of 25 h, and an energy rating of 9,500 MWh.

Figure 14:
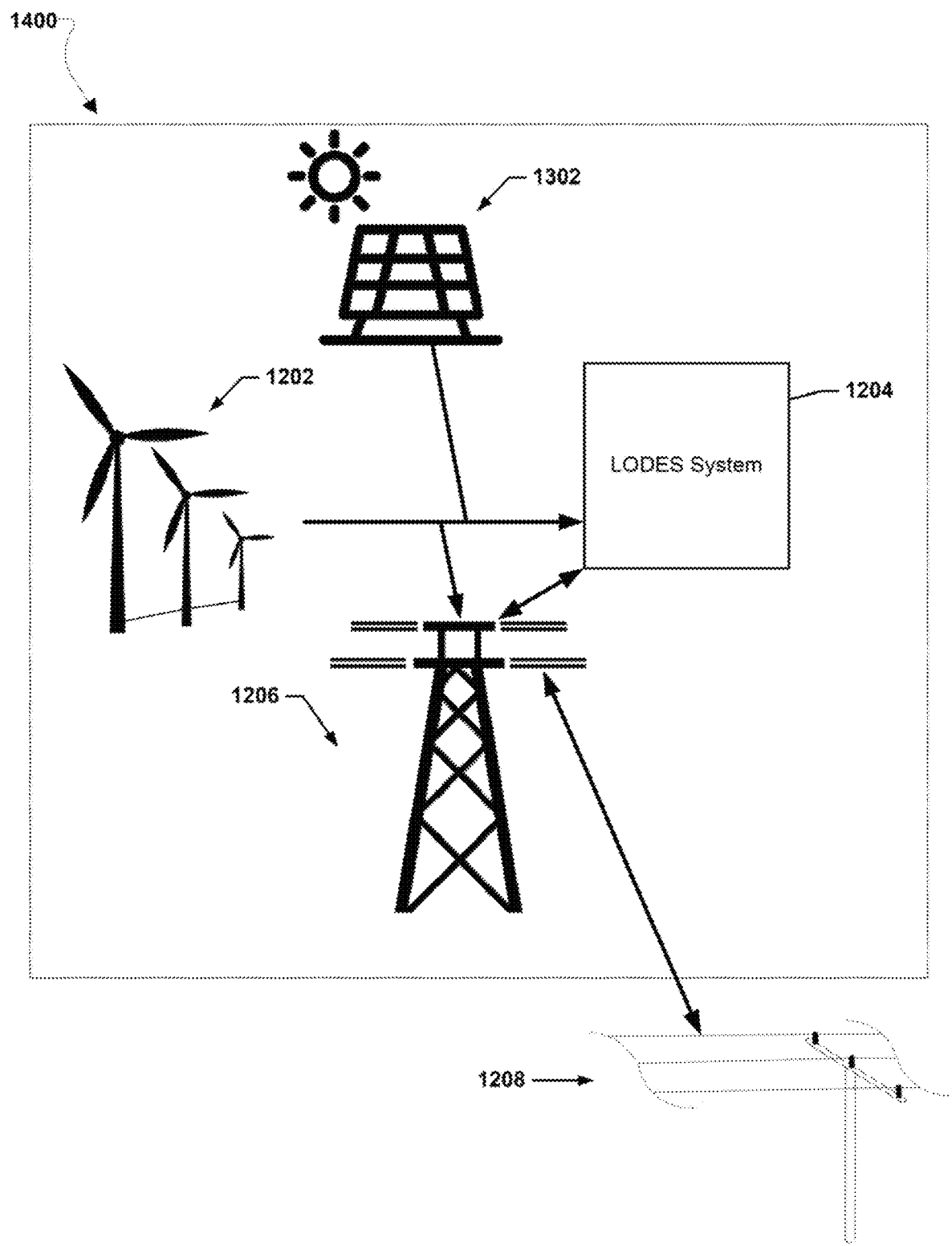

FIG. 14 illustrates an example system in which one or more aspects of the various embodiments may be used as part of bulk energy storage system. As a specific example, the bulk energy storage system incorporating one or more aspects of the various embodiments may be a LODES system 1204. As an example, the LODES system 1204 may include any of the various embodiment batteries and/or components described herein (e.g., any of cells 100, 302, 700, 800, 900, stacks 300, 301, 392, power modules 390, 391, systems 200, etc.), singularly or in various combinations. The system of FIG. 14 may be similar to the systems of FIGS. 12 and 13, except the wind farm 1202 and the photovoltaic (PV) farm 1302 may both be power generators working together in the power plant 1400. Together the PV farm 1302, wind farm 1202, the LODES system 1204, and the transmission facilities 1206 may constitute the power plant 1400 that may be a combined power generation, transmission, and storage system. The power generated by the PV farm 1302 and/or the wind farm 1202 may be directly fed to the grid 1208 through the transmission facilities 1206, or may be first stored in the LODES system 1204. In certain cases the power supplied to the grid 1208 may come entirely from the PV farm 1302, entirely from the wind farm 1202, entirely from the LODES system 1204, or from a combination of the PV farm 1302, the wind farm 1202, and the LODES system 1204. The dispatch of power from the combined wind farm 1202, PV farm 1302, and LODES system 1204 power plant 1400 may be controlled according to a determined long-range (multi-day or even multi-year) schedule, or may be controlled according to a day-ahead (24 hour advance notice) market, or may be controlled according to an hour-ahead market, or may be controlled in response to real time pricing signals.

As one example of operation of the power plant 1400, the LODES system 1204 may be used to reshape and "firm" the power produced by the wind farm 1202 and the PV farm 1302. In one such example, the wind farm 1202 may have a peak generation output (capacity) of 126 MW and a capacity factor (CF) of 41% and the PV farm 1302 may have a peak generation output (capacity) of 126 MW and a capacity factor (CF) of 24%. The LODES system 1204 may have a power rating (capacity) of 63 MW, a rated duration (energy/power ratio) of 150 h, and an energy rating of 9,450 MWh. In another such example, the wind farm 1202 may have a peak generation output (capacity) of 170 MW and a capacity factor (CF) of 41% and the PV farm 1302 may have a peak generation output (capacity) of 110 MW and a capacity factor (CF) of 24%. The LODES system 1204 may have a power rating (capacity) of 57 MW, a rated duration (energy/power ratio) of 200 h, and an energy rating of 11,400 MWh. In another such example, the wind farm 1202 may have a peak generation output (capacity) of 105 MW and a capacity factor (CF) of 51% and the PV farm 1302 may have a peak generation output (capacity) of 70 MW and a capacity factor (CF) of 31 The LODES system 1204 may have a power rating (capacity) of 61 MW, a rated duration (energy/power ratio) of 150 h, and an energy rating of 9,150 MWh. In another such example, the wind farm 1202 may have a peak generation output (capacity) of 135 MW and a capacity factor (CF) of 41% and the PV farm 1302 may have a peak generation output (capacity) of 90 MW and a capacity factor (CF) of 24%. The LODES system 1204 may have a power rating (capacity) of 68 MW, a rated duration (energy/power ratio) of 50 h, and an energy rating of 3,400 MWh. In another such example, the wind farm 1202 may have a peak generation output (capacity) of 144 MW and a capacity factor (CF) of 41% and the PV farm 1302 may have a peak generation output (capacity) of 96 MW and a capacity factor (CF) of 24%. The LODES system 1204 may have a power rating (capacity) of 72 MW, a rated duration (energy/power ratio) of 25 h, and an energy rating of 1,800 MWh.

Figure 15:
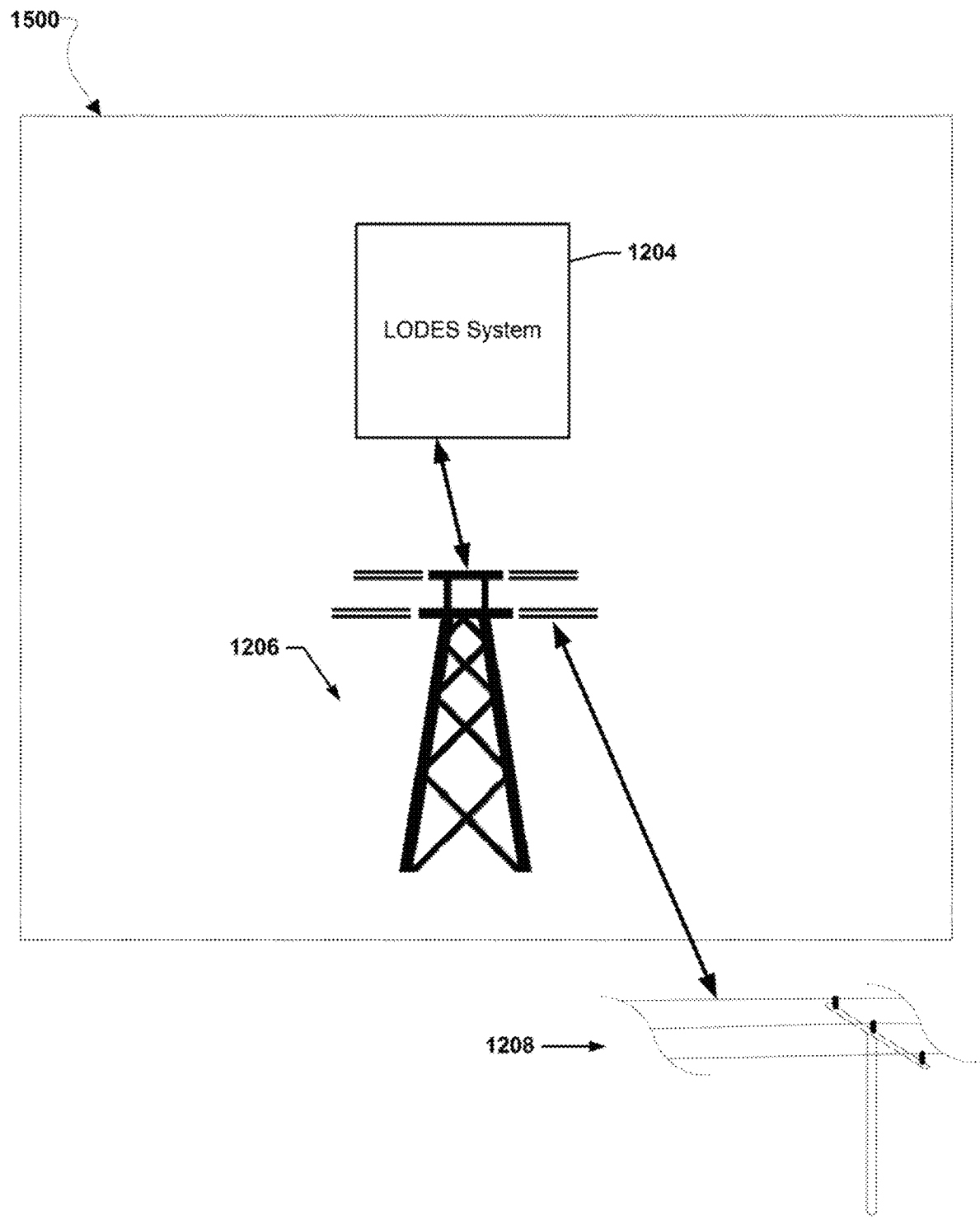

FIG. 15 illustrates an example system in which one or more aspects of the various embodiments may be used as part of bulk energy storage system. As a specific example, the bulk energy storage system incorporating one or more aspects of the various embodiments may be a LODES system 1204. As an example, the LODES system 1204 may include any of the various embodiment batteries and/or components described herein (e.g., any of cells 100, 302, 700, 800, 900, stacks 300, 301, 392, power modules 390, 391, systems 200, etc.), singularly or in various combinations. The LODES system 1204 may be electrically connected to one or more transmission facilities 1206. In this manner, the LODES system 1204 may operate in a "stand-alone" manner to arbiter energy around market prices and/or to avoid transmission constraints. The LODES system 1204 may be electrically connected to one or more transmission facilities 1206. The transmission facilities 1206 may be electrically connected to the grid 1208. The LODES system 1204 may store power received from the transmission facilities 1206. The LODES system 1204 may output stored power to the transmission facilities 1206. The transmission facilities 1206 may output power received from the LODES system 1204 to the grid 1208 and/or may receive power from the grid 1208 and output that power to the LODES system 1204.

Together the LODES system 1204 and the transmission facilities 1206 may constitute a power plant 1500. As an example, the power plant 1500 may be situated downstream of a transmission constraint, close to electrical consumption. In such an example downstream situated power plant 1500, the LODES system 1204 may have a duration of 24 h to 500 h and may undergo one or more full discharges a year to support peak electrical consumptions at times when the transmission capacity is not sufficient to serve customers. Additionally, in such an example downstream situated power plant 1500, the LODES system 1204 may undergo several shallow discharges (daily or at higher frequency) to arbiter the difference between nighttime and daytime electricity prices and reduce the overall cost of electrical service to customer. As a further example, the power plant 1500 may be situated upstream of a transmission constraint, close to electrical generation. In such an example upstream situated power plant 1500, the LODES system 1204 may have a duration of 24 h to 500 h and may undergo one or more full charges a year to absorb excess generation at times when the transmission capacity is not sufficient to distribute the electricity to customers. Additionally, in such an example upstream situated power plant 1500, the LODES system 1204 may undergo several shallow charges and discharges (daily or at higher frequency) to arbiter the difference between nighttime and daytime electricity prices and maximize the value of the output of the generation facilities.

Figure 16:
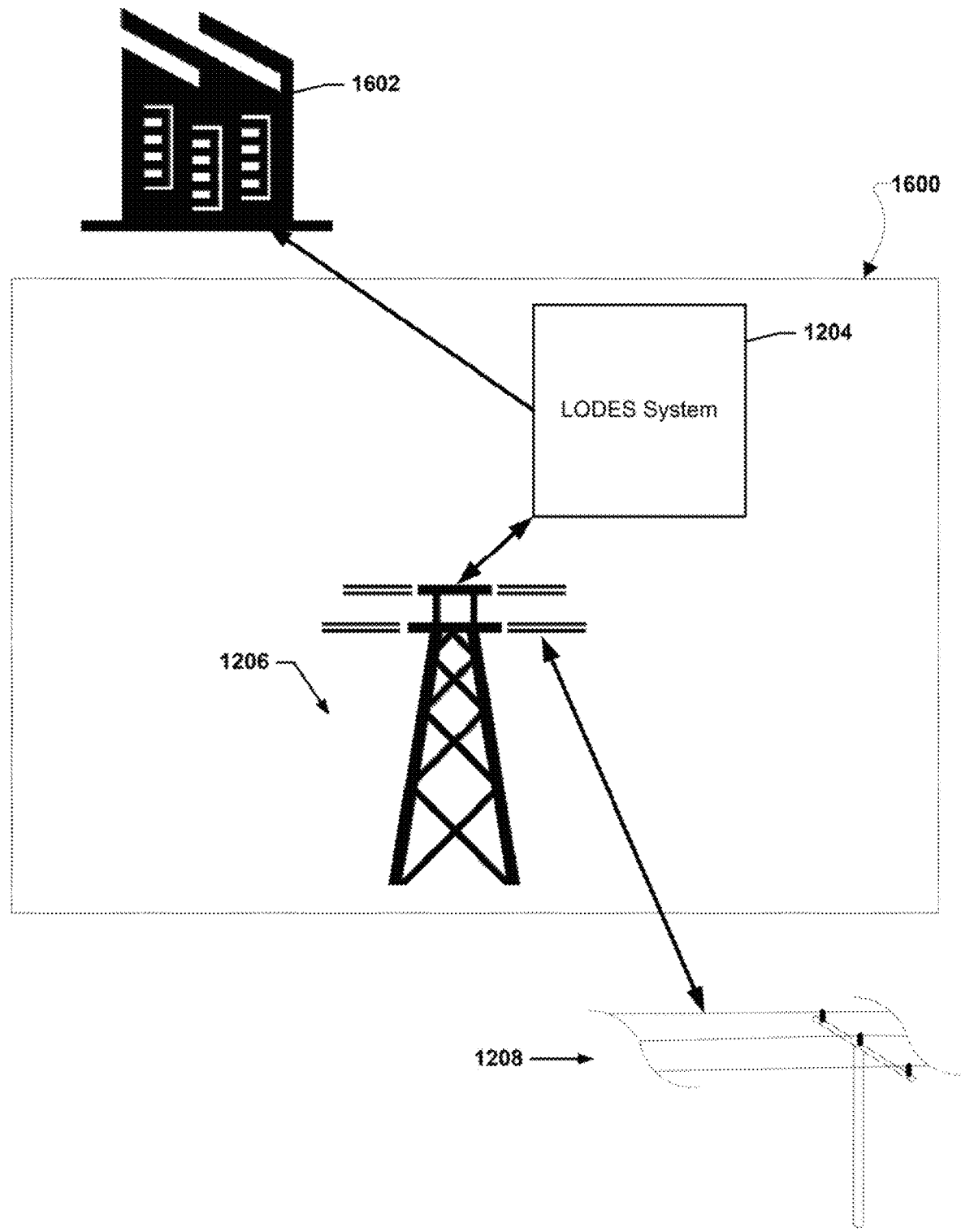

FIG. 16 illustrates an example system in which one or more aspects of the various embodiments may be used as part of bulk energy storage system. As a specific example, the bulk energy storage system incorporating one or more aspects of the various embodiments may be a LODES system 1204. As an example, the LODES system 1204 may include any of the various embodiment batteries and/or components described herein (e.g., any of cells 100, 302, 700, 800, 900, stacks 300, 301, 392, power modules 390, 391, systems 200, etc.), singularly or in various combinations. The LODES system 1204 may be electrically connected to a commercial and industrial (C&I) customer 1602, such as a data center, factory, etc. The LODES system 1204 may be electrically connected to one or more transmission facilities 1206. The transmission facilities 1206 may be electrically connected to the grid 1208. The transmission facilities 1206 may receive power from the grid 1208 and output that power to the LODES system 1204. The LODES system 1204 may store power received from the transmission facilities 1206. The LODES system 1204 may output stored power to the C&I customer 1602. In this manner, the LODES system 1204 may operate to reshape electricity purchased from the grid 1208 to match the consumption pattern of the C&I customer 1602.

Together, the LODES system 1204 and transmission facilities 1206 may constitute a power plant 1600. As an example, the power plant 1600 may be situated close to electrical consumption, i.e., close to the C&I customer 1602, such as between the grid 1208 and the C&I customer 1602. In such an example, the LODES system 1204 may have a duration of 24 h to 500 h and may buy electricity from the markets and thereby charge the LODES system 1204 at times when the electricity is cheaper. The LODES system 1204 may then discharge to provide the C&I customer 1602 with electricity at times when the market price is expensive, therefore offsetting the market purchases of the C&I customer 1602. As an alternative configuration, rather than being situated between the grid 1208 and the C&I customer 1602, the power plant 1600 may be situated between a renewable source, such as a PV farm, wind farm, etc., and the transmission facilities 1206 may connect to the renewable source. In such an alternative example, the LODES system 1204 may have a duration of 24 h to 500 h, and the LODES system 1204 may charge at times when renewable output may be available. The LODES system 1204 may then discharge to provide the C&I customer 1602 with renewable generated electricity so as to cover a portion, or the entirety, of the C&I customer 1602 electricity needs.

Figure 17:
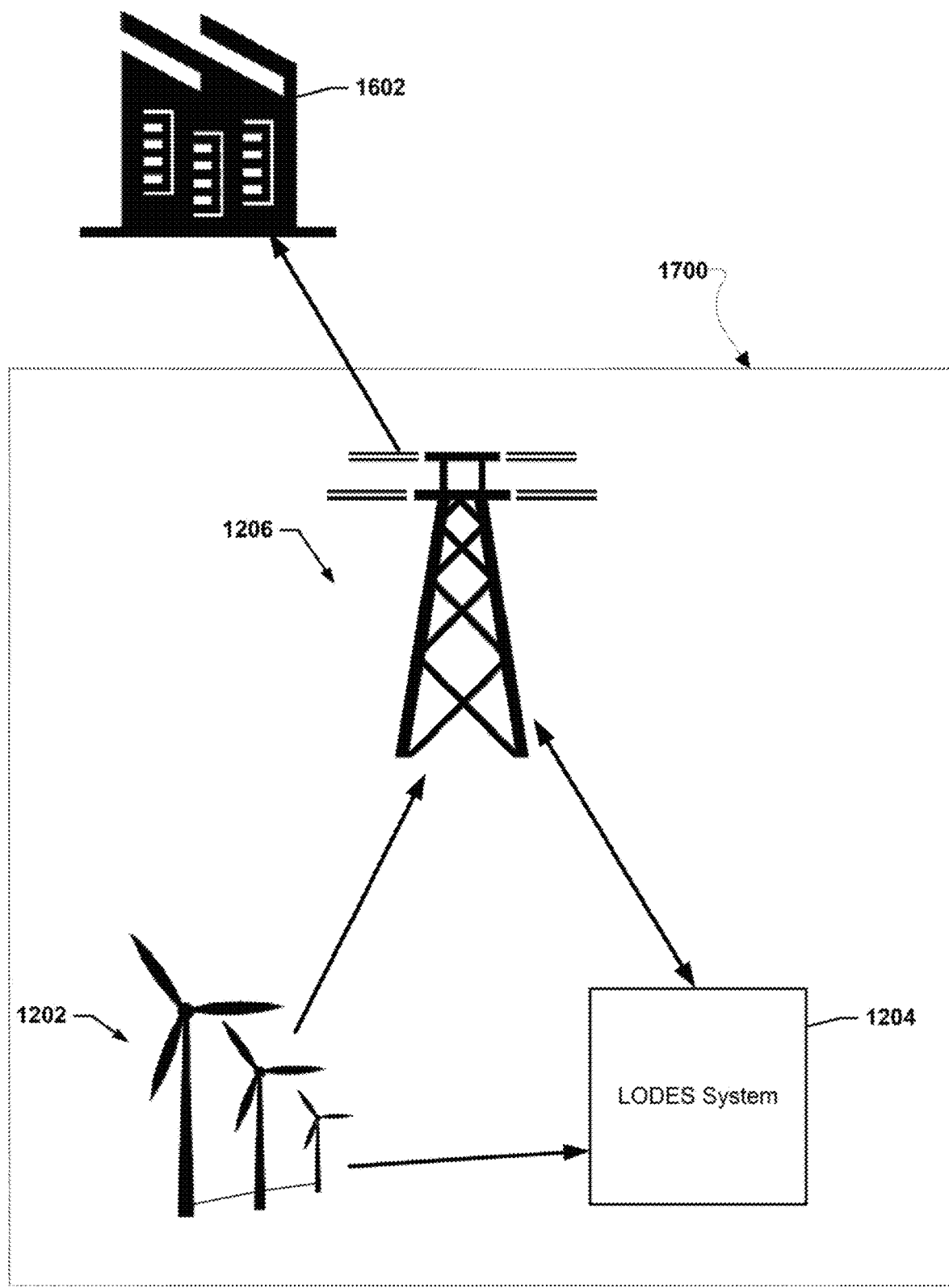

FIG. 17 illustrates an example system in which one or more aspects of the various embodiments may be used as part of bulk energy storage system. As a specific example, the bulk energy storage system incorporating one or more aspects of the various embodiments may be a LODES system 1204. As an example, the LODES system 1204 may include any of the various embodiment batteries and/or components described herein (e.g., any of cells 100, 302, 700, 800, 900, stacks 300, 301, 392, power modules 390, 391, systems 200, etc.), singularly or in various combinations. The LODES system 1204 may be electrically connected to a wind farm 1202 and one or more transmission facilities 1206. The wind farm 1202 may be electrically connected to the transmission facilities 1206. The transmission facilities 1206 may be electrically connected to a C&I customer 1602. The wind farm 1202 may generate power and the wind farm 1202 may output generated power to the LODES system 1204 and/or the transmission facilities 1206. The LODES system 1204 may store power received from the wind farm 1202. The LODES system 1204 may output stored power to the transmission facilities 1206. The transmission facilities 1206 may output power received from one or both of the wind farm 1202 and LODES system 1204 to the C&I customer 1602. Together the wind farm 1202, the LODES system 1204, and the transmission facilities 1206 may constitute a power plant 1700 that may be a combined power generation, transmission, and storage system. The power generated by the wind farm 1202 may be directly fed to the C&I customer 1602 through the transmission facilities 1206, or may be first stored in the LODES system 1204. In certain cases the power supplied to the C&I customer 1602 may come entirely from the wind farm 1202, entirely from the LODES system 1204, or from a combination of the wind farm 1202 and the LODES system 1204.

The LODES system 1204 may be used to reshape the electricity generated by the wind farm 1202 to match the consumption pattern of the C&I customer 1602. In one such example, the LODES system 1204 may have a duration of 24 h to 500 h and may charge when renewable generation by the wind farm 1202 exceeds the C&I customer 1602 load. The LODES system 1204 may then discharge when renewable generation by the wind farm 1202 falls short of C&I customer 1602 load so as to provide the C&I customer 1602 with a firm renewable profile that offsets a fraction, or all of, the C&I customer 1602 electrical consumption.

Figure 18:
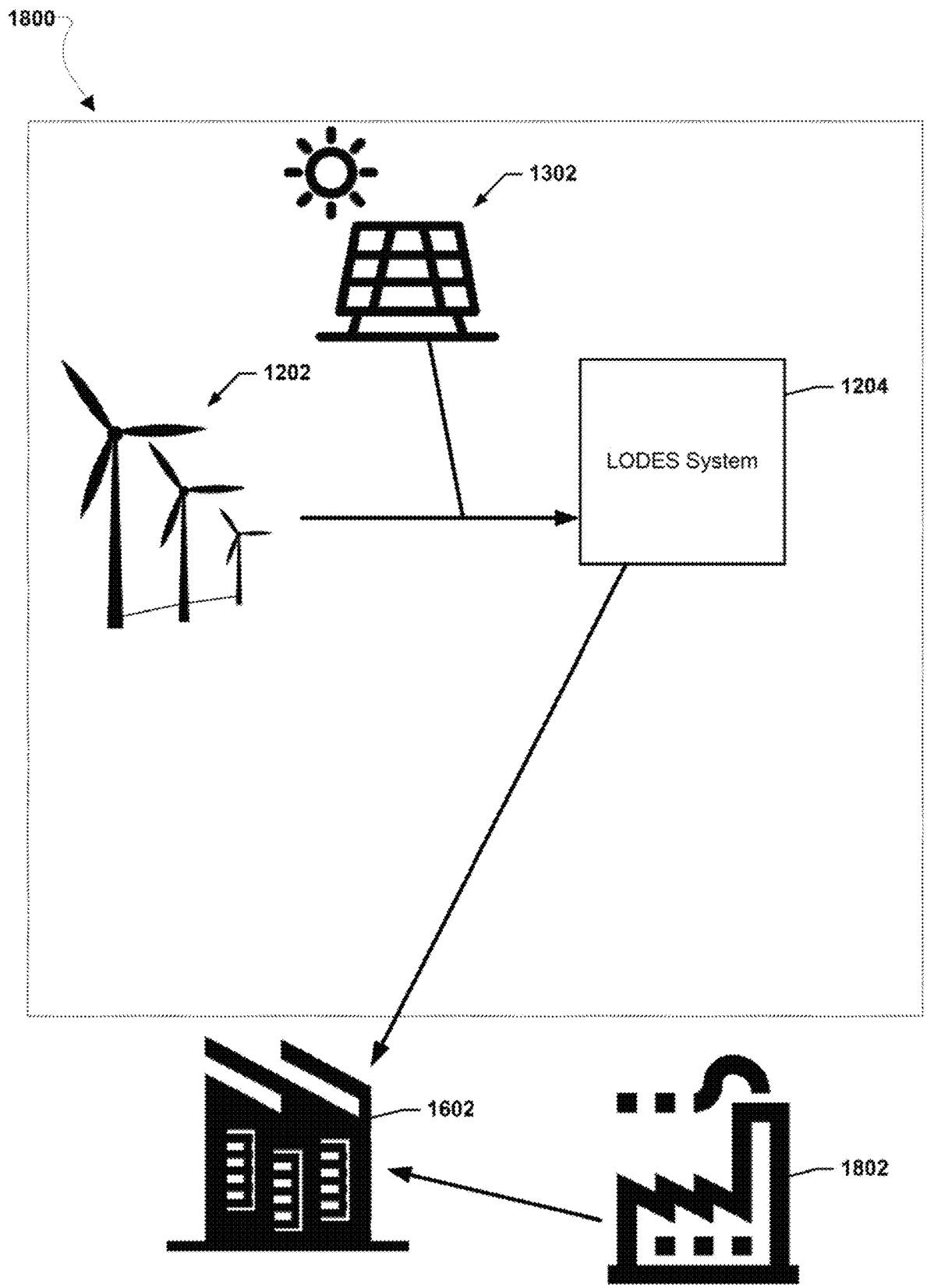

FIG. 18 illustrates an example system in which one or more aspects of the various embodiments may be used as part of bulk energy storage system. As a specific example, the bulk energy storage system incorporating one or more aspects of the various embodiments may be a LODES system 1204. As an example, the LODES system 1204 may include any of the various embodiment batteries and/or components described herein (e.g., any of cells 100, 302, 700, 800, 900, stacks 300, 301, 392, power modules 390, 391, systems 200, etc.), singularly or in various combinations. The LODES system 1204 may be part of a power plant 1800 that is used to integrate large amounts of renewable generation in microgrids and harmonize the output of renewable generation by, for example a PV farm 1302 and wind farm 1202, with existing thermal generation by, for example a thermal power plant 1802 (e.g., a gas plant, a coal plant, a diesel generator set, etc., or a combination of thermal generation methods), while renewable generation and thermal generation supply the C&I customer 1602 load at high availability. Microgrids, such as the microgrid constituted by the power plant 1800 and the thermal power plant 1802, may provide availability that is 90% or higher. The power generated by the PV farm 1302 and/or the wind farm 1202 may be directly fed to the C&I customer 1602, or may be first stored in the LODES system 1204. In certain cases the power supplied to the C&I customer 1602 may come entirely from the PV farm 1302, entirely from the wind farm 1202, entirely from the LODES system 1204, entirely from the thermal power plant 1802, or from any combination of the PV farm 1302, the wind farm 1202, the LODES system 1204, and/or the thermal power plant 1802. As examples, the LODES system 1204 of the power plant 1800 may have a duration of 24 h to 500 h. As a specific example, the C&I customer 1602 load may have a peak of 100 MW, the LODES system 1204 may have a power rating of 14 MW and duration of 150 h, natural gas may cost $6/million British thermal units (MMBTU), and the renewable penetration may be 58%. As another specific example, the C&I customer 1602 load may have a peak of 100 MW, the LODES system 1204 may have a power rating of 25 MW and duration of 150 h, natural gas may cost $8/MMBTU, and the renewable penetration may be 65%.

Figure 19:
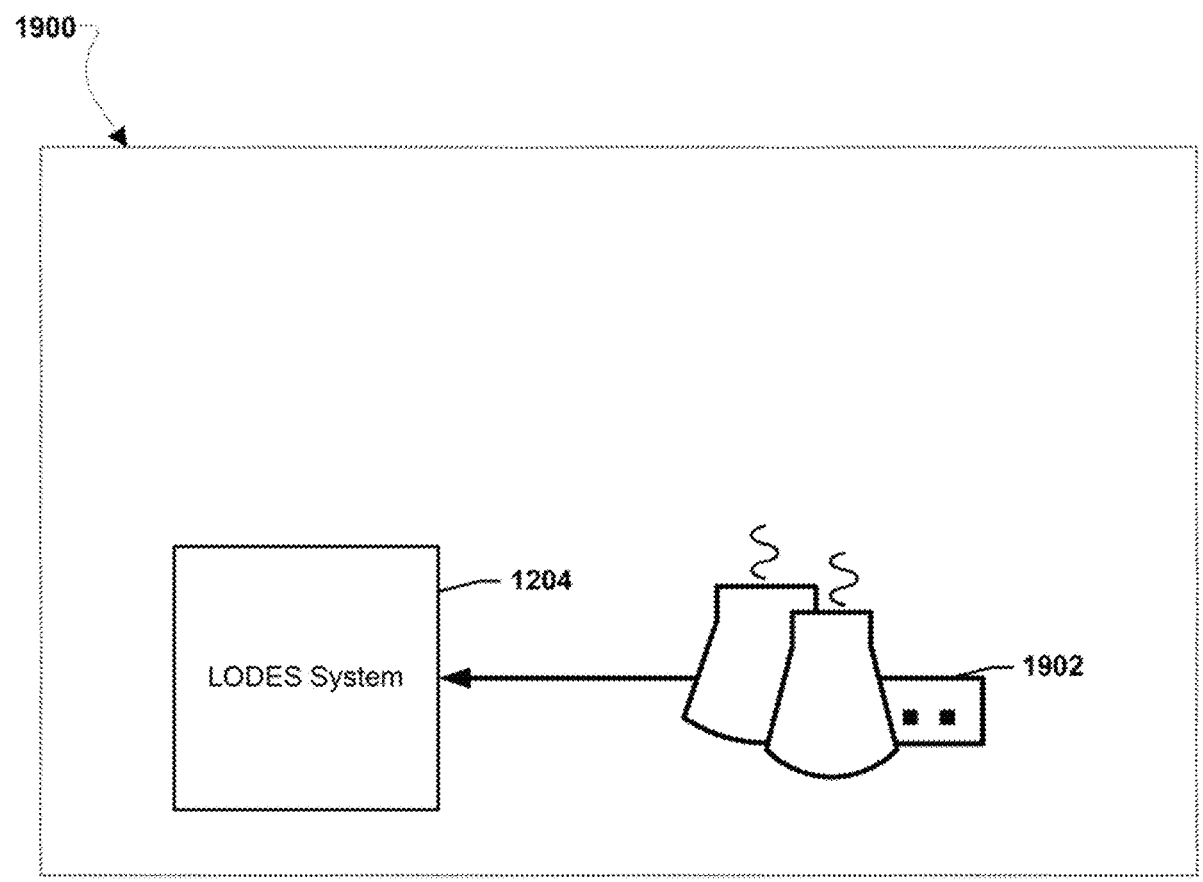

FIG. 19 illustrates an example system in which one or more aspects of the various embodiments may be used as part of bulk energy storage system. As a specific example, the bulk energy storage system incorporating one or more aspects of the various embodiments may be a LODES system 1204. As an example, the LODES system 1204 may include any of the various embodiment batteries and/or components described herein (e.g., any of cells 100, 302, 700, 800, 900, stacks 300, 301, 392, power modules 390, 391, systems 200, etc.), singularly or in various combinations. The LODES system 1204 may be used to augment a nuclear plant 1902 (or other inflexible generation facility, such as a thermal, a biomass, etc., and/or any other type plant having a ramp-rate lower than 50% of rated power in one hour and a high capacity factor of 80% or higher) to add flexibility to the combined output of the power plant 1900 constituted by the combined LODES system 1204 and nuclear plant 1902.

The nuclear plant 1902 may operate at high capacity factor and at the highest efficiency point, while the LODES system 1204 may charge and discharge to effectively reshape the output of the nuclear plant 1902 to match a customer electrical consumption and/or a market price of electricity. As examples, the LODES system 1204 of the power plant 1900 may have a duration of 24 h to 500 h. In one specific example, the nuclear plant 1902 may have 1,000 MW of rated output and the nuclear plant 1902 may be forced into prolonged periods of minimum stable generation or even shutdowns because of depressed market pricing of electricity. The LODES system 1204 may avoid facility shutdowns and charge at times of depressed market pricing; and the LODES system 1204 may subsequently discharge and boost total output generation at times of inflated market pricing.

Figure 20:
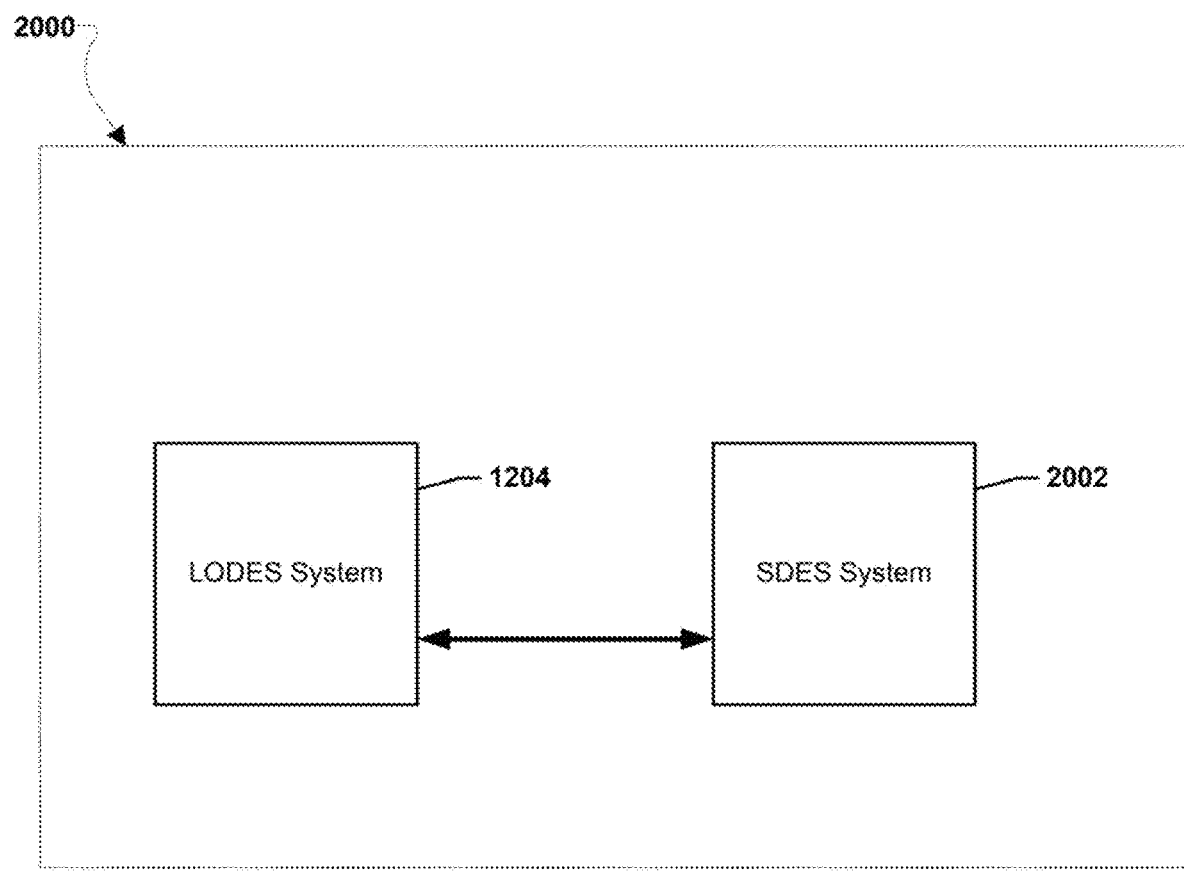

FIG. 20 illustrates an example system in which one or more aspects of the various embodiments may be used as part of bulk energy storage system. As a specific example, the bulk energy storage system incorporating one or more aspects of the various embodiments may be a LODES system 1204. As an example, the LODES system 1204 may include any of the various embodiment batteries and/or components described herein (e.g., any of cells 100, 302, 700, 800, 900, stacks 300, 301, 392, power modules 390, 391, systems 200, etc.), singularly or in various combinations. The LODES system 1204 may operate in tandem with a SDES system 2002. Together the LODES system 1204 and SDES system 2002 may constitute a power plant 2000. As an example, the LODES system 1204 and SDES system 2002 may be co-optimized whereby the LODES system 1204 may provide various services, including long-duration back-up and/or bridging through multi-day fluctuations (e.g., multi-day fluctuations in market pricing, renewable generation, electrical consumption, etc.), and the SDES system 2002 may provide various services, including fast ancillary services (e.g. voltage control, frequency regulation, etc.) and/or bridging through intra-day fluctuations (e.g., intra-day fluctuations in market pricing, renewable generation, electrical consumption, etc.). The SDES system 2002 may have durations of less than 10 hours and round-trip efficiencies of greater than 80%. The LODES system 1204 may have durations of 24 h to 500 h and round-trip efficiencies of greater than 40%. In one such example, the LODES system 1204 may have a duration of 150 hours and support customer electrical consumption for up to a week of renewable under-generation. The LODES system 1204 may also support customer electrical consumption during intra-day under-generation events, augmenting the capabilities of the SDES system 2002. Further, the SDES system 2002 may supply customers during intra-day under-generation events and provide power conditioning and quality services such as voltage control and frequency regulation.

Various embodiments may provide electrochemical cells including a cathode including sulfur, an anode including a sulfide, and an ion-permeable separator configured to electrically insulate the anode and the cathode from one another. Various embodiments may include operating the electrochemical cell in a discharge or charging mode. In various embodiments, a power module may include one or more stacks including two or more such embodiment electrochemical cells. Various embodiments may include operating the power module in a discharge or charging mode.

Various embodiments may provide electrochemical cells including a housing having a first chamber and a second chamber, a catholyte disposed in the first chamber and including a dissolved ferrocyanide or ferricyanide compound, a cathode immersed in the catholyte, an anolyte disposed in the second chamber and including a polysulfide compound, and an ion-permeable separator disposed between the anolyte and the catholyte and configured to electrically insulate the anode and the cathode from one another. In various embodiments the anolyte and the catholyte may include Li, Na, K, or a combination thereof. In various embodiments, the cathode may include a carbon felt. In various embodiments, the cathode may include a nickel foam. In various embodiments, the electrochemical cell may include a first volume of the catholyte and a second volume of the anolyte, the first volume being about three times greater than the second volume. In various embodiments, an electrochemical stack may include a plurality of such embodiment electrochemical cells. In various embodiments, a power module may include one or more such embodiment electrochemical stacks. Various embodiments may include operating such embodiment electrochemical cells in a discharge or charging mode.

Various embodiments may provide electrochemical cells including a catholyte including a dissolved permanganate or manganate compound, an anolyte including a polysulfide compound, and an ion-permeable separator disposed between the anolyte and the catholyte and configured to electrically insulate the anolyte from the catholyte. In various embodiments, the catholyte may include an alkali permanganate catholyte. In various embodiments, the anolyte may include a sodium polysulfide solution. In various embodiments, the anolyte and catholyte may be aqueous alkaline solutions. In various embodiments, the separator may include an anion exchange membrane which blocks cations and has a pore size that is sufficiently small to block permanganate anions and that is sufficiently large to permit transition of hydroxide anions. In various embodiments, the separator may be disposed within an ion impermeable separator material disposed between the anolyte and the catholyte.

The foregoing method descriptions are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not necessarily intended to limit the order of the steps; these words may be used to guide the reader through the description of the methods. Further, any reference to claim elements in the singular, for example, using the articles "a," "an" or "the" is not to be construed as limiting the element to the singular. Further, any step of any embodiment described herein can be used in any other embodiment.

The preceding description of the disclosed embodiments is provided to enable any person skilled in the art to make or use the described embodiment. Various modifications to these embodiments will be readily apparent to those skilled in the art, and the generic principles defined herein may be applied to other embodiments without departing from the scope of the disclosure. Thus, the present invention is not intended to be limited to the embodiments shown herein but is to be accorded the widest scope consistent with the following claims and the principles and novel features disclosed herein.

What is claimed is:

1. An electrochemical cell comprising:
   a catholyte contacting a cathode, the catholyte comprising a cathode active material dissolved in an electrolyte, wherein a cathode active material species is reversibly formed at the cathode during charging and discharging of the electrochemical cell;
   an anolyte comprising a polysulfide compound dissolved in an electrolyte; and
   a separator configured to electrically insulate the anolyte from the catholyte, wherein the separator comprises:
      an ion impermeable frame; and
      at least one window disposed within the frame, wherein the at least one window comprises an anion exchange membrane material.

2. The electrochemical cell of claim 1, wherein the cathode active material comprises a manganese-based compound.

3. The electrochemical cell of claim 2, wherein the manganese-based compound comprises a permanganate compound, a manganate compound, or a combination thereof.

4. The electrochemical cell of claim 2, wherein the manganese-based compound comprises potassium permanganate ($KMnO_4$), potassium manganate ($K_2MnO_4$), sodium permanganate ($NaMnO_4$), sodium manganate ($Na_2MnO_4$), lithium permanganate ($LiMnO_4$), lithium manganate ($Li_2MnO_4$), or any combination thereof.

5. The electrochemical cell of claim 2, wherein the cathode active material comprises a mixture of $KMnO_4$ and $NaMnO_4$.

6. The electrochemical cell of claim 2, wherein the catholyte further comprises a compound configured to reduce self-discharge.

7. The electrochemical cell of claim 6, wherein the compound is a bismuth oxide, an alkaline earth metal salt, or an alkaline earth metal hydroxide.

8. The electrochemical cell of claim 2, wherein the catholyte is substantially nickel-free.

9. The electrochemical cell of claim 2, wherein the catholyte further comprises an additive configured to sequester nickel.

10. The electrochemical cell of claim 2, wherein the separator comprises:
    a polymer; and
    a protective layer disposed on a catholyte side of the polymer and configured to reduce oxidation of the polymer by the cathode active material.

11. The electrochemical cell of claim 10, wherein the protective layer comprises a polyether ether ketone (PEEK), a polysulfone, a polystyrene, a polypropylene, a polyethylene, or any combination thereof.

12. The electrochemical cell of claim 1, wherein:
    the cathode active material comprises an iron-cyanide based compound; and
    the electrochemical cell is a static cell.

13. The electrochemical cell of claim 12, wherein the iron-cyanide based compound comprises a ferrocyanide compound, ferricyanide compound, or a combination thereof.

14. The electrochemical cell of claim 12, wherein the iron-cyanide based compound comprises:
    ferrocyanide anions $[Fe(CN)_6]^{4-}$, ferricyanide anions $[Fe(CN)_6]^{3-}$, or a combination thereof; and
    cations comprising $Li^+$, $K^+$, $Na^+$, or combinations thereof.

15. The electrochemical cell of claim 1, wherein at least one of the catholyte and the anolyte comprises sodium thiosulfate ($Na_2S_2O_3$).

16. The electrochemical cell of claim 1, wherein the cathode active material comprises a sulfur-based compound.

17. The electrochemical cell of claim 16, wherein the sulfur-based compound comprises sulfur ($S_8$), lithium (poly) sulfide ($Li_2S_x$, where x=1 to 8), sodium (poly)sulfide ($Na_2S_x$, where x=1 to 8), potassium (poly)sulfides ($K_2S_x$, where x=1 to 8), or a combination thereof.

18. The electrochemical cell of claim 1, wherein the cathode active material comprises a transition metal sulfide.

19. The electrochemical cell of claim 1, wherein:
    the cathode active material comprises a manganese-based compound, iron-cyanide based compound, or a sulfur-based compound; and
    the catholyte and the anolyte are aqueous solutions having a pH at or above 10.

20. The electrochemical cell of claim 1, wherein:
    the cathode active material comprises a manganese-based compound; and
    the catholyte and the anolyte are aqueous solutions having a pH at or above 13.

21. The electrochemical cell of claim 1, wherein:
    the anion exchange membrane material blocks cations and has a pore size configured to block both cathode and anode active material anions while permitting transition of hydroxide anions.

22. The electrochemical cell of claim 1, wherein the ratio of the area of the at least one window to the sum of the at least one window and frame areas is less than about 0.8.

23. The electrochemical cell of claim 1, further comprising:
    the cathode immersed in the catholyte; and
    an anode immersed in the anolyte.

24. The electrochemical cell of claim 2, wherein the separator comprises a composite membrane comprising an inorganic material and an organic material.

25. The electrochemical cell of claim 24, wherein the inorganic material comprises a metal oxide or a ceramic material.

26. The electrochemical cell of claim 2, wherein the positive electrode comprises a carbon-based material and a metal oxide coating layer configured to reduce oxidation of the carbon-based material by the cathode active material.

27. The electrochemical cell of claim 1, wherein element sulfur is added periodically to the anode active material to recover capacity and rebalance the state of charge between anode and cathode.

28. The electrochemical cell of claim 2, wherein the cathode comprises an oxygen reduction reaction (ORR) electrode that can be operated to convert manganate to permanganate.

29. A power module, comprising:
a stack of electrochemical cells, the electrochemical cells each comprising:
a catholyte contacting a cathode, the catholyte comprising a cathode active material dissolved in an electrolyte, wherein a cathode active material species is reversibly formed at the cathode during charging and discharging of the electrochemical cell;
an anolyte comprising a polysulfide compound dissolved in an electrolyte; and
a separator configured to electrically insulate the anolyte from the catholyte, wherein the separator comprises:
an ion impermeable frame; and
at least one window disposed within the frame, wherein the at least one window comprises an anion exchange membrane material.

30. The power module of claim 29, wherein the cathode active material comprises a manganese-based compound, iron-cyanide based compound, or a sulfur-based compound.

31. The power module of claim 29, further comprising:
a catholyte tank fluidly connected to the electrochemical cells; and
an anolyte tank fluidly connected to the electrochemical cells,
wherein the catholyte flows between the catholyte tank and the electrochemical cells and the anolyte flows between the anolyte tank and the electrochemical cells, and
wherein the cathode active material comprises a manganese-based compound or a sulfur- based compound.

32. The power module of claim 31, further comprising a pump configured to increase an oxygen pressure applied to the catholyte,
wherein the cathode active material comprises a manganese-based compound.

33. The power module of claim 31, further comprising a plurality of catholyte tanks comprising the catholyte, wherein:

the electrochemical cells are arranged in columns and rows;
the electrochemical cells of each column are fluidly connected to a respective one of the catholyte tanks; and
the electrochemical cells of each row are electrically connected to one other.

34. The power module of claim 31, wherein the anion exchange membrane material blocks cations and has a pore size configured to block cathode active material anions while permitting transition of hydroxide anions.

35. The power module of claim 30, wherein the electrochemical cell further comprises:
the cathode immersed in the catholyte; and
an anode immersed in the anolyte.

36. The power module of claim 30, wherein the separator comprises a nanofiltration membrane, an ultrafiltration membrane, a reverse osmosis membrane, a polybenzimidazole-based membrane, a membrane including polymers of intrinsic microporosity (PIM), or a combination thereof.

37. A bulk energy storage system, comprising:
at least one battery comprising a stack of electrochemical cells, each electrochemical cell comprising:
a catholyte contacting a cathode, the catholyte comprising a cathode active material dissolved in an electrolyte, wherein a cathode active material species is reversibly formed at the cathode during charging and discharging of the electrochemical cell;
an anolyte comprising a polysulfide compound dissolved in an electrolyte; and
a separator configured to electrically insulate the anolyte from the catholyte, wherein the separator comprises:
an ion impermeable frame; and
at least one window disposed within the frame, wherein the at least one window comprises an anion exchange membrane material.

38. The bulk energy storage system of claim 37, wherein the cathode active material comprises a manganese-based compound, iron-cyanide based compound, or a sulfur-based compound.

39. The bulk energy storage system of claim 37, wherein the-anion exchange membrane material blocks cations and has a pore size configured to block cathode active material anions while permitting transition of hydroxide anions.

40. The bulk energy storage system of claim 38, wherein the electrochemical cell further comprises:
the cathode immersed in the catholyte; and
an anode immersed in the anolyte.

41. The bulk energy storage system of claim 38, wherein the separator comprises a nanofiltration membrane, an ultrafiltration membrane, a reverse osmosis membrane, a polybenzimidazole-based membrane, a membrane including polymers of intrinsic microporosity (PIM), or a combination thereof.

42. The bulk energy storage system of claim 38, wherein the bulk energy storage system is a long duration energy storage (LODES) system.

* * * * *